United States Patent
Tsujita et al.

(10) Patent No.: US 9,122,974 B2
(45) Date of Patent: Sep. 1, 2015

(54) PRINT CONTROL APPARATUS FOR CAUSING A PRINTING APPARATUS TO EXECUTE PRINTING BY CONTROLLING THE PRINTING APPARATUS, METHOD OF CONTROLLING THE SAME, AND STORAGE MEDIUM

(71) Applicant: CANON KABUSHIKI KAISHA, Tokyo (JP)

(72) Inventors: Kosuke Tsujita, Tama (JP); Ryo Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/308,270

(22) Filed: Jun. 18, 2014

(65) Prior Publication Data

US 2014/0376028 A1    Dec. 25, 2014

(30) Foreign Application Priority Data

Jun. 21, 2013   (JP) ................................ 2013-131050

(51) Int. Cl.
    *G06F 15/00*   (2006.01)
    *G06K 1/00*    (2006.01)
    *G06F 3/12*    (2006.01)
    *G06K 15/00*   (2006.01)
    *G06K 15/02*   (2006.01)

(52) U.S. Cl.
    CPC ............. *G06K 15/1805* (2013.01); *G06F 3/12* (2013.01); *G06K 15/406* (2013.01); *G06K 15/4065* (2013.01)

(58) Field of Classification Search
    None
    See application file for complete search history.

(56) References Cited

U.S. PATENT DOCUMENTS

| | | | |
|---|---|---|---|
| 6,962,449 B2 * | 11/2005 | Lermant et al. ................. | 400/76 |
| 7,286,252 B2 * | 10/2007 | Kawabuchi et al. ......... | 358/1.15 |
| 8,231,124 B2 * | 7/2012 | Ohtani et al. ................. | 271/152 |
| 8,433,215 B2 | 4/2013 | Tsujita | |
| 8,792,109 B2 * | 7/2014 | Tamada et al. ............... | 358/1.13 |
| 2004/0125399 A1 * | 7/2004 | Kobayashi ................... | 358/1.14 |
| 2005/0117917 A1 * | 6/2005 | Lee et al. .......................... | 399/1 |
| 2005/0200875 A1 * | 9/2005 | Sugimoto et al. ............ | 358/1.13 |
| 2012/0293832 A1 | 11/2012 | Fujita | |
| 2013/0057910 A1 * | 3/2013 | Matsumoto ................. | 358/1.15 |

FOREIGN PATENT DOCUMENTS

JP          2007-241425 A       9/2007

OTHER PUBLICATIONS

U.S. Appl. No. 14/299,614, filed Jun. 9, 2014. Applicant: Kosuke Tsujita.

* cited by examiner

*Primary Examiner* — Ming Hon
(74) *Attorney, Agent, or Firm* — Fitzpatrick, Cella, Harper & Scinto

(57) ABSTRACT

According to a print control apparatus and a method of controlling the same of the present invention, when the printing apparatus is in a power saving state, when an instruction for registering in the printing apparatus sheet information stored in a storage unit in association with a sheet feeder of the printing apparatus is received, the sheet information is registered in a list, and when the printing apparatus returns from the power saving state, control is performed so that sheet information registered in the list is transmitted to the printing apparatus.

9 Claims, 38 Drawing Sheets

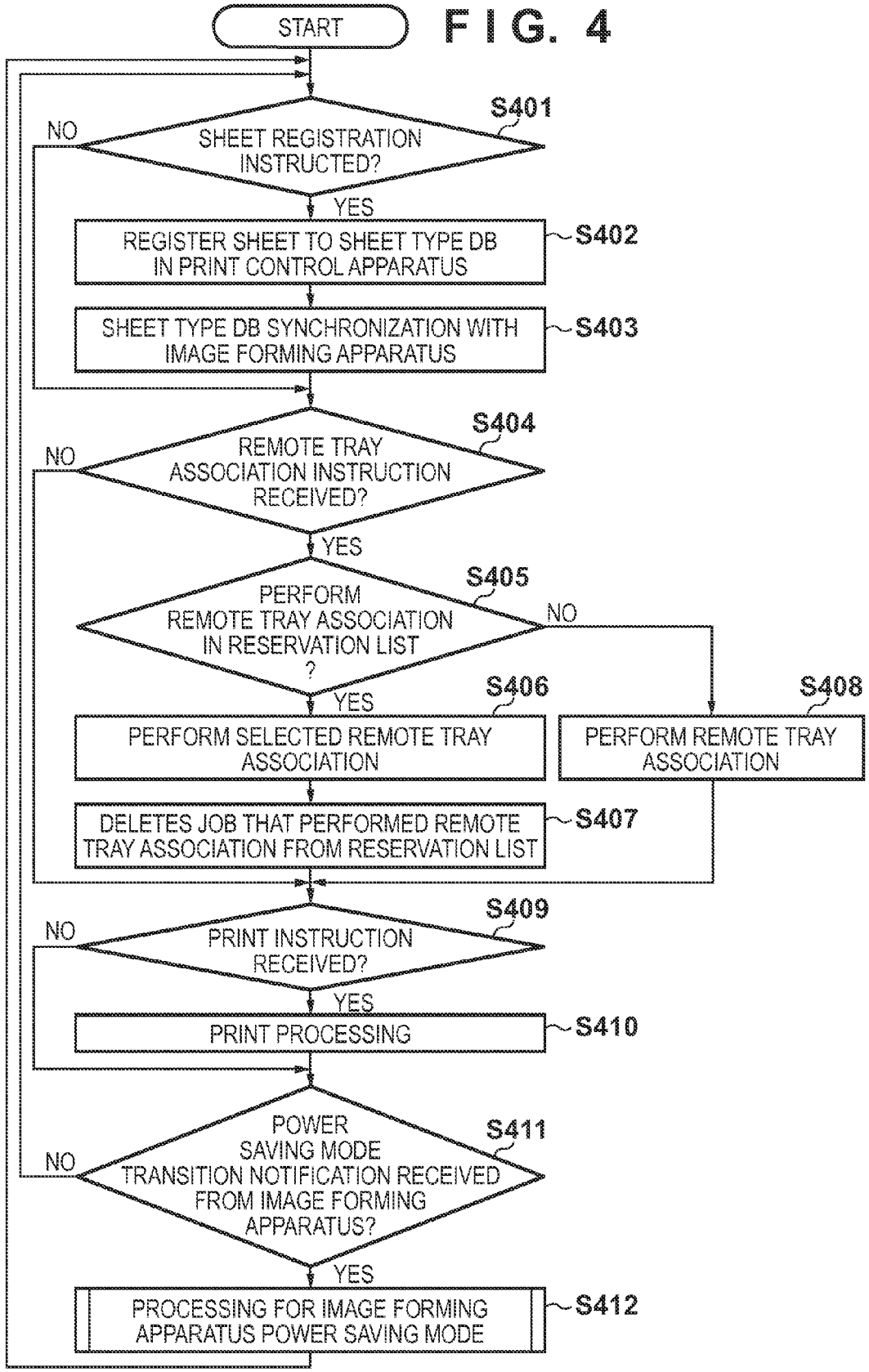

F I G. 5B
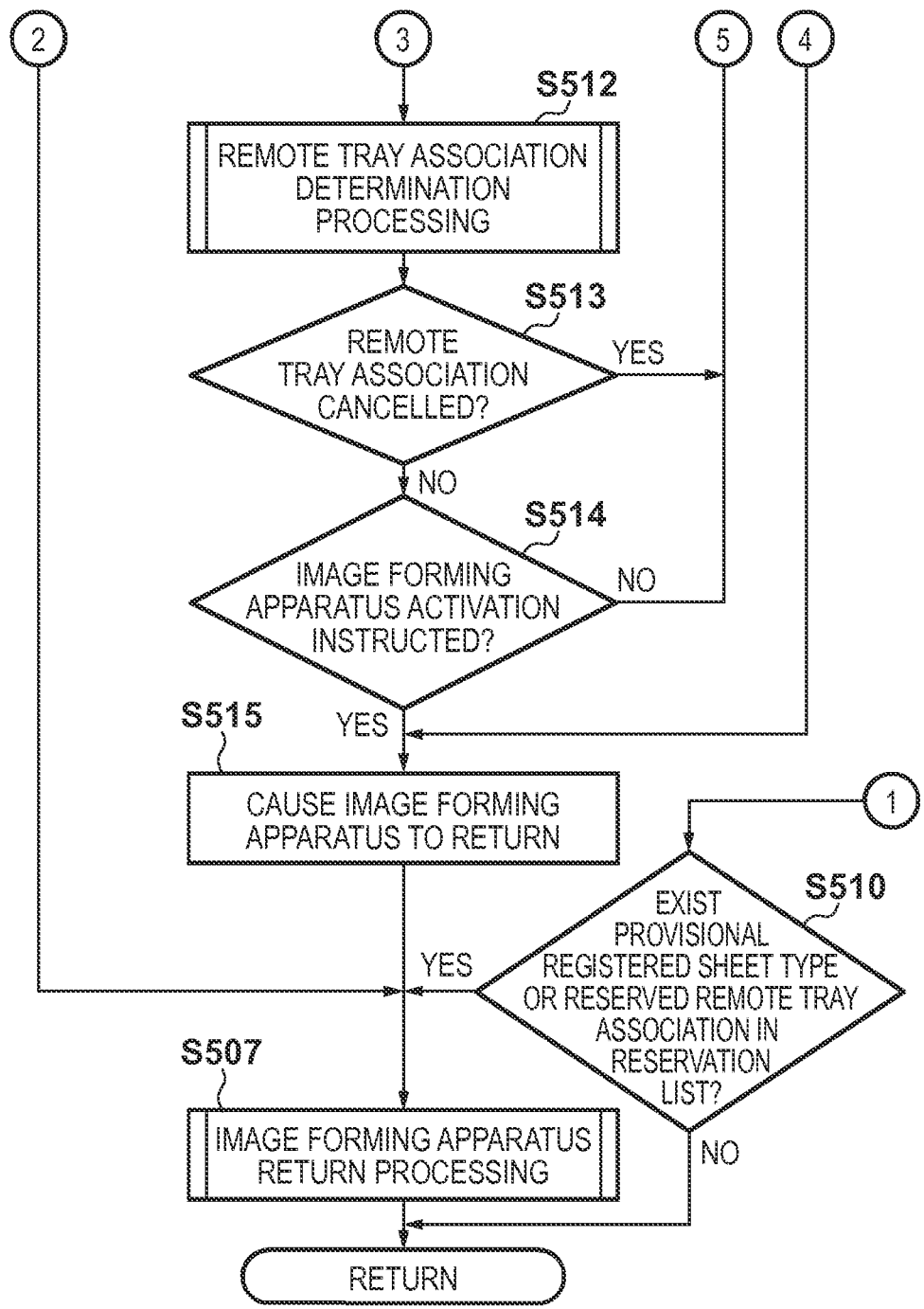

F I G. 10
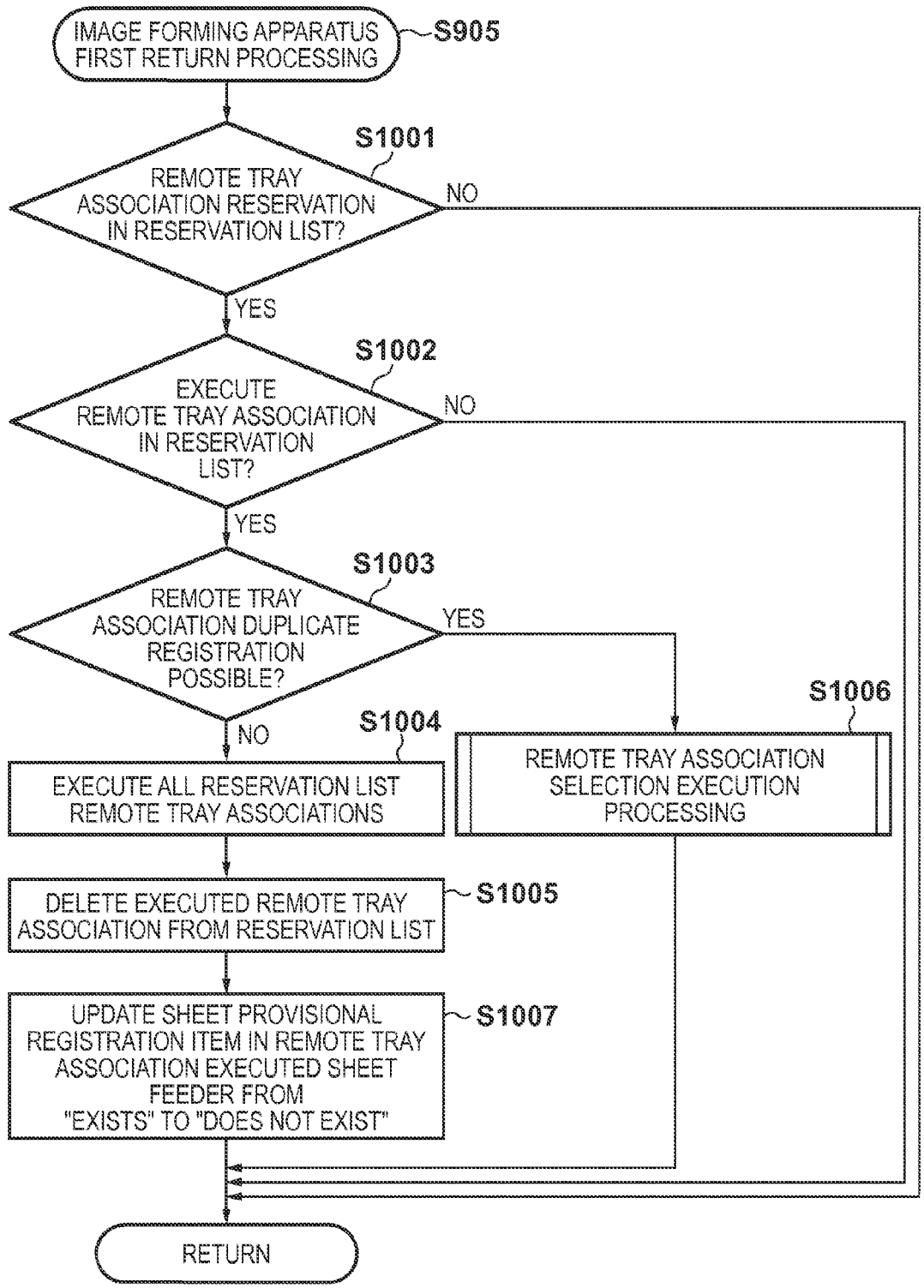

FIG. 15A

| ID | SHEET NAME | SHEET SIZE | SYNCHRONIZED WITH IMAGE FORMING APPARATUS |
|---|---|---|---|
| 0001 | PLAIN PAPER | A4 | DONE |
| 0002 | THICK PAPER | A4 | DONE |
| 0003 | TAB PAPER | LTR | DONE |
| | | | |
| | | | |

FIG. 15B

| ID | SHEET NAME | SHEET SIZE |
|---|---|---|
| 0001 | PLAIN PAPER | A4 |
| 0002 | THICK PAPER | A4 |
| 0003 | TAB PAPER | LTR |
| | | |
| | | |

FIG. 15C

| ID | SHEET NAME | SHEET SIZE | SYNCHRONIZED WITH IMAGE FORMING APPARATUS |
|---|---|---|---|
| 0001 | PLAIN PAPER | A4 | DONE |
| 0002 | THICK PAPER | A4 | DONE |
| 0003 | TAB PAPER | LTR | DONE |
| 0004 | USER DEFINED PAPER 1 | A4 | NOT YET |
| | | | |

FIG. 16A

| ID | SHEET NAME | SHEET SIZE |
|---|---|---|
| 0001 | PLAIN PAPER | A4 |
| 0002 | THICK PAPER | A4 |
| 0003 | TAB PAPER | LTR |
| 0004 | USER DEFINED PAPER 1 | A4 |
| | | |

FIG. 16B

| ID | SHEET NAME | SHEET SIZE | SYNCHRONIZED WITH IMAGE FORMING APPARATUS |
|---|---|---|---|
| 0001 | PLAIN PAPER | A4 | DONE |
| 0002 | THICK PAPER | A4 | DONE |
| 0003 | TAB PAPER | LTR | DONE |
| 0004 | USER DEFINED PAPER 1 | A4 | DONE |
| | | | |

FIG. 16C

| SHEET FEEDER NUMBER | ID | SHEET SIZE | REMAINING PAPER AMOUNT | SHEET FEEDER TYPE |
|---|---|---|---|---|
| 1 | 0001 | A4 | 200 | NON-ELECTRONIC LOCK TYPE |
| 2 | 0002 | A4 | 100 | NON-ELECTRONIC LOCK TYPE |
| 3 | 0003 | LTR | 100 | NON-ELECTRONIC LOCK TYPE |
| 4 | - | A4 | 0 | NON-ELECTRONIC LOCK TYPE |
| 5 | - | A4 | 0 | ELECTRONIC LOCK TYPE |

F I G. 17A

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | DOES NOT EXIST |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | - | A4 | 0 | NON-ELECTRONIC LOCK TYPE | DOES NOT EXIST |
| 5 | - | A4 | 0 | ELECTRONIC LOCK TYPE | DOES NOT EXIST |

F I G. 17B

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | DOES NOT EXIST |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | 0004 | A4 | 0 | NON-ELECTRONIC LOCK TYPE | DOES NOT EXIST |
| 5 | - | A4 | 0 | ELECTRONIC LOCK TYPE | DOES NOT EXIST |

F I G. 17C

| SHEET FEEDER NUMBER | ID | SHEET SIZE | REMAINING PAPER AMOUNT | SHEET FEEDER TYPE |
|---|---|---|---|---|
| 1 | 0001 | A4 | 200 | NON-ELECTRONIC LOCK TYPE |
| 2 | 0002 | A4 | 100 | NON-ELECTRONIC LOCK TYPE |
| 3 | 0003 | LTR | 100 | NON-ELECTRONIC LOCK TYPE |
| 4 | 0004 | A4 | 0 | NON-ELECTRONIC LOCK TYPE |
| 5 | - | A4 | 0 | ELECTRONIC LOCK TYPE |

F I G. 17D

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | DOES NOT EXIST |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | - | A4 | 0 | NON-ELECTRONIC LOCK TYPE | EXISTS |
| 5 | - | A4 | 0 | ELECTRONIC LOCK TYPE | DOES NOT EXIST |

| ID | SHEET NAME | SHEET SIZE | SYNCHRONIZED WITH IMAGE FORMING APPARATUS |
|---|---|---|---|
| 0001 | PLAIN PAPER | A4 | DONE |
| 0002 | THICK PAPER | A4 | DONE |
| 0003 | TAB PAPER | LTR | DONE |
| 0004 | USER DEFINED PAPER 1 | A4 | DONE |
| 0005 | USER DEFINED PAPER 2 | A4 | NOT YET |

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | EXISTS |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | 0004 | A4 | 150 | NON-ELECTRONIC LOCK TYPE | DOES NOT EXIST |
| 5 | - | A4 | 0 | NON-ELECTRONIC LOCK TYPE | DOES NOT EXIST |

| SHEET FEEDER NUMBER | ID |
|---|---|
| 4 | 0004 |
|  |  |
|  |  |
|  |  |
|  |  |

FIG. 21A

| ID | SHEET NAME | SHEET SIZE | SYNCHRONIZED WITH IMAGE FORMING APPARATUS |
|---|---|---|---|
| 0001 | PLAIN PAPER | A4 | DONE |
| 0002 | THICK PAPER | A4 | DONE |
| 0003 | TAB PAPER | LTR | DONE |
| 0004 | USER DEFINED PAPER 1 | A4 | DONE |
| 0005 | USER DEFINED PAPER 2 | A4 | NOT YET |
| 0006 | USER DEFINED PAPER 3 | A4 | NOT YET |

FIG. 21B

| SHEET FEEDER NUMBER | ID |
|---|---|
| 1 | 0005 |
|  |  |
|  |  |
|  |  |
|  |  |

FIG. 22A

PLEASE SELECT REMOTE TRAY ASSOCIATION
TO PERFORM FOR SHEET FEEDER 1

|  | SHEET TYPE | SHEET SIZE |
|---|---|---|
| 2201 ⦿ | USER DEFINED PAPER 2 | A4 |
| 2202 ○ | USER DEFINED PAPER 3 | A4 |

2203 — [ OK ]　　[ CANCEL ]

FIG. 22B

SHEET SPECIFIED BY PRINTING NOT REGISTERED TO SHEET FEEDER

PLEASE PERFORM SHEET REGISTRATION TO SHEET FEEDER

| SHEET FEEDER NUMBER | ID | SHEET SIZE | REMAINING PAPER AMOUNT | SHEET FEEDER TYPE |
|---|---|---|---|---|
| 1 | 0001 | A4 | 200 | NON-ELECTRONIC LOCK TYPE |
| 2 | 0002 | A4 | 100 | NON-ELECTRONIC LOCK TYPE |
| 3 | 0003 | LTR | 100 | NON-ELECTRONIC LOCK TYPE |
| 4 | - | A4 | 150 | NON-ELECTRONIC LOCK TYPE |
| 5 | - | A4 | 0 | ELECTRONIC LOCK TYPE |

FIG. 24B

| SHEET FEEDER NUMBER | ID | SHEET SIZE | REMAINING PAPER AMOUNT | SHEET FEEDER TYPE |
|---|---|---|---|---|
| 1 | 0001 | A4 | 200 | NON-ELECTRONIC LOCK TYPE |
| 2 | 0002 | A4 | 100 | NON-ELECTRONIC LOCK TYPE |
| 3 | 0003 | LTR | 100 | NON-ELECTRONIC LOCK TYPE |
| 4 | 0004 | A4 | 150 | NON-ELECTRONIC LOCK TYPE |
| 5 | - | A4 | 0 | ELECTRONIC LOCK TYPE |

FIG. 24C

PLEASE SELECT SHEET FEEDER TO REMOTE TRAY ASSOCIATE "USER DEFINED PAPER 1"

|  | SHEET FEEDER NUMBER |
|---|---|
| ○ | 4 |
| ● | 5 |

2401

2402 — [ OK ]  [ CANCEL ]

| SHEET FEEDER NUMBER | ID |
|---|---|
| 4 | 0004 |
| 5 | 0004 |
| | |
| | |
| | |

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | DOES NOT EXIST |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | - | A4 | 150 | NON-ELECTRONIC LOCK TYPE | EXISTS |
| 5 | - | A4 | 0 | NON-ELECTRONIC LOCK TYPE | EXISTS |

F I G. 26A

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | EXISTS |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | - | A4 | 150 | NON-ELECTRONIC LOCK TYPE | EXISTS |
| 5 | 0004 | A4 | 400 | ELECTRONIC LOCK TYPE | DOES NOT EXIST |

F I G. 26B

| SHEET FEEDER NUMBER | ID | SHEET SIZE | REMAINING PAPER AMOUNT | SHEET FEEDER TYPE |
|---|---|---|---|---|
| 1 | 0001 | A4 | 200 | NON-ELECTRONIC LOCK TYPE |
| 2 | 0002 | A4 | 100 | NON-ELECTRONIC LOCK TYPE |
| 3 | 0003 | LTR | 100 | NON-ELECTRONIC LOCK TYPE |
| 4 | - | A4 | 150 | NON-ELECTRONIC LOCK TYPE |
| 5 | 0004 | A4 | 400 | ELECTRONIC LOCK TYPE |

F I G. 26C

| SHEET FEEDER NUMBER | ID |
|---|---|
| 1 | 0005 |
| 1 | 0006 |
|  |  |
|  |  |
|  |  |

FIG. 27A

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0001 | A4 | 200 | NON-ELECTRONIC LOCK TYPE | DOES NOT EXIST |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | 0004 | A4 | 150 | NON-ELECTRONIC LOCK TYPE | DOES NOT EXIST |
| 5 | - | A4 | 0 | NON-ELECTRONIC LOCK TYPE | DOES NOT EXIST |

FIG. 27B

CANNOT PERFORM DUPLICATE REMOTE TRAY ASSOCIATION RESERVATION FOR SAME SHEET FEEDER.

| ID | SHEET NAME | SHEET SIZE | SYNCHRONIZED WITH IMAGE FORMING APPARATUS |
|---|---|---|---|
| 0001 | PLAIN PAPER | A4 | DONE |
| 0002 | THICK PAPER | A4 | DONE |
| 0003 | TAB PAPER | LTR | DONE |
| 0004 | USER DEFINED PAPER 1 | A4 | DONE |
| 0005 | USER DEFINED PAPER 2 | A4 | DONE |
| 0006 | USER DEFINED PAPER 3 | A4 | DONE |

FIG. 28A

| ID | SHEET NAME | SHEET SIZE |
|---|---|---|
| 0001 | PLAIN PAPER | A4 |
| 0002 | THICK PAPER | A4 |
| 0003 | TAB PAPER | LTR |
| 0004 | USER DEFINED PAPER 1 | A4 |
| 0005 | USER DEFINED PAPER 2 | A4 |
| 0006 | USER DEFINED PAPER 3 | A4 |

FIG. 28B

| SHEET FEEDER NUMBER | ID |
|---|---|
| 1 | 0006 |
|  |  |
|  |  |
|  |  |
|  |  |

FIG. 28C

| SHEET FEEDER NUMBER | ID | SHEET SIZE | REMAINING PAPER AMOUNT | SHEET FEEDER TYPE | SHEET PROVISIONAL REGISTRATION |
|---|---|---|---|---|---|
| 1 | 0005 | A4 | 200 | NON-ELECTRONIC LOCK TYPE | EXISTS |
| 2 | 0002 | A4 | 100 | NON-ELECTRONIC LOCK TYPE | DOES NOT EXIST |
| 3 | 0003 | LTR | 100 | NON-ELECTRONIC LOCK TYPE | DOES NOT EXIST |
| 4 | 0004 | A4 | 150 | NON-ELECTRONIC LOCK TYPE | DOES NOT EXIST |
| 5 | - | A4 | 0 | NON-ELECTRONIC LOCK TYPE | DOES NOT EXIST |

FIG. 28D

| SHEET FEEDER NUMBER | ID | SHEET SIZE | REMAINING PAPER AMOUNT | SHEET FEEDER TYPE |
|---|---|---|---|---|
| 1 | 0005 | A4 | 200 | NON-ELECTRONIC LOCK TYPE |
| 2 | 0002 | A4 | 100 | NON-ELECTRONIC LOCK TYPE |
| 3 | 0003 | LTR | 100 | NON-ELECTRONIC LOCK TYPE |
| 4 | 0004 | A4 | 150 | NON-ELECTRONIC LOCK TYPE |
| 5 | - | A4 | 0 | ELECTRONIC LOCK TYPE |

FIG. 29A

SETTING/REGISTRATION

SHEET SETTING TO SHEET FEEDER ~2901

SHEET TYPE SETTING MANAGEMENT ~2902

CANCEL    OK

FIG. 29B

STATUS CONFIRMATION/CANCEL

<SHEET TYPE SETTING MANAGEMENT>

| NAME | SIZE |
|---|---|
| ☐ PLAIN PAPER | A4 |
| ☐ THICK PAPER | A4 |
| ☐ TAB PAPER | LETTER |

2903 — NEW REGISTRATION    DELETE

CANCEL    OK

PRINT CONTROL APPARATUS FOR CAUSING A PRINTING APPARATUS TO EXECUTE PRINTING BY CONTROLLING THE PRINTING APPARATUS, METHOD OF CONTROLLING THE SAME, AND STORAGE MEDIUM

BACKGROUND OF THE INVENTION

1. Field of the Invention

The present invention relates to a print control apparatus, a method of controlling the same, and a storage medium.

2. Description of the Related Art

Conventionally, print control apparatuses (such as PCs) and image forming apparatuses are provided with a function for registering, and managing, information related to paper types (sheet types) that those apparatuses are available. In these apparatuses, a user registers in the apparatus a sheet type for which independent parameters are set, and the user is able to input a print job by specifying the registered sheet type or a sheet type set in the apparatus in advance. In such a case, the management of the sheet type is performed in the two places of the print control apparatus and the image forming apparatus, and there was no coordination of these. In other words, when performing setting of the sheets for an image forming apparatus, first the sheet type is registered on the image forming apparatus, and a sheet feeder (sheet feeding unit) for which sheets corresponding to the sheet type are set is registered. Then, with the print control apparatus, once again, it was necessary to register the sheet type, and to perform an association between the registered sheet type and the sheet feeder of the image forming apparatus. Accordingly, it was necessary to set the sheet type in the two places of the print control apparatus and the image forming apparatus when the user used a new sheet.

In Japanese Patent Laid-Open No. 2007-241425, in order to resolve this, configuration is taken such that information of the sheet type, managed by each the print control apparatus and the image forming apparatus, is periodically exchanged, and such that sheet type registration processing that previously had required registering the new sheet type two times could be performed in one time. Furthermore, it becomes possible to perform an association between a sheet type and a sheet feeder that had been previously performed by the image forming apparatus on the print control apparatus. It is recited that with this, the user, without going to the place of the image forming apparatus, can register the sheet type to the image forming apparatus, and can register the registered sheet type to the sheet feeder, by operating the print control apparatus.

However, in Japanese Patent Laid-Open No. 2007-241425, in a case where the image forming apparatus is transitioned into a power saving state, there is the following problem. For example, when the image forming apparatus is in the power saving state, the user registers a new sheet type on the print control apparatus, and the registered sheet type is registered to the sheet feeder. Here, the print control apparatus registers the registered sheet type into its own sheet type DB (database), and registers the sheet type for a sheet type DB that the image forming apparatus manages. With this, the image forming apparatus returns to a normal power state from the power saving state, and performs the registration of the sheet type to the sheet feeder. After that, while a print request to the image forming apparatus is not made, the image forming apparatus waits in the normal power state for a fixed time period until print processing is initiated. As a result, unnecessary electric power continues to be consumed on the image forming apparatus.

SUMMARY OF THE INVENTION

An aspect of the present invention is to eliminate the above-mentioned problems with conventional technology.

A feature of the present invention is to accumulate registrations in a print control apparatus in a case where a sheet type registration on the print control apparatus or a sheet type sheet feeder registration instruction is received in a case where the image forming apparatus is in a power saving state, and to perform a sheet type registration registered in the print control apparatus at a time when the image forming apparatus is activated, or a registration of a sheet type to a sheet feeder.

The present invention in its first aspect provides a print control apparatus for causing a printing apparatus to execute printing by controlling the printing apparatus, the print control apparatus comprising: a storage unit configured to store sheet information; a registration unit configured to register in a list, when the printing apparatus is in a power saving state, sheet information, stored in the storage unit, when an instruction for registering, in the printing apparatus the sheet information in association with a sheet feeder of the printing apparatus is received; and a control unit configured to control such that, when the printing apparatus returns from the power saving state, the sheet information registered in the list by the registration unit is transmitted to the printing apparatus.

The present invention in its second aspect provides a print control apparatus for causing a printing apparatus to execute printing by controlling the printing apparatus, the print control apparatus comprising: a reception unit configured to receive an update of a setting value; a holding unit configured to hold, when the printing apparatus is in a power saving state, when an update of a setting value is received by the reception unit, the updated setting value; a network transmission unit configured to receive an information acquisition request to the printing apparatus; a determination unit configured to determine whether or not the updated setting value, for which synchronization with the printing apparatus is necessary, is held in the holding unit; a notification unit configured to notify, when the determination unit determines that the updated setting value, for which synchronization is necessary, is held, the printing apparatus of the updated setting value; and a control unit configured to control so that, after an update of the setting value by the printing apparatus due to the notification by the notification unit completes, a transfer permission of the acquisition request for the network transmission unit is performed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a flowchart for describing sheet type registration processing by the print control apparatus according to a first embodiment of the present invention.

FIGS. 5A and 5B are flowcharts for describing processing of step S412 of FIG. 4.

FIG. 10 is a flowchart for describing first return processing of step S905 of FIG. 9 when the image forming apparatus returns from the power saving state.

FIGS. 15A-15C depict views illustrating examples of sheet type DBs stored in the print control apparatus and the image forming apparatus according to embodiments.

FIGS. 16A and 16B depict views illustrating examples of the sheet type DBs stored in the image forming apparatus and the print control apparatus according to embodiments.

FIG. 16C depicts a view illustrating an example of a sheet registration DB stored in the image forming apparatus.

FIGS. 17A, 17B and 17D depict views illustrating examples of a sheet registration DB stored in the print control apparatus according to embodiments.

FIG. 17C depicts a view illustrating an example of the sheet registration DB stored in the image forming apparatus according to embodiments.

FIG. 21A depicts a view illustrating an example of the sheet type DB stored in the print control apparatus according to embodiments.

FIG. 21B depicts a view illustrating an example of a remote tray association reservation list.

FIG. 22A depicts a view illustrating an example of a screen for selecting a remote tray association in a case where a plurality of remote tray associations are reserved for the same sheet feeder in a second embodiment.

FIG. 22B depicts a view for showing an example of a screen for instructing a swapping of sheets of a sheet feeder.

FIGS. 24A and 24B depict views illustrating examples of the sheet registration DB stored in the image forming apparatus.

FIG. 24C depicts a view for showing an example of a screen for selecting a remote tray association in a case that the registration for remote tray associating of the same sheet type is performed for a plurality of sheet feed trays.

FIG. 26A depicts a view illustrating an example of the sheet registration DB stored in the print control apparatus.

FIG. 26B depicts a view illustrating an example of the sheet registration DB stored in the image forming apparatus.

FIG. 26C depicts a view illustrating an example of the remote tray association reservation list.

FIG. 27A depicts a view illustrating an example of the sheet registration DB stored in the print control apparatus.

FIG. 27B depicts a view illustrating an example of an alerting screen for indicating that duplicate registration for the same sheet feeder is prohibited.

FIG. 27C depicts a view illustrating an example of the sheet type DB stored in the print control apparatus.

FIG. 28A depicts a view illustrating an example of the sheet type DB stored in the image forming apparatus.

FIG. 28B depicts a view illustrating an example of the remote tray association reservation list.

FIG. 28C depicts a view illustrating an example of the sheet registration DB stored in the print control apparatus.

FIG. 28D depicts a view illustrating an example of the sheet registration DB stored in the image forming apparatus.

FIG. 29A depicts a view for showing an example of a screen for setting sheet type registration and remote tray association.

FIG. 29B depicts a view for showing an example of a screen for registering a sheet type.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
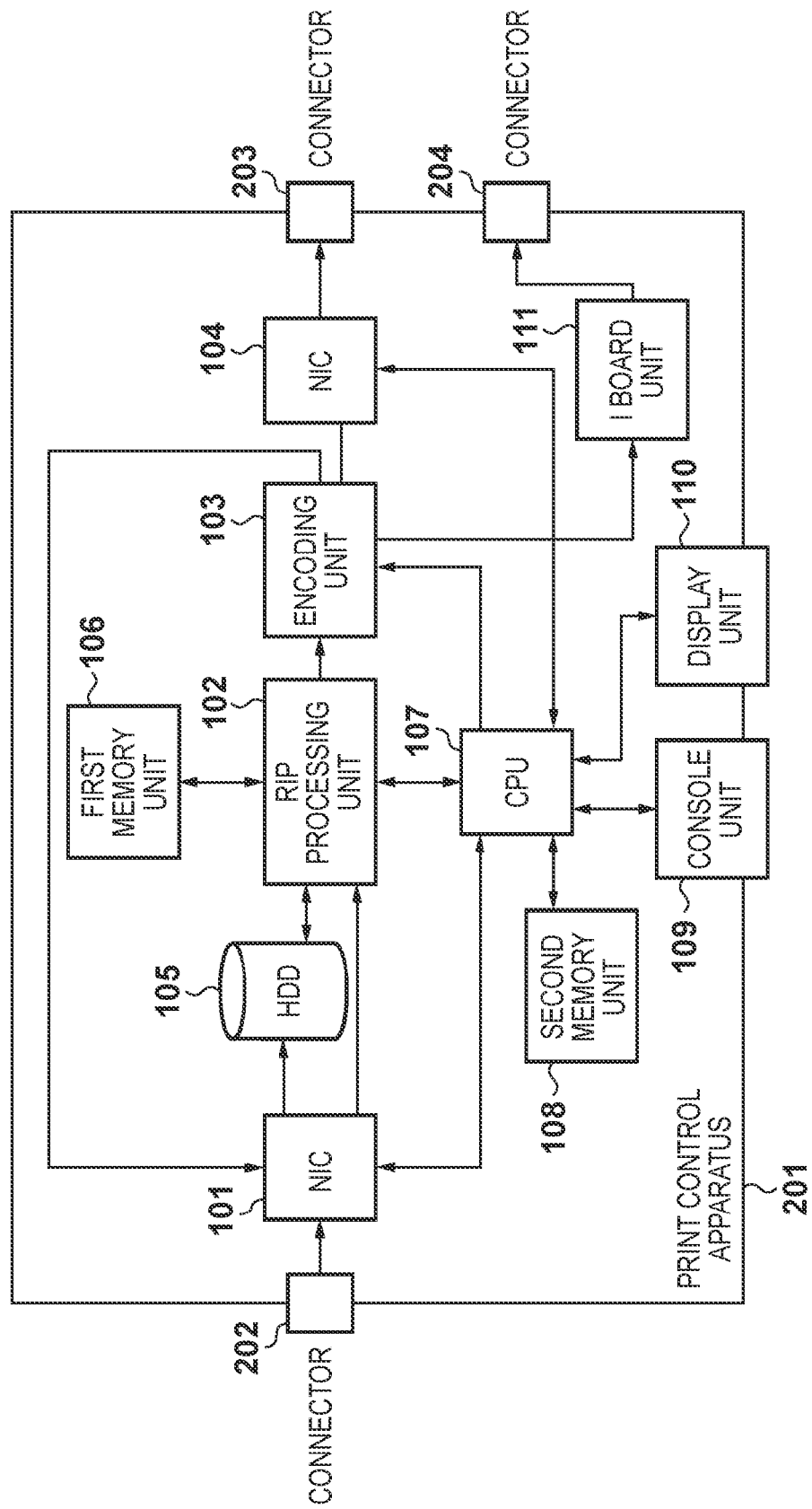
FIG. 1 is a block diagram for showing an overview configuration diagram of a print control apparatus according to embodiments of the present invention.
Figure 2:
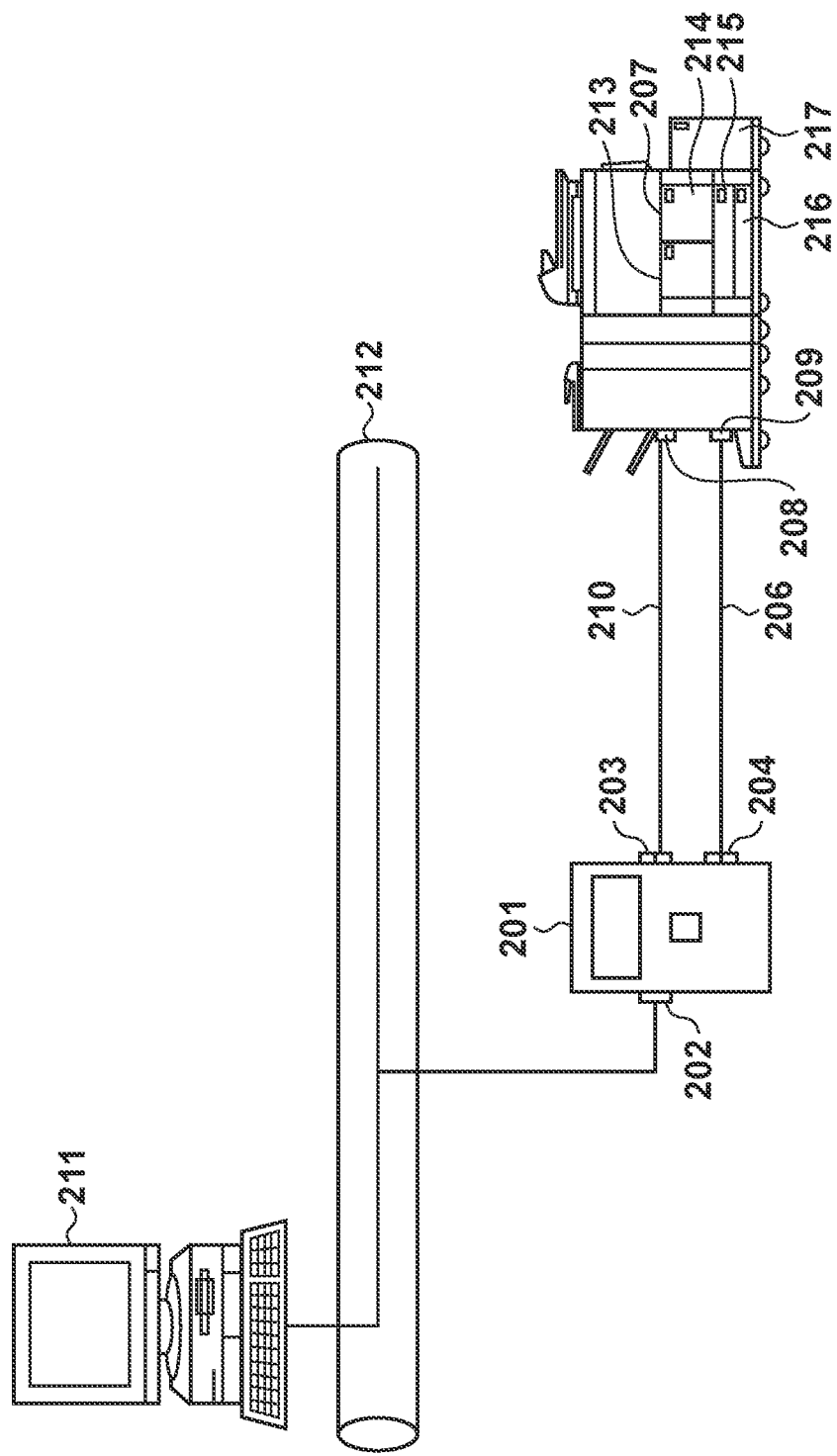
FIG. 2 depicts a view illustrating an example of connection between the print control apparatus and an image forming apparatus according to embodiments.

FIG. 1 is a block diagram for showing an overview configuration diagram of a print control apparatus 201 according to embodiments of the present invention, and FIG. 2 depicts a view of an example of connection between the print control apparatus 201 and an image forming apparatus (printing apparatus) 207 according to embodiments.

In FIG. 1, reference numerals 202, 203 and 204 denote connectors. An NIC (Network Interface Card) 101 controls a low layer level connection with a LAN 212 (FIG. 2). An RIP (Raster Image Processor) 102 transforms received printing language such as PDL or particular (compressed in JBIG) data into a raster image. An encoding unit 103 transforms the raster image into print data of a format that the image forming apparatus 207 supports or into a data format. An NIC 104 is a network interface that controls a connection of a low layer or level. An HDD 105 is a hard disk drive for temporarily storing the print data received by the NIC 101. A first memory unit 106 is used by the RIP 102 for image data loading processing. A CPU 107 manages overall control of the print control apparatus 201. A second memory unit 108 is used by the CPU 107 as a temporary save area for programs or data. A console unit 109 comprises buttons, keys, a touch panel, or the like, and is used for a user making an instruction to the print control apparatus 201 by operating it. A display unit 110 is used for displaying messages and various information to the user. Also, an I board unit 111 is an image interface board, and the connector 204 is a connector for this interface. Image data is transferred to the image forming apparatus 207 via the I board unit 111 and the connector 204.

In FIG. 2, a terminal apparatus 211 inputs a print job into the print control apparatus 201 via the network (LAN) 212. Data packets transmitted from the terminal apparatus 211 to the print control apparatus 201 are transmitted over the LAN 212, and fed into the print control apparatus 201 via the connector 202. In the print control apparatus 201, reception processing of a print job is performed by the NIC 101. When the print control apparatus 201 receives print job, writing of the received print job to the HDD 105 is performed as necessary by the control of the CPU 107. This is queuing (spooling) which is performed generally with the objective of improving data transfer speeds. When print jobs are stored in a sequential queue arranged in the HDD 105, printing is executed in the order that the print jobs are stored. The print data of the print job stored in the HDD 105 is read out by the RIP 102 in accordance with an instruction of the CPU 107. Meanwhile, print data for which queuing is not performed is transferred directly to the RIP 102 by an instruction of the CPU 107.

Print data sent to the RIP 102 in this way is converted into raster image data by the RIP 102. Then the encoding unit 103, based on a data format interpretable by the image forming apparatus 207 set in advance, and a format of the received data, encodes into a data format interpretable by the image forming apparatus 207. Because this encoding processing is performed only as necessary, it may be skipped if encoding is not necessary such as in cases where the format of the received print data is interpretable by the image forming apparatus 207 as is. The data encoded in this way is of a format interpretable by the image forming apparatus 207. The format varies depending on the capabilities of an interpretation unit integrated in the image forming apparatus 207 and may be a particular printing language format, a data format compressed by a particular approach such as JBIG, or the like, for example.

Figure 3:
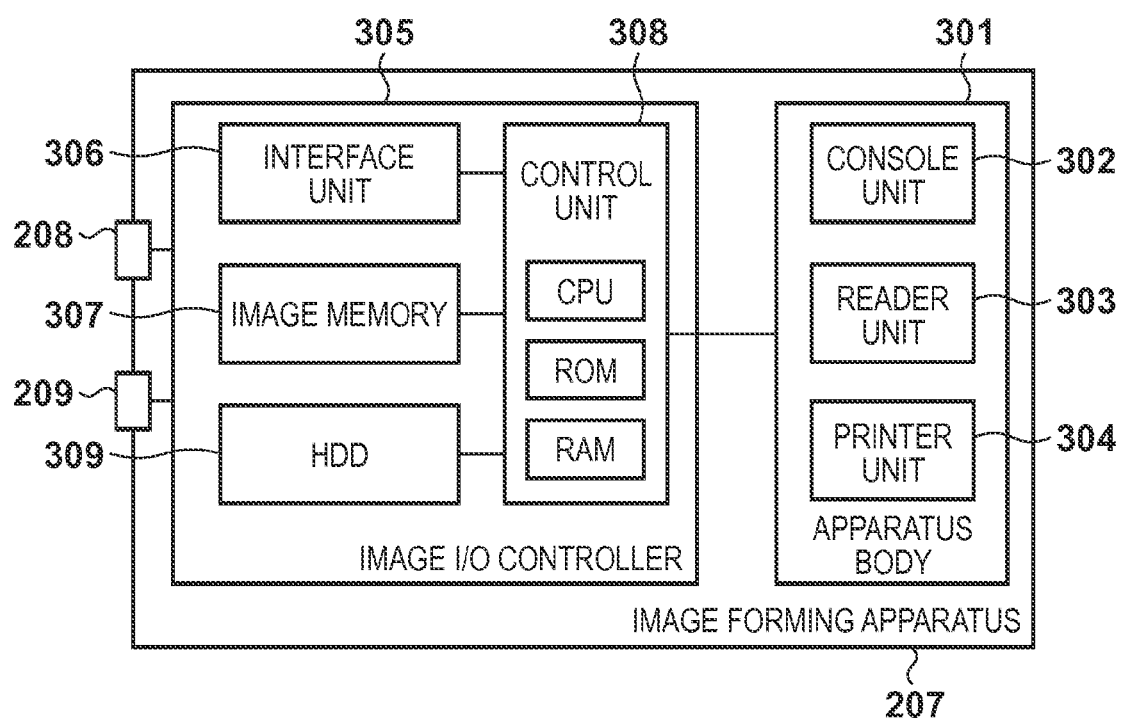
FIG. 3 is a block diagram for showing a configuration of the image forming apparatus according to embodiments.

Data encoded as necessary in this way is once again packetized by the NIC 104 in order to transmit it over a LAN 210, and sent via the connector 203, and a data packet is sent to the image forming apparatus 207 via the LAN 210 and a connector 208. The image forming apparatus 207 that receives the data packet comprises sheet feeders (sheet feed trays) 213-217, and conforming to a printing processing procedure that it has, it performs print processing by feeding sheets from a sheet feeder. Also, the sheet feeders are classified into two types based on the way of opening the sheet feeder upon sheet supplying. One is electronic lock type sheet feeders provided with a way of opening the sheet feeder by unlocking an electronic lock. In a case where the image forming apparatus 207 is in a power saving state, operation is stopped other than a control unit, an interface unit, and a console unit. For this reason, when sheets are set in an electronic lock type sheet feeder, an activation instruction is first made from a console unit 302 (FIG. 3) or from the print control apparatus 201 via an interface unit 306 (FIG. 3) to a control unit 308 (FIG. 3). Then, it is necessary to press a button arranged on the sheet feeder after causing the image forming apparatus 207 to return from the power saving state to the normal power state. The other type is non-electronic lock type sheet feeders. With these it is possible to open the sheet feeder by pressing a button arranged on the sheet feeder without causing the image forming apparatus 207 to return from the power saving state even when the image forming apparatus 207 is in the power saving state.

In other data transfer approaches, data is transferred to the I board unit 111 via the encoding unit 103, the data passes through the connector 204, passes through a dedicated transmission channel 206, and is sent to the image forming apparatus 207 via a connector 209.

FIG. 3 is a block diagram for showing a configuration of the image forming apparatus 207 according to embodiments. The image forming apparatus 207 comprises an apparatus body 301 and an image I/O controller 305.

The apparatus body 301 comprises the console unit 302, a reader unit 303, and a printer unit 304. The console unit 302 is used by a user to operate the apparatus body 301 and the image I/O controller 305. The reader unit 303 scans an image of an original, and outputs image data corresponding to the image to the printer unit 304 or the image I/O controller 305. The printer unit 304 prints an image onto a printing medium (sheet) in accordance with the image data from the reader unit 303 and the image I/O controller 305.

The image I/O controller 305 is connected to the apparatus body 301, and is provided with the interface unit 306, an image memory 307, the control unit 308, and a hard disk (HDD) 309. Note, in the hard disk (HDD) 309, various settings of the image forming apparatus 207 are stored. These settings include an address book, an operation history, user settings, ID settings, network settings, or the like, for example.

The interface unit 306 is an interface with the print control apparatus 201 and the network 210 and the control unit 308. The interface unit 306 receives code data representing an image transferred from the print control apparatus 201 via the connector 209, deploys this received data into image data that can be printed by the printer unit 304 and passes the result to the control unit 308. Note, the connector 209 may take a configuration in which it is connected via a network to the print control apparatus 201 by a network interface. Also, the connector 209 may take a configuration in which it is directly connected via an interface cable, or the like, to the print control apparatus 201 by an interface such as a parallel interface or a USB interface. Also, this cable is not limited to being solitary, and a number of cables may be used.

The control unit 308 includes a CPU, a ROM, a RAM, or the like. The CPU of the control unit 308 controls the flow of data between each of the reader unit 303, the interface unit 306, and the image memory 307, by executing a program stored in the ROM, or another storage medium, having loaded it into the RAM. Note, a configuration may be taken in which, in place of the HDD 309, another non-volatile memory for which data is not deleted even if an electric power supply is turned off is arranged, and data is saved in that non-volatile memory.

Next, explanation will be given for processing for performing sheet type registration according to this embodiment and registration of a sheet type to a sheet feeder on the image forming apparatus 207 (hereinafter referred to as tray association). Furthermore, explanation will be given for processing for performing registration of a sheet type to a sheet feeder from the print control apparatus 201 (hereinafter referred to as the remote tray association).

Firstly, explanation will be given for sheet type registration processing for when the image forming apparatus 207 is in an active state (a normal electric power supply mode), with reference to FIG. 1 through FIG. 4, FIG. 15A through FIG. 16C, and FIG. 29A through FIG. 30B.

The print control apparatus 201 maintains a sheet type DB (hereinafter referred to as the sheet type DB stored in the print control apparatus 201: FIG. 15A) for managing the sheet types in the HDD 105. On the other hand, the image forming apparatus 207 stores a sheet type DB (hereinafter referred to as the sheet type DB stored in the image forming apparatus 207) for managing sheet types as shown in FIG. 15B in the HDD 309. These two sheet type DBs are synchronized via the LAN 210, and in a case where an addition, a modification, or a deletion occurs for either of the sheet type DBs, the other is notified of the state of the sheet type DB. Then, when the state of the sheet type DB is received, each updates the state of its own sheet type DB. Next, explanation will be given for updating of the sheet type DB providing concrete examples.

FIG. 15A depicts a view illustrating an example of an initial state of the sheet type DB stored in the print control apparatus 201. Also, FIG. 15B depicts a view illustrating an example of an initial state of the sheet type DB stored in the image forming apparatus 207. In the sheet type DB stored in the print control apparatus 201 shown in FIG. 15A, three sheet types (plain paper, thick paper, and tab paper) are registered. Here, for the registered sheet types, information indicating an identifier (a sheet ID), a sheet name, a sheet size, and also whether or not a registered sheet type is already registered in the image forming apparatus 207 (is synchronized or not with the image forming apparatus 207) ("done" or "not yet") is added. Also, in the sheet type DB stored in the image forming apparatus 207 of FIG. 15B, three types (plain paper, thick paper, and tab paper) of sheets are registered. To these registered sheet types as well, information relating to the identifier (sheet ID), the sheet name, and the sheet size is attached.

Registration of sheet types is performed via a screen shown in FIG. 29A displayed on the display unit 110 of the print control apparatus 201 via the console unit 109. In the screen of FIG. 29A, when a "sheet type setting management" button 2902 is pressed by the user operating the console unit 109, the CPU 107 displays a screen shown in FIG. 29B on the display unit 110.

FIG. 4 is a flowchart for describing sheet type registration processing by the print control apparatus 201 according to a first embodiment of the present invention. The processing shown in this flowchart is realized by the CPU 107 loading a program stored in the HDD 105 into the second memory unit (RAM) 108 and executing it. Note, this flowchart is for explaining processing that the image forming apparatus 207 performs in a normal electric power supply state.

Figures 30A, 30B:
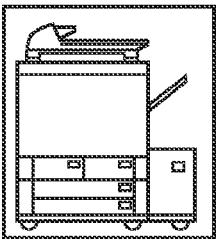
FIG. 30A depicts a view for showing an example of a screen for registering a sheet type.
FIG. 30B depicts a view for showing an example of a screen for performing remote tray association.
Figure 31:
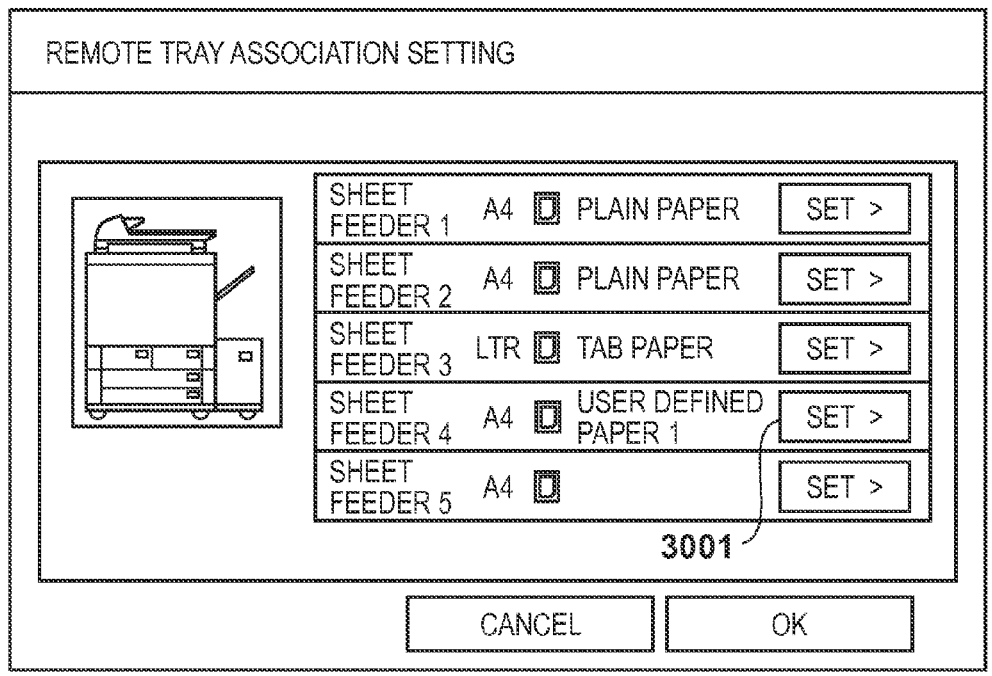
FIG. 31 depicts a view for showing an example of a screen for performing remote tray association.

This processing is initiated in a state in which the screen shown in FIG. 29B is displayed on the display unit 110. When the user via the console unit 109 presses a "new registration" button 2903 and inputs "user defined paper 1" as the sheet name and "A4" as the sheet size, in step S401, the CPU 107 determines that a sheet type registration is instructed and advances the processing to step S402. In step S402, the CPU 107 accesses the sheet type DB stored in the HDD 105. Then, the new ID "0004" is allocated for the registered sheet type (because in FIGS. 15A and 15B, up until the ID "0003" is already registered), under the input sheet name "user defined paper 1" the sheet size "A4" is registered in the sheet type DB. The sheet type DB stored in the print control apparatus 201 after this is registered is shown in FIG. 15C. In FIG. 15C, a sheet type having the ID "0004", the sheet name "user defined paper 1", and the sheet size "A4" is newly registered in the sheet type information of the initial state shown in FIG. 15A, and because at this point in time it is not synchronized with the image forming apparatus 207, synchronization is set to "not yet". Also, the sheet type registration screen after the registration in the screen of FIG. 29B completes is shown in FIG. 30A, and "user defined paper 1" that the user registered is displayed newly. When the registration in this way completes, the CPU 107 advances the processing to step S403.

In step S403, the CPU 107 makes an instruction to the NIC 104, and transmits data of the sheet type DB stored in the print control apparatus 201 to the image forming apparatus 207. The data of the sheet type DB stored in the print control apparatus transmitted is stored in the HDD 309 of the image forming apparatus 207 through the connector 208 via the LAN 210. After that, the control unit 308 of the image forming apparatus 207 accesses the HDD 309, and compares the sheet type DB stored in the image forming apparatus 207 and the received sheet type DB of the print control apparatus. Because, as a result of this comparison, the ID "0004" is added to the sheet type DB of the print control apparatus, the control unit 308 issues the ID "0004", and registers the sheet type in the sheet type DB stored in the image forming apparatus 207.

FIG. 16A depicts a view illustrating an example of the sheet type DB stored in the image forming apparatus 207 updated in this way. As is clear by comparing with FIG. 15B which shows an initial state of the sheet type DB stored in the image forming apparatus 207, in FIG. 16A, "user defined paper 1" having the ID "0004" is newly registered.

When this updating operation of the sheet type DB stored in the image forming apparatus 207 completes, the control unit 308 transmits to the print control apparatus 201 that updating completed via the LAN 210 through the connector 208. With this, the CPU 107 accesses the HDD 105 when the updating completion is received from the image forming apparatus 207, the image forming apparatus synchronization item of the sheet type registered for the ID "0004" is updated from "not yet" to "done", and the processing advances to step S404. FIG. 16B depicts a view illustrating an example of the sheet type DB stored in the print control apparatus 201 after being updated in this way.

In step S404, the CPU 107 determines whether a remote tray association instruction is received. In a case where the remote tray association instruction is received, the CPU 107 advances the processing to step S405. The processing from step S405 is explained later. In a case where the remote tray association instruction is not received in step S404, the CPU 107 advances the processing to step S409. In step S409, the CPU 107 determines whether or not a print instruction is received. If the print instruction is received, the processing proceeds to step S410, the image forming apparatus 207 is controlled and the print processing is executed, whereas in a case where the print instruction is not received, the processing advances to step S411. In step S411, the CPU 107 determines whether the image forming apparatus 207 is transitioned into a power saving state, and in a case where the image forming apparatus 207 is not transitioned into the power saving state, the CPU 107 advances the processing to step S401. On the other hand, if the image forming apparatus 207 is transitioned into the power saving state, the processing proceeds to step S412, and the image forming apparatus 207 executes processing for the case of the power saving state.

Next, explanation will be given for tray association, and remote tray association, in the case that the image forming apparatus 207 is in an active state with reference to FIG. 4, FIG. 16A through FIG. 17D, and FIG. 29A through FIG. 31.

FIG. 16C depicts a view illustrating an example of the sheet registration DB stored in the HDD 309 of the image forming apparatus 207 according to embodiments. The image forming apparatus 207 comprises a function (tray association) for registering information indicating a sheet to each of the sheet feeders 213-217 of the image forming apparatus 207. The sheet registration DB stored in the image forming apparatus stores information of a sheet feeder number, an identifier (ID) of registered sheet types, a sheet size, a remaining paper amount, and also whether or not the mechanism of the sheet feeder is an electronic lock type. For example, for the sheet feeder 213 for which the sheet feeder number is "1", it is shown that "plain paper" which is registered under the ID "0001" in the sheet type DB stored in the print control apparatus 201 is registered. Also, it is shown that the sheet size of the sheet is "A4", the remaining paper amount is "200" sheets, and the type of the sheet feeder is "non-electronic lock type". Similarly, for the sheet feeders 214 and 215 having the sheet feeder numbers "2" and "3", are registered thick paper and tab paper having sheet type IDs "0002" and "0003" respectively. Also, for the sheet feeders 216 and 217 having the sheet feeder numbers "4" and "5", sheets are not registered. When, in this state, a print job using "thick paper" is input into the image forming apparatus 207, sheet feeding from the sheet feeder 214, for which the sheet feeder number is "2" and "thick paper" is registered (FIG. 16A, FIG. 16C), is performed, and printing is executed.

FIG. 17A depicts a view illustrating an example of data of the sheet registration DB stored in the HDD 105 of the print control apparatus 201 according to embodiments. Hereinafter, this sheet registration DB will be referred to as the sheet registration DB stored in the print control apparatus 201.

This sheet registration DB holds information indicating an identifier of the sheet type registered in the sheet feeders 213-217 of the image forming apparatus 207 (ID), a sheet size, a remaining paper amount, a type of sheet feeder, and whether a provisional registration of a sheet is performed. The provisional registration of the sheet will be explained later. Here, in the sheet registration DB stored in the image forming apparatus 207 and the sheet registration DB stored in the print control apparatus 201, the registered IDs, sheet sizes, remaining paper amounts, and sheet feeder types for each sheet feeder are synchronized. For example, when tray association is performed on the image forming apparatus 207, the sheet registration DB stored in the image forming apparatus 207 is updated. Then, the sheet registration DB stored in the image forming apparatus 207 is transmitted from the image forming apparatus 207 to the print control apparatus 201. When the print control apparatus 201 receives the sheet registration DB stored in the image forming apparatus 207, the print control apparatus 201 updates the sheet registration DB stored in the print control apparatus 201. Conversely, it is possible to perform tray association from the print control apparatus 201 to the image forming apparatus 207. This function will be referred to as the remote tray association.

Next, explanation will be given for the remote tray association. Note, it is assumed that the sheet type DB stored in the print control apparatus 201 is the one shown in FIG. 16B, and the sheet type DB stored in the image forming apparatus 207 is the one shown in FIG. 16A. Also, regarding the initial state of the sheet registration DB stored in the image forming apparatus 207, that shown in FIG. 16C is used, and regarding the sheet registration DB stored in the print control apparatus 201, that shown in FIG. 17A is used.

In FIG. 4, in step S404, the CPU 107 determines whether or not the remote tray association is instructed. The registration of remote tray association is performed from the screen shown in FIG. 29A. In other words, when the user presses a "sheet feeder sheet setting" button 2901 by operating the console unit 109, the CPU 107 displays the screen shown in FIG. 30B on the display unit 110. When the user selects "user defined paper 1" (corresponding to the sheet feeder "4") by pressing the setting button 3001 through the console unit 109 on this screen, the CPU 107 determines that the remote tray association instruction is received, and advances the processing to step S405. The pressing of the setting button 3001 is what instructs the registration of a sheet for the sheet feeder 216 (FIG. 2) having the sheet feeder number of "4".

In step S405, the CPU 107 accesses the HDD 105 and determines whether or not the remote tray association that the user is trying to perform is registered already in a reservation list. Regarding reservation of a remote tray association and the reservation list, these will be explained later. In step S405, in a case where the remote tray association in the reservation list is performed, the processing proceeds to step S406, and the CPU 107 performs the selected remote tray association. The processing proceeds to step S407, and the CPU 107 deletes the performed remote tray association from the reservation list. Here, explanation will be given for a case in which the remote tray association in the reservation list is not performed. In such a case, the CPU 107 advances the processing to step S408.

In step S408, the CPU 107 accesses the sheet registration DB (FIG. 17A) stored in the HDD 105 of the print control apparatus 201, and inputs the ID "0004" of the instructed "user defined paper 1" into the ID column of the sheet feeder for which the sheet feeder number is "4". FIG. 17B depicts a view for showing a state in which "user defined paper 1" is registered for the sheet feeder of the sheet feeder number "4". After this, the print control apparatus 201 transmits the sheet registration DB stored in the print control apparatus 201 to the image forming apparatus 207.

With this, when the image forming apparatus 207 receives the sheet registration DB stored in the print control apparatus 201 from the print control apparatus 201, the image forming apparatus 207 updates the sheet registration DB stored in the image forming apparatus 207. FIG. 17C depicts a view illustrating an example of the sheet registration DB stored in the image forming apparatus 207 after the image forming apparatus 207 updates it. When, in this way, the remote tray association completes, the CPU 107 of the print control apparatus 201 causes the display unit 110 to display the screen shown in FIG. 31. Here, comparing to FIG. 30B, it can be seen that "user defined paper 1" is registered in the sheet feeder 216 for which the sheet feeder number of the image forming apparatus 207 is "4". After this, the CPU 107 advances the processing to step S409.

Next, explanation will be given, with reference to FIG. 4 through FIG. 8, FIGS. 15A, 15B, and FIG. 16A through FIG. 20C, for processing in a case where the print control apparatus 201 receives sheet type registration and remote tray association when the image forming apparatus 207 is in a power saving state, which is a feature of this embodiment.

Firstly, regarding the initial state, the state of the sheet type DB stored in the image forming apparatus 207 is assumed to be that shown in FIG. 15B, and the state of the sheet type DB stored in the print control apparatus 201 it is assumed to be that shown in FIG. 15A. Furthermore, the sheet registration DB stored in the image forming apparatus 207 is as shown in FIG. 16C, and the sheet registration DB stored in the print control apparatus 201 is assumed to be as shown in FIG. 17A.

Firstly, explanation will be given for processing of the print control apparatus 201 when a sheet type registration instruction is made when the image forming apparatus 207 is in the power saving state, and the registration instruction is cancelled. Explanation regarding the processing is performed from step S401 of FIG. 4.

In step S401, the CPU 107 determines whether registration of the sheet type is instructed. In a case where registration of the sheet type is not instructed, the processing advances to step S404. In step S404, the CPU 107 determining whether or not a remote tray association instruction is received. In a case where the remote tray association instruction is not received, the processing advances to step S409. In step S409, the CPU 107 determines whether or not a print instruction is received. In a case where the print instruction is not received, the CPU 107 advances the processing to step S411. In step S411, the CPU 107 determines whether or not the image forming apparatus 207 is transitioned into the power saving state. Here, in a case where the CPU 107 determines that the image forming apparatus 207 is transitioned into the power saving state, the CPU 107 advances the processing to step S412. Next, explanation will be given for details of the processing of step S412 with reference to FIGS. 5A and 5B.

Figure 5A:
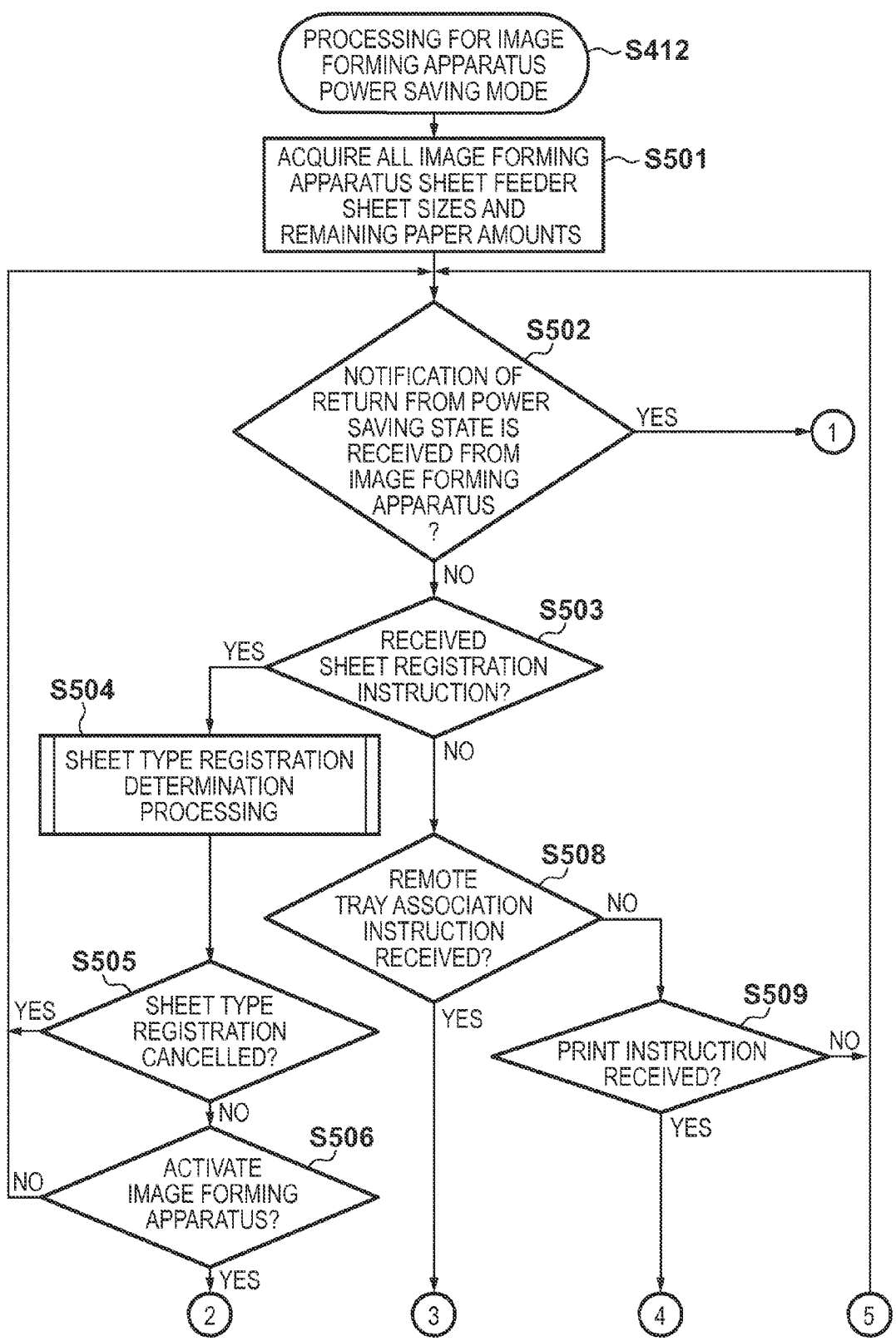

FIGS. 5A and 5B are flowcharts for describing processing of the print control apparatus 201 in a case where the image forming apparatus 207 is in the power saving state in step S412 of FIG. 4.

In step S501, the CPU 107 makes a request to the image forming apparatus 207 for the sheet sizes and the remaining paper amounts housed in all of the sheet feeders 213-217 by making an instruction to the NIC 104. The request is stored in the HDD 309 of the image forming apparatus 207 through the connector 208 via the LAN 210. After that, in the image forming apparatus 207, the control unit 308 accesses the HDD 309, and confirms the request for all of the sheet feeders 213-217 sheet sizes and remaining paper amounts. Then, the control unit 308 of the image forming apparatus 207 accesses the sheet registration DB (FIG. 16C) stored in the HDD 309, and acquires the sheet sizes and the remaining paper amounts of all of the sheet feeders 213-217. Furthermore, the control unit 308 transmits the acquired result via the LAN 210 through the connector 208 to the print control apparatus 201.

When the sheet sizes and the remaining paper amounts of all of the sheet feeders 213-217 are received from the image forming apparatus 207, the CPU 107 accesses the HDD 105 and updates the sheet sizes and the remaining paper amounts of the sheet feeders of the sheet registration DB.

FIG. 17A depicts a view illustrating an example of data of the sheet registration DB stored in the print control apparatus 201 after updating completion.

After this, the processing is advanced to step S502. In step S502, the CPU 107 determines whether or not a notification of return from the power saving state is received from the image forming apparatus 207. In a case where the notification of return from the power saving state is not received from the image forming apparatus 207, the processing is advanced to step S503. In step S503, the CPU 107 displays a screen shown in FIG. 29B when the user activates the previously described screen shown in FIG. 29A by operating the console unit 109, and the "sheet feeder sheet setting" button 2901 is pressed. Then, the "new registration" button 2903 is pressed, and "user defined paper 1" is input as the sheet name, and "A4" is input as the sheet size. In such a case, the CPU 107 advances the processing from step S503 to step S504. In step S504, the CPU 107 performs sheet type registration determination processing. Details of the processing of step S504 are shown in a flowchart of FIG. 6.

Figure 6:
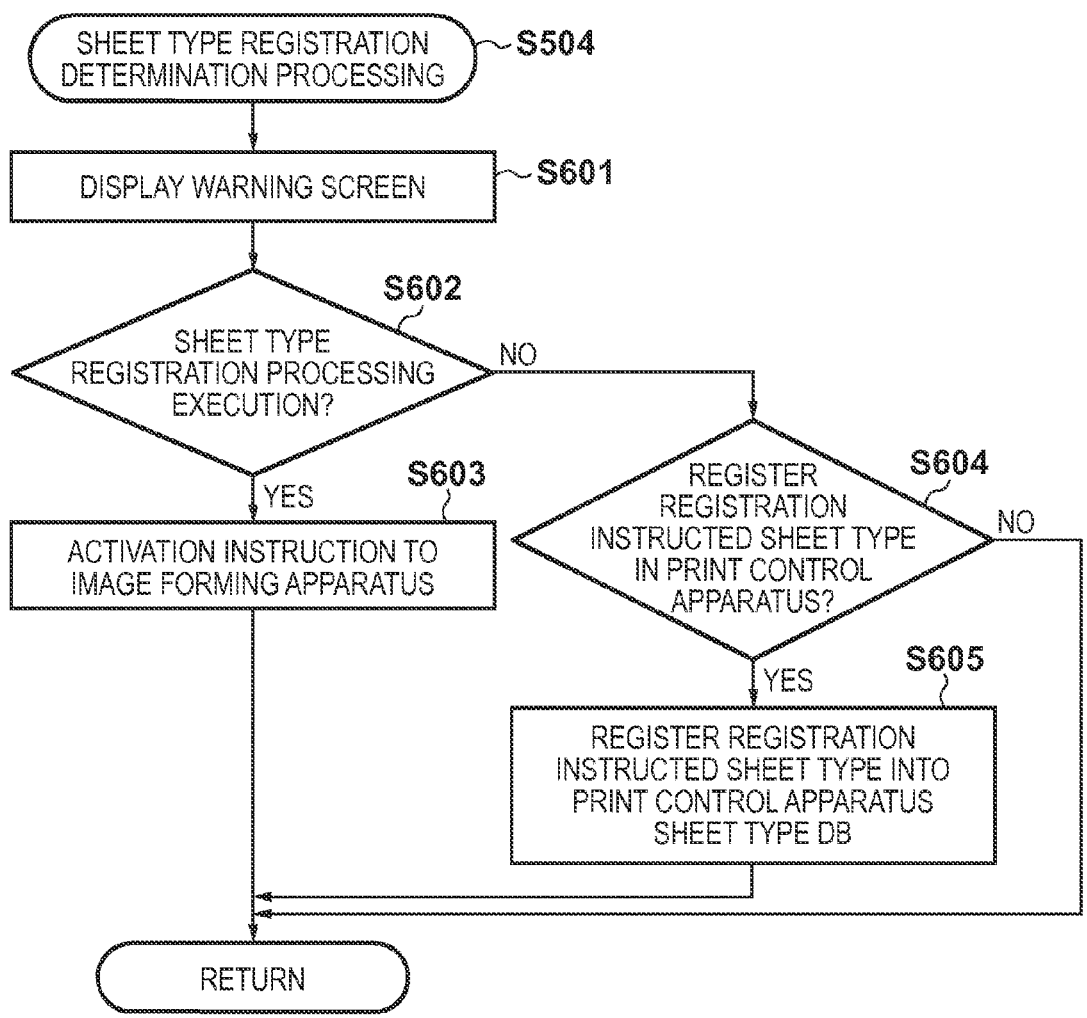
FIG. 6 is a flowchart for describing sheet registration processing of step S504 of FIG. 5A.

FIG. 6 is a flowchart for describing sheet registration processing of step S504 of FIG. 5A.

Figures 18A, 18B:
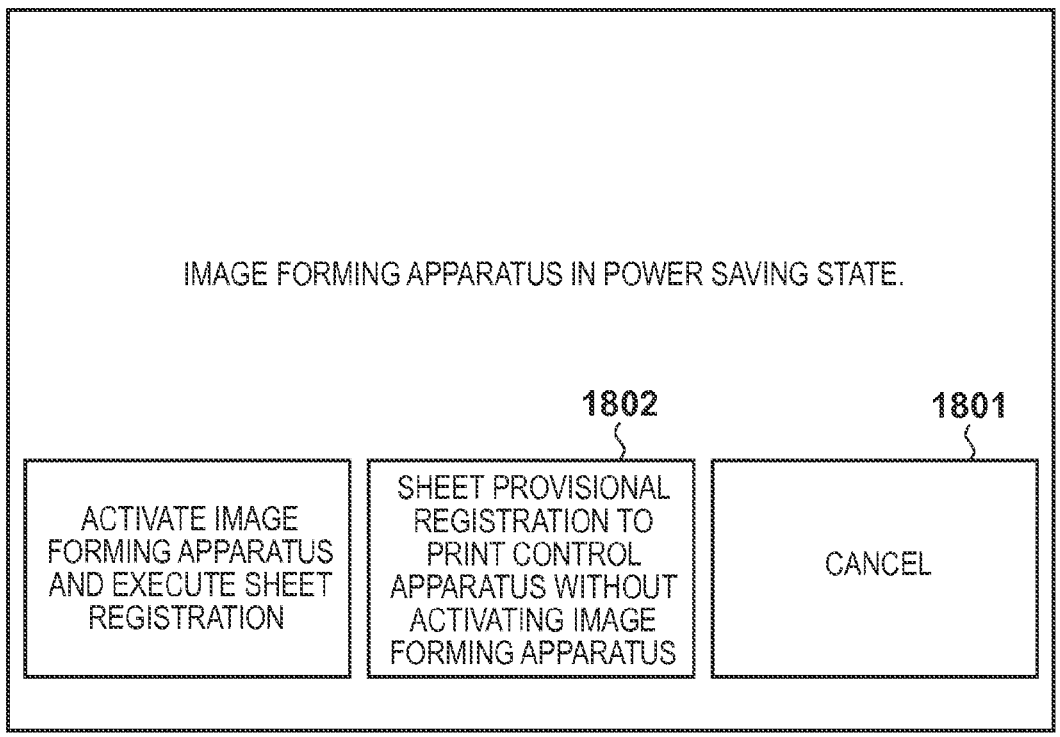
FIG. 18A depicts a view illustrating an example of an alerting screen when a sheet registration is instructed when the image forming apparatus according to embodiments is in a power saving state.
FIG. 18B depicts a view illustrating an example of the sheet type DB stored in the print control apparatus.

In step S601, the CPU 107 causes a screen shown in FIG. 18A to display on the display unit 110. FIG. 18A depicts a view for showing an example of a screen for warning that the image forming apparatus is in the power saving state. In this screen, because the image forming apparatus 207 is in the power saving state, it can be instructed whether to cause the image forming apparatus 207 to return to the normal power state and perform a sheet registration, whether to perform a provisional registration without causing the image forming apparatus 207 to return to the normal power state, or whether to cancel the sheet registration processing.

In this screen, when the user presses a cancel button 1801, the CPU 107 writes to the HDD 105 that cancel is selected, and advances the processing to step S602. In step S602, the CPU 107 determines whether execution of the sheet registration processing is instructed. In a case where the CPU 107, in step S602, determines that execution of sheet registration is not instructed, the CPU 107 advances the processing to step S604, and determines whether an instruction is performed for executing a provisional registration of a sheet into the print control apparatus 201 without causing the image forming apparatus 207 to activate. In such a case, because cancel is instructed, the CPU 107 terminates the sheet registration determination processing, and advances the processing to step S505 of FIG. 5A. In step S505, the CPU 107 determines whether the registration of the sheet is cancelled. Here, because the registration of the sheet is cancelled, the CPU 107 advances the processing to step S502.

Next, explanation will be given for processing of the print control apparatus 201 in a case where, when the image forming apparatus 207 is in the power saving state, a sheet registration instruction is made on the print control apparatus 201, and an instruction is made for registering a sheet in the print control apparatus 201 without causing the image forming apparatus 207 to activate. Such a case, corresponds to a case where, in FIG. 18A, a button 1802 is pressed. Explanation relating to this processing is performed from step S401 of FIG. 4. In this case, the processing proceeds through step S401, step S404, step S409, step S411, step S412, step S501 through step S504, and step S601, but details of these are omitted.

When, in step S601, the CPU 107 determines that the user pressed a "sheet provisional registration to print control apparatus without activating image forming apparatus" button 1802 on the screen of FIG. 18A, something to that effect is written into the HDD 105, and the CPU 107 advances the processing to step S602. In step S602, the CPU 107 determines whether sheet registration processing execution is instructed. When, in step S602, the execution of the sheet registration processing is instructed, the CPU 107 advances the processing to step S603, makes an instruction such that the image forming apparatus 207 returns to the normal electric power supply state, and the processing completes. Here, because the execution of the sheet registration is not instructed, the CPU 107 advances the processing to step S604. In step S604, the CPU 107 determines whether the instruction for executing the sheet registration to the print control apparatus 201 without causing the image forming apparatus 207 to activate is performed. In a case where an instruction is made for executing the sheet registration to the print control apparatus 201 without causing the image forming apparatus 207 to activate, the CPU 107 advances the processing to step S605. In step S605, the CPU 107 accesses the sheet type DB stored in the HDD 105. Then, the new ID "0004" is allocated, and the input sheet name "user defined paper 1" and sheet size "A4" are registered into the sheet type DB. The sheet type DB stored in the print control apparatus 201 after these are thus registered, is shown in FIG. 15C.

When, the registration of the sheet type completes, the CPU 107 terminates the processing without synchronizing with the sheet type DB stored in the image forming apparatus 207, and advances the processing to step S505. In step S505, the CPU 107 determines whether the registration of the sheet type is cancelled. In this case, because the registration of the sheet type is not cancelled, the CPU 107 advances the processing to step S506. In step S506, the CPU 107 determines whether or not an instruction for causing the image forming apparatus 207 to activate is made. Here, because the instruction causing the image forming apparatus 207 to activate is not made, the CPU 107 advances the processing to step S502.

In this way, if the image forming apparatus 207 is in the power saving state when the "sheet feeder sheet setting" button 2901 is pressed on the print control apparatus 201, a sheet type wished to be registered to the image forming apparatus 207 in the sheet type DB stored in the print control apparatus 201 can be provisionally registered. In this case, because the image forming apparatus 207 is not caused to be activated, the image forming apparatus 207 stays in the power saving state.

Next, explanation will be given for processing of the print control apparatus 201 when the image forming apparatus 207 is in the power saving state, when the remote tray association is instructed on the print control apparatus 201, and a cancellation of the remote tray association is instructed. Explanation regarding this processing is initiated from step S401 of FIG. 4, and processing proceeds through step S404, step S409, step S411 through step S412, step S501 through step S503, and step S508, but the details of these are omitted.

When the user makes an instruction so that "user defined paper 1" be registered in the sheet feeder 216 for the number "4" by operating the screens of FIG. 29A and FIG. 30B from the console unit 109, the CPU 107 advances the processing to step S512. In step S512, remote tray association determination processing is performed. The details of this processing is shown in FIG. 7.

Figure 7:
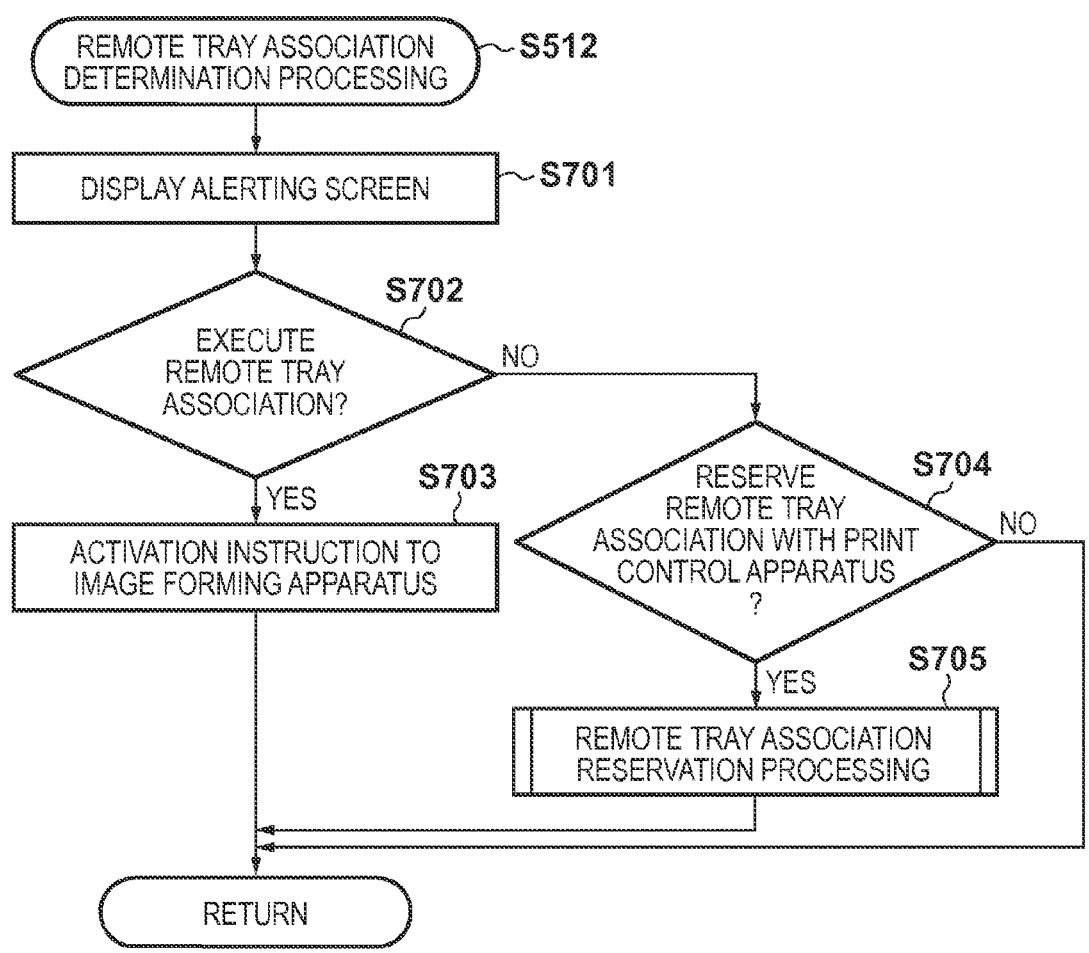
FIG. 7 is a flowchart for describing remote tray association determination processing of step S512 of FIG. 5B.

FIG. 7 is a flowchart for describing the remote tray association determination processing of step S512 of FIG. 5B.

Figure 19A:
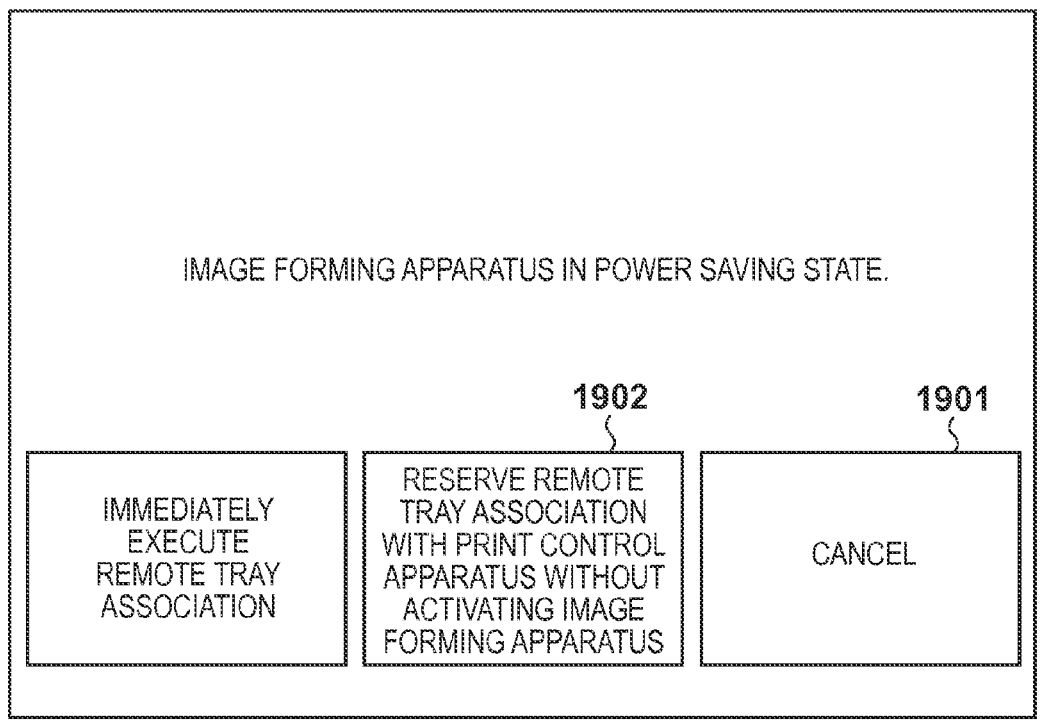
FIG. 19A depicts a view illustrating an example of an alerting screen on the print control apparatus of embodiments when a remote tray association is instructed when the image forming apparatus is in a power saving state.

In step S701, the CPU 107 causes an alerting screen shown in FIG. 19A to display on the display unit 110. In a case where the user presses a cancel button 1901 on the alerting screen, the CPU 107 writes that cancellation is selected into the HDD 105, and advances the processing to step S702. In step S702, the CPU 107 determines whether a remote tray association execution instruction was made. When, in step S702, the remote tray association execution instruction was made, the CPU 107 advances the processing to step S703, makes an instruction such that the image forming apparatus 207 returns to the normal electric power supply state, and the processing completes.

Here, because the remote tray association execution instruction is not made, the processing advances to step S704. In step S704, the CPU 107 determines whether the processing for reserving remote tray association with the print control apparatus 201 is selected. Here, because the processing for reserving remote tray association with the print control apparatus 201 is not selected, the remote tray association determination processing is terminated, and the CPU 107 advances the processing to step S513 of FIG. 5B. In step S513, the CPU 107 advances the processing to step S502 because the remote tray association instruction is cancelled.

Next, explanation will be given for processing in a case that, when the image forming apparatus 207 is in the power saving state, the remote tray association is instructed on the print control apparatus 201, and instruction is made so as to reserve the remote tray association in the remote tray association reservation list. Explanation relating to this processing, which initiates from step S401 of FIG. 4, and proceeds through step S404, step S409, step S411 through step S412, step S501 through step S503, step S508, step S512 and step S701 omits the details of the processing of these steps.

Explanation will be given for a case in which, in step S701, the user presses a "reserve remote tray association with print control apparatus without activating image forming apparatus" button 1902 in the screen of FIG. 19A. Here, in step S701, the CPU 107 writes into the HDD 105 that it is selected that remote tray association to the print control apparatus without activating the image forming apparatus be reserved, and advances the processing to step S702. In step S702, the CPU 107 determines whether the instruction for executing the remote tray association is performed. Here, because an instruction for executing the remote tray association is not made, the CPU 107 advances the processing to step S704. In step S704, the CPU 107 determines whether an instruction reserving the remote tray association with the print control apparatus is performed. Here, because the instruction for reserving the remote tray association with the print control apparatus is made, the CPU 107 advances the processing to step S705. In step S705, the remote tray association reservation processing is performed. Details of this processing are shown in FIG. 8.

Figure 8:
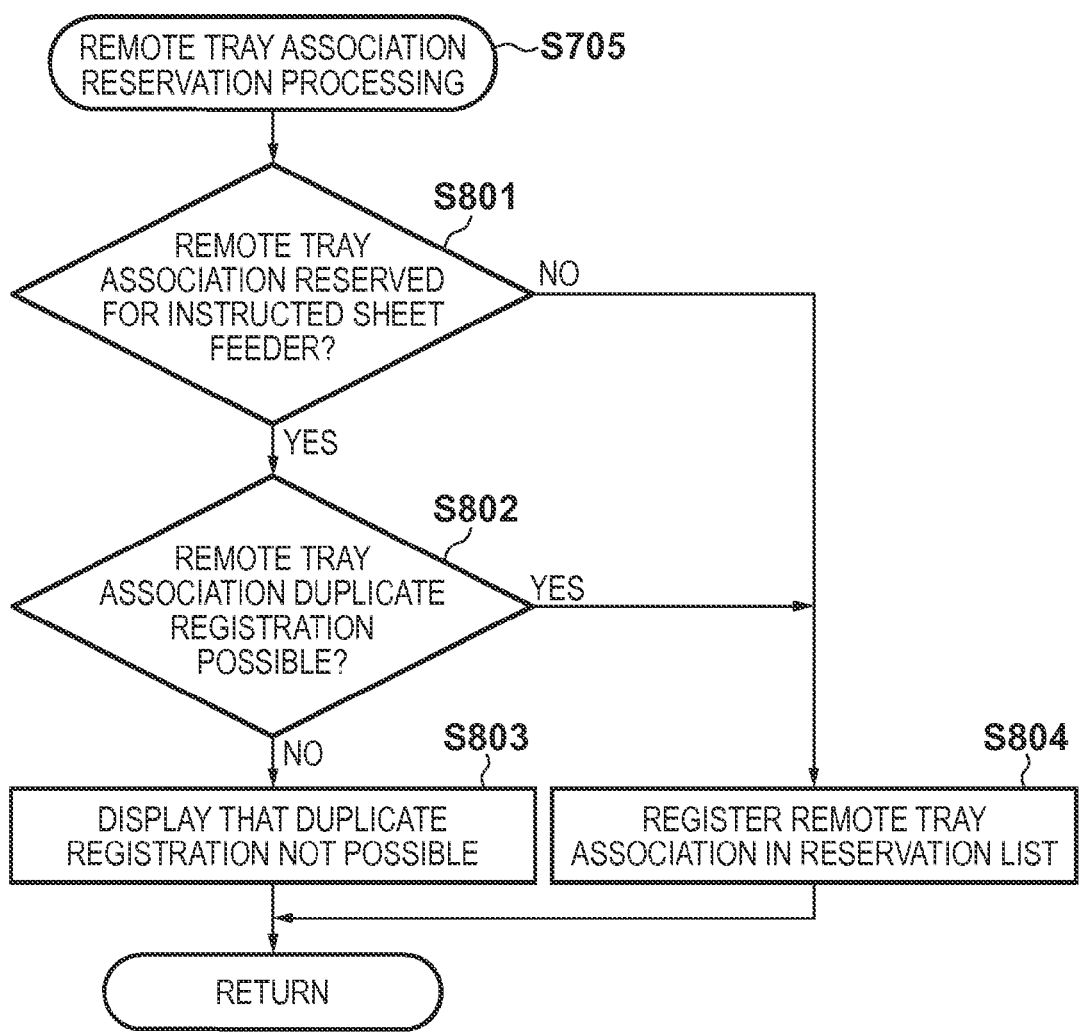
FIG. 8 is a flowchart for describing remote tray association reservation processing of step S705 of FIG. 7.

FIG. 8 is a flowchart for describing remote tray association reservation processing of step S705 of FIG. 7.

In step S801, the CPU 107 determines whether or not the remote tray association is reserved already for the sheet feeder for which the remote tray association is instructed. For example, in a case where the remote tray association for the sheet feeder 216 having the number "4" is not reserved, the CPU 107 advances the processing to step S804. In step S804, the CPU 107 registers the sheet feeder number "4" of the sheet feeder 216 that is instructed, and the sheet ID "0004" for which the registration instruction is made, into the remote tray association reservation list in the HDD 105.

Figures 20A, 20B, 20C:
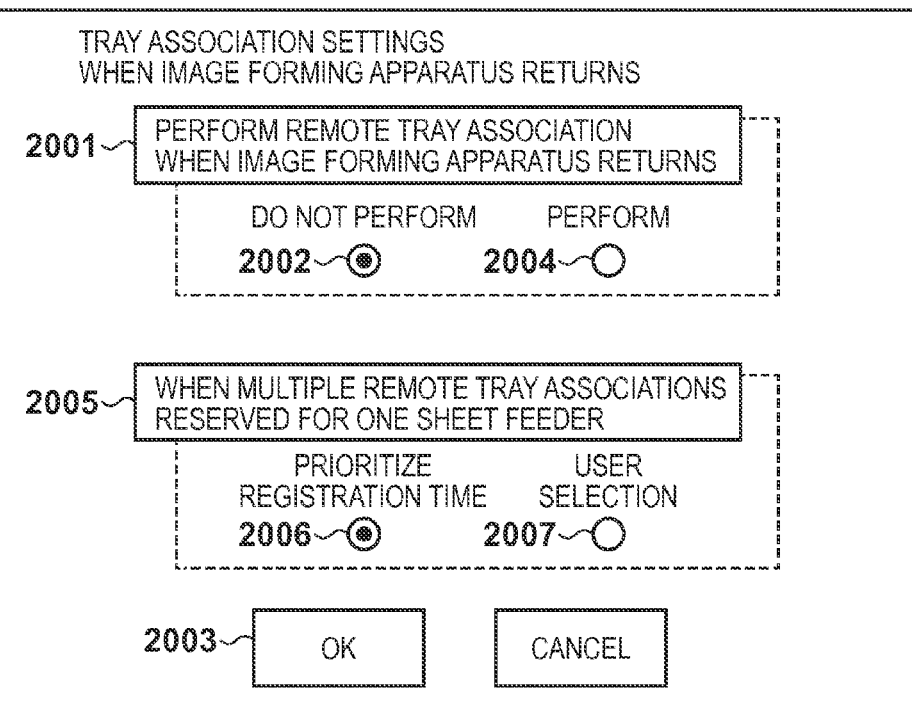
FIG. 20A depicts a view illustrating an example of the sheet registration DB stored in the print control apparatus according to embodiments.
FIG. 20B depicts a view illustrating an example of a remote tray association reservation list.
FIG. 20C depicts a view illustrating an example of a setting screen determining the processing of reserved remote tray association

FIG. 20B depicts a view illustrating an example of a reservation list of remote tray association registered in step S804.

Furthermore, the CPU 107 accesses the sheet registration DB stored in the HDD 105 (stored in the print control apparatus 201), and updates the sheet provisional registration item of the sheet feeder 216 having the number "4" to "exists". A state in which updating of the sheet registration DB stored in the print control apparatus 201 completed is shown in FIG. 17D.

When updating of the sheet registration DB stored in the print control apparatus 201 completes, the remote tray association reservation processing is terminated, and the processing is advanced to step S513 of FIG. 5B. In step S513, the CPU 107 determines whether the remote tray association instruction is cancelled. Because the remote tray association instruction is not cancelled here, the processing is advanced to step S514. In step S514, the CPU 107 determines whether an activation of the image forming apparatus 207 is instructed. Because an activation of the image forming apparatus 207 is not instructed here, the processing is advanced to step S502. Also, if an activation of the image forming apparatus 207 is instructed in step S514, the processing proceeds to step S515, a return command is transmitted to the image forming apparatus 207, and the processing proceeds to step S507.

By virtue of this processing, when the remote tray association is instructed by the print control apparatus 201 when the image forming apparatus 207 is in the power saving state, a reservation of the remote tray association with the print control apparatus 201 can be registered without activating the image forming apparatus 207. Then, as will be explained later, when the image forming apparatus 207 returns from the power saving state, the reserved remote tray association can be executed.

Continuing on, explanation will be given for processing of the print control apparatus 201 when the image forming apparatus 207 returns from the power saving state. Firstly, explanation will be given, with reference to FIGS. 5A and 5B, and FIG. 15A through FIG. 17C, for processing in a case where during the image forming apparatus 207 being in the power saving state sheet registration and remote tray association are not instructed, and the image forming apparatus 207 returns from the power saving state. Note, regarding the initial state, the state of the sheet type DB stored in the image forming apparatus 207 is assumed to be that shown in FIG. 15B, and the state of the sheet type DB stored in the print control apparatus 201 it is assumed to be that shown in FIG. 15A. Furthermore, the sheet registration DB stored in the image forming apparatus 207 is as shown in FIG. 16C, and the sheet registration DB stored in the print control apparatus 201 is assumed to be as shown in FIG. 17A. Also, when the print control apparatus 201 is notified that the image forming apparatus 207 returned on its own from the power saving state, it is assumed that the CPU 107 writes something to that effect in the HDD 105.

The explanation omits the details of initiating from step S501 of FIG. 5A, and proceeding to step S502. In step S502, the CPU 107 determines whether a notification of return from the power saving state is received from the image forming apparatus 207. Here, because the notification of return from the power saving state is received from the image forming apparatus 207, the processing is advanced to step S510. In step S510, the CPU 107 accesses the sheet type DB stored in the HDD 105 of the print control apparatus 201, and confirms the existence or absence of a sheet type that is not yet synchronized with that of the image forming apparatus 207. Also, the remote tray association reservation list is accessed, and it is determined whether there is a reserved remote tray association. Here, there is no sheet type that is not yet synchronized with the image forming apparatus 207, and there is no reserved remote tray association, so the processing completes.

Next, explanation will be given with reference to FIGS. 5A and 5B, FIG. 9 through FIG. 10, FIG. 15A through FIG. 17C, and FIGS. 20A to 20C, for processing in a case where during the image forming apparatus 207 being in the power saving state, sheet type registration and remote tray association are instructed, and after that, the image forming apparatus 207 returns from the power saving state. Note, regarding the initial state, the state of the sheet type DB stored in the image forming apparatus 207 is assumed to be that shown in FIG. 15B, and the state of the sheet type DB stored in the print control apparatus 201 is assumed to be that shown in FIG. 15C. Furthermore, the sheet registration DB stored in the image forming apparatus 207 is as shown in FIG. 16C, and the sheet registration DB stored in the print control apparatus 201 is assumed to be as shown in FIG. 17D. The remote tray association reservation list is assumed to be shown in FIG. 20B.

The explanation omits the details of initiating from step S501 of FIG. 5A, and proceeding to step S502, and step S510. In step S510, the CPU 107 determines whether there is a sheet type not yet synchronized with the image forming apparatus 207 or there is the reserved remote tray association. Here, because there is a not yet synchronized sheet type, the processing is advanced to step S507. In step S507, the CPU 107 performs the image forming apparatus 207 return processing.

Figure 9:
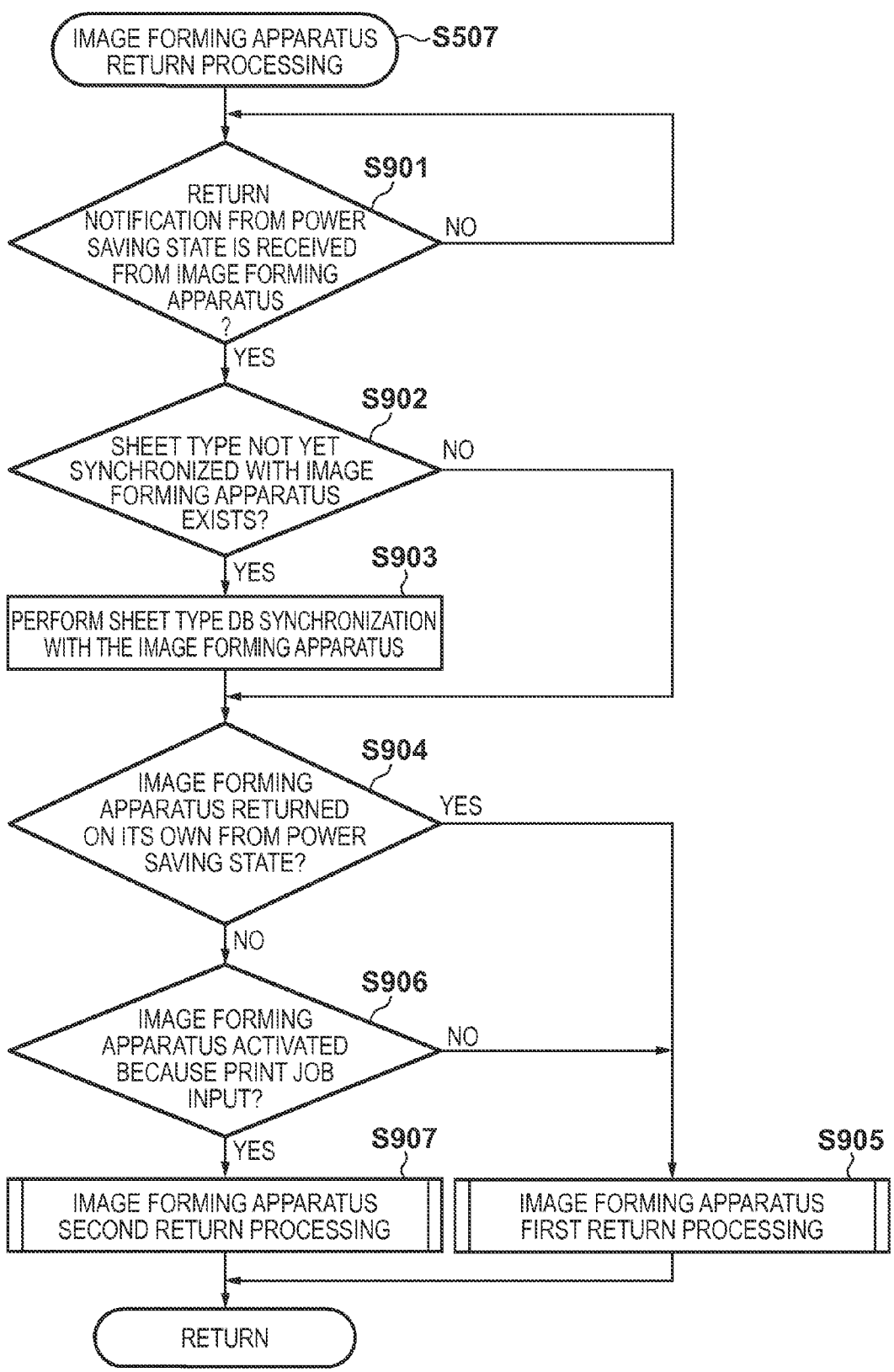
FIG. 9 is a flowchart for describing processing of step S507 of FIG. 5A when the image forming apparatus returns from the power saving state.

FIG. 9 is a flowchart for describing processing of step S507 of FIG. 5A when the image forming apparatus 207 returns from the power saving state.

In step S901, the CPU 107 determines whether a notification of return from the power saving state is received from the image forming apparatus 207. Because here the notification of return is received, the processing is advanced to step S902. In step S902, the CPU 107 accesses the sheet type DB of the HDD 105 and determines whether there are sheets that are not yet synchronized with the image forming apparatus 207. Here, as illustrated in FIG. 15C, because sheets not yet synchronized with the image forming apparatus 207 exist in the sheet type DB, the processing is advanced to step S903. In step S903, the CPU 107 accesses the sheet type DB in the HDD 105 and performs sheet type synchronization processing with the image forming apparatus 207. Regarding this sheet type synchronization processing, it is already explained, so the explanation is omitted. The sheet type DB stored in the print control apparatus 201 after synchronization processing completes in this way is shown in FIG. 16B. Also, the sheet type DB stored in the image forming apparatus 207 after the sheet type synchronization processing completes is shown in FIG. 16A. When the sheet type synchronization processing completes, the processing is advanced to step S904.

In step S904, the CPU 107 determines whether or not the image forming apparatus 207 returns on its own from the power saving state. Here, it is determined that the image forming apparatus 207 returned on its own and the processing is advanced to step S905. In step S905, first return processing of the image forming apparatus is performed.

FIG. 10 is a flowchart for describing the first return processing of step S905 of FIG. 9 when the image forming apparatus 207 returns from the power saving state.

In step S1001, the CPU 107 accesses the remote tray association reservation list in the HDD 105, and determines whether or not the remote tray association is reserved. Here, because there is a remote tray association reservation in the reservation list the processing is advanced to step S1002.

FIG. 20C depicts a view for showing an example of a tray association setting screen for when the image forming apparatus 207 returns from the power saving state.

In the print control apparatus 201, it is set in advance whether to perform the reserved remote tray association or not to perform it when the image forming apparatus 207 returns from the power saving state. When the user instructs execution of settings regarding the remote tray association when the image forming apparatus 207 returns by operating the console unit 109, the CPU 107 of the print control apparatus 201 makes an instruction to the display unit 110 and causes this screen to display. Reference numeral 2001 is an item for specifying whether or not to perform the remote tray association in a case where the remote tray association is reserved in the remote tray association reservation list when the image forming apparatus 207 returns from the power saving state. When, the user presses an OK button 2003 by selecting "do not perform" 2002 from the console unit 109, the CPU 107 registers that the remote tray association is not performed in the HDD 105, and terminates the registration processing. In such a case, when the image forming apparatus 207 returns from the power saving state, the remote tray association is not performed even if there is one registered in the remote tray association reservation list.

Also, in a case where, when the user selects "perform" 2004, the CPU 107 registers in the HDD 105 that when the image forming apparatus 207 returns from the power saving state and there is a remote tray association reservation, the remote tray association will be performed, and registration processing is completed.

In step S1002 of FIG. 10, the CPU 107 determines whether or not to perform the remote tray association when the image forming apparatus 207 returns in accordance with the setting on the screen of FIG. 20C. In a case where it is determined that not to perform the remote tray association is set, the processing completes.

On the other hand, in a case where it is determined that performing the remote tray association is set in step S1002, the processing is advanced to step S1003. In step S1003, the CPU 107 determines whether or not multiple registrations of remote tray association reservations for a single sheet feeder are possible. Regarding processing (remote tray association duplicate registration) for plural reserving remote tray association reservation for a single sheet feeder, this will be explained later. Here, explanation will proceed with remote tray association duplicate registration set to be not permitted. In this case, the processing is advanced to step S1004.

In step S1004, the CPU 107 accesses the remote tray association reservation list in the HDD 105, and performs all of the reserved remote tray associations. In the remote tray association reservation list of FIG. 20B, processing for associating the sheet type having the ID "0004" with the sheet feeder 216 having the number "4" is registered.

The CPU 107 accesses the sheet registration DB stored in the HDD 105 of the print control apparatus 201, and inputs the ID "0004" of the instructed "user defined paper 1" into the ID column of the sheet feeder having the number "4". After this, the CPU 107 transmits the sheet registration DB stored in the print control apparatus 201 to the image forming apparatus 207, and performs synchronization processing with the sheet registration DB stored in the image forming apparatus 207. The sheet registration DB stored in the image forming apparatus 207 after the sheet registration DB stored in the image forming apparatus 207 is updated is shown in FIG. 17C. When updating of the sheet registration DB stored in the image forming apparatus 207 is completed, the processing is advanced to step S1005. In step S1005, the CPU 107 accesses the remote tray association reservation list in the HDD 105, the executed remote tray association is deleted, and the processing is advanced to step S1007. In step S1007, the CPU 107 accesses the sheet registration DB stored in the HDD 105 of the print control apparatus 201, and updates the item "sheet provisional registration" in the sheet feeder having the number "4" for which the remote tray association is executed from "exists" to "does not exist". The sheet registration DB stored in the print control apparatus 201 after updating is shown in FIG. 17B. After this, the processing completes.

By this processing, when the remote tray association is instructed on the print control apparatus 201 when the image forming apparatus 207 is in the power saving state, the remote tray association is reserved without activating the image forming apparatus 207. Then, it is possible that, when the image forming apparatus 207 returns from the power saving state, the reserved remote tray association is executed, and that for the sheet types registered in each of the print control apparatus 201 and the image forming apparatus 207, sheet registration to the sheet feeder is synchronized. With this, it is possible to synchronize the sheet type DB and the sheet registration DB stored in the print control apparatus 201 and the image forming apparatus 207 while maintaining the power saving state of the image forming apparatus 207 as much as possible.

Next, explanation will be given, with reference to FIGS. 5A and 5B, FIG. 9, FIG. 15A through FIG. 16C, FIGS. 17A to 17D, FIGS. 20A, 20B, and FIG. 22A through FIG. 24C, for return processing of the image forming apparatus 207 when a print instruction is made to the print control apparatus 201 when the image forming apparatus 207 is in the power saving state. Note, regarding the initial state, the state of the sheet type DB stored in the image forming apparatus 207 is assumed to be that shown in FIG. 15B, and the state of the sheet type DB stored in the print control apparatus 201 it is assumed to be that shown in FIG. 15C. Furthermore, the sheet registration DB stored in the image forming apparatus 207 is as shown in FIG. 24A, and the sheet registration DB stored in the print control apparatus 201 is assumed to be as shown in FIG. 17D. Furthermore, it is assumed that the state of the remote tray association reservation list is as is shown in FIG. 20B. The processing is performed from step S501 of FIG. 5A. The processing proceeds through step S501 through step S502, step S508, and step S509, but the details of these are omitted.

When the user inputs a print job into the print control apparatus 201 specifying the sheet type "user defined paper 1", the CPU 107 accesses the HDD 105, saves that a print job is input, and so the image forming apparatus 207 is caused to activate, and the processing is advanced from step S509 to step S515. Then, in step S515, the image forming apparatus 207 is caused to return by transmitting a return command to the image forming apparatus 207. Then, the processing proceeds to step S507. In step S507, processing when the image forming apparatus 207 returns from the power saving state, shown in the flowchart of FIG. 9, is performed.

In step S901, the CPU 107 determines whether a notification of return indicating return from the power saving state is received from the image forming apparatus 207. Here, because the notification of return is received, the processing is advanced to step S902. In step S902, the CPU 107 determines whether there is a sheet type not yet synchronized with the image forming apparatus 207. Here, as illustrated in FIG. 15C, because a sheet not yet synchronized with the image forming apparatus 207 exists in the sheet type DB stored in the print control apparatus 201, the processing is advanced to step S903. In step S903, the CPU 107 accesses the sheet type DB in the HDD 105, and performs synchronization processing with the sheet type DB stored in the image forming apparatus 207. This sheet type synchronization processing is already explained, so detailed explanation is omitted. The sheet type DB stored in the print control apparatus 201 after synchronization processing has completed is shown in FIG. 16B. Also, the sheet type DB stored in the image forming apparatus 207 after synchronization processing completion is shown in FIG. 16A. When synchronization of the sheet type DB is completed, the processing is advanced to step S904.

In step S904, the CPU 107 determines whether the image forming apparatus 207 returned on its own. Because the image forming apparatus 207 has not returned on its own here, the processing is advanced to step S906. In step S906, the CPU 107 determines whether or not the image forming apparatus 207 is activated because a print job is input. Since the image forming apparatus 207 is activated because a print job is input, the processing is advanced to step S907. In step S907, second return processing of the image forming apparatus 207 is performed.

Figure 12:
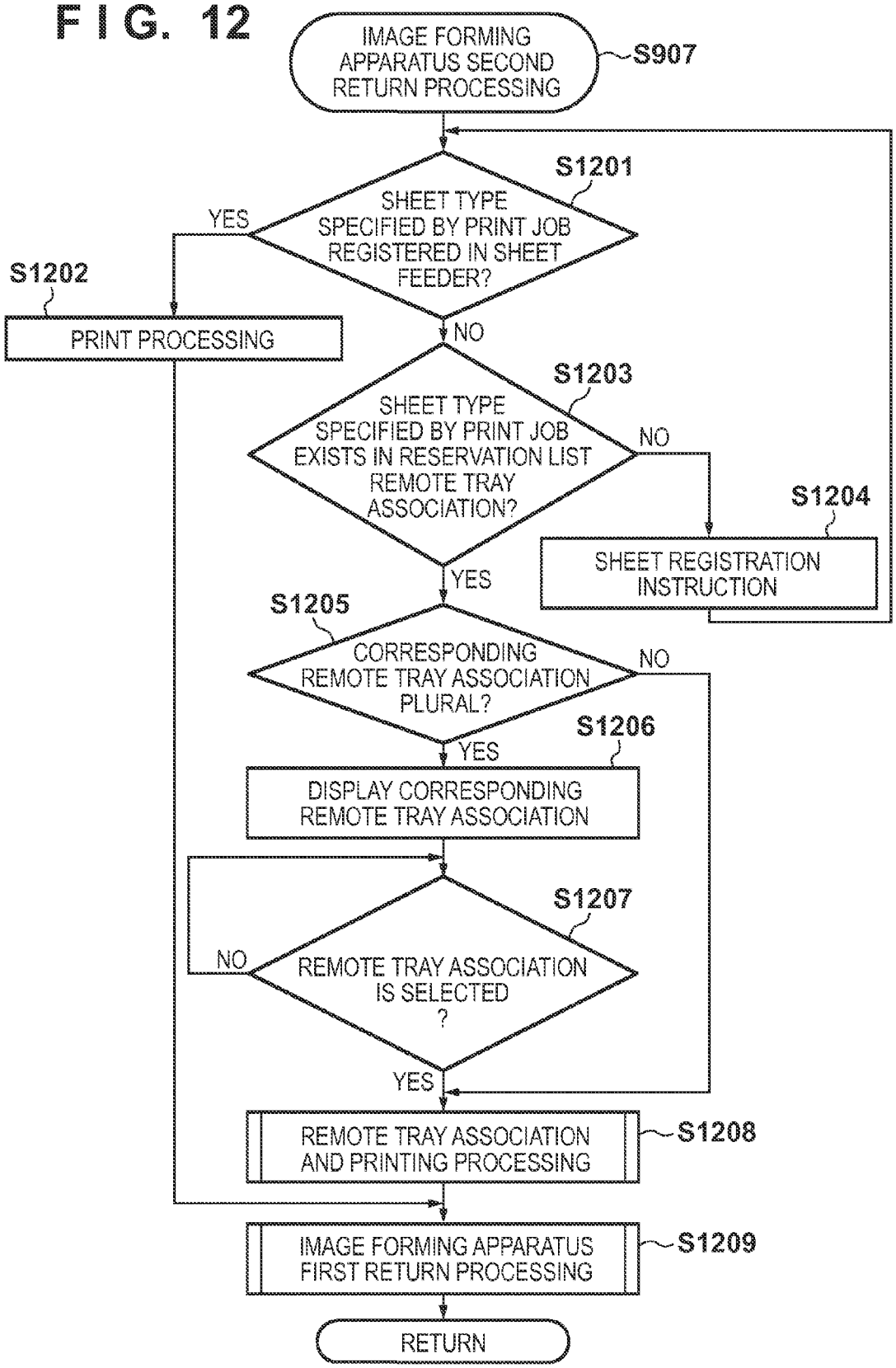
FIG. 12 is a flowchart for describing processing of step S907 of FIG. 9 when the image forming apparatus executes the second return processing.

FIG. 12 is a flowchart for describing processing of step S907 of FIG. 9 when the image forming apparatus 207 executes the second return processing.

In step S1201, the CPU 107 accesses the sheet registration DB stored in the HDD 105 of the print control apparatus 201 and determines whether the specified sheet type "user defined paper 1" is registered in the sheet feeder. In this case, because the sheet ID "0004" of "user defined paper 1" is not registered, as shown in FIG. 17D, the processing is advanced to step S1203. In step S1203, the CPU 107 determines whether or not the sheet type specified in the print job exists in the remote tray association reservation list. Here, in a case where the sheet type specified by the print job does not exist in the remote tray association reservation list, the processing advances to step S1204. In step S1204, the CPU 107 causes the display unit 110 to display a screen shown in FIG. 22B, prompts the user for the setting of the sheet registration, and the processing proceeds to step S1201.

Because "user defined paper 1", which is specified by the print job, is registered in the reservation list of the remote tray association of FIG. 20B, the processing advances to step S1205 from step S1203. In step S1205, the CPU 107 accesses the remote tray association reservation list, and determines whether a plurality of items of remote tray association using a sheet type instructed in the print job are registered. In FIG. 20B, because a plurality of items of remote tray association using the sheet type instructed in the print job is not registered, the processing is advanced to step S1208.

Figure 13:
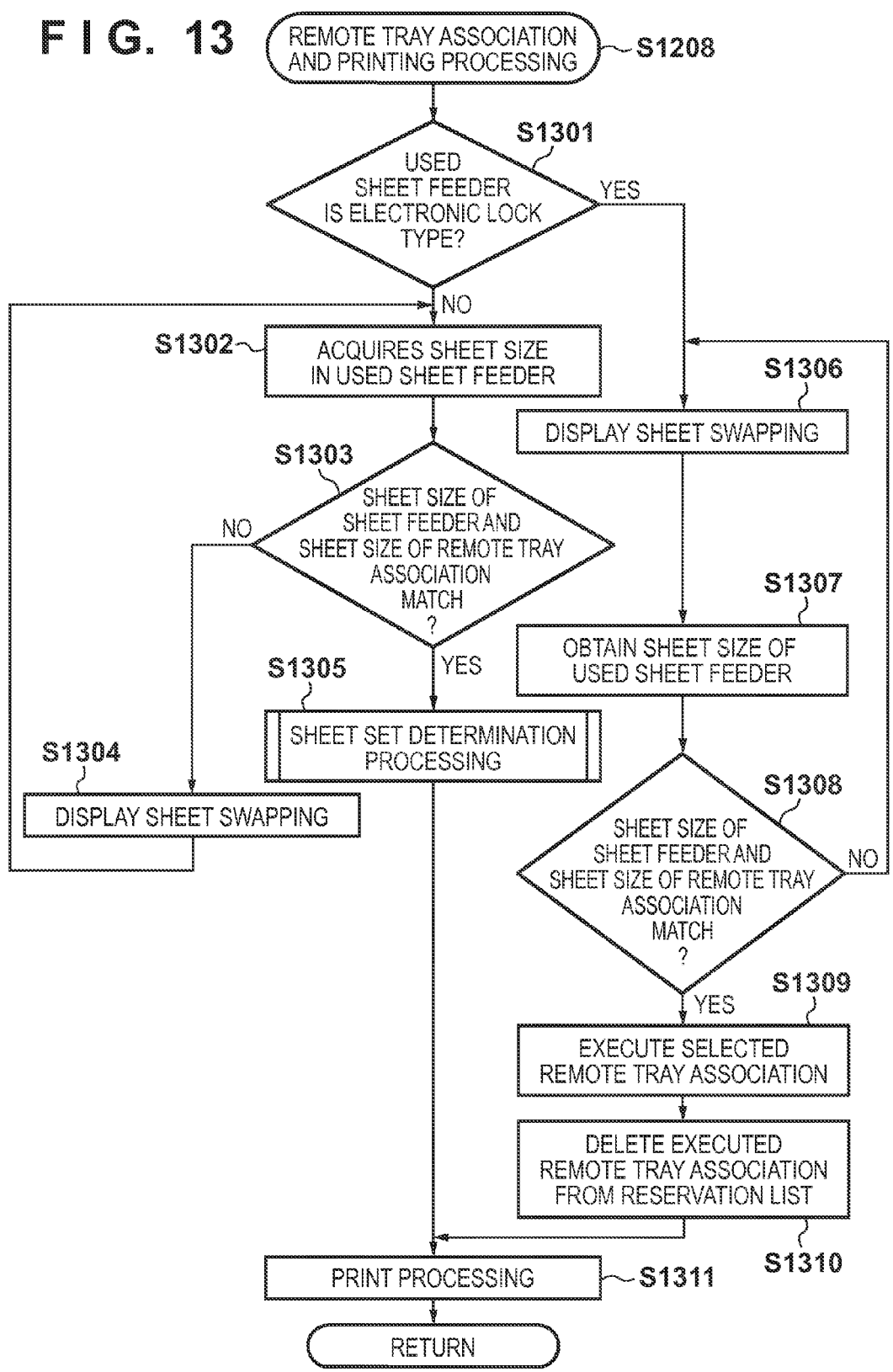
FIG. 13 is a flowchart for describing remote tray association and printing processing of step S1208 of FIG. 12.

FIG. 13 is a flowchart for describing remote tray association and printing processing of step S1208 of FIG. 12.

In step S1301, the CPU 107 accesses the remote tray association reservation list in the HDD 105, and confirms for what number sheet feeder the sheet ID "0004", which is instructed by the print job, the remote tray association reservation is performed. In FIG. 20B, regarding the sheet ID "0004", remote tray association reservation is performed for the fourth sheet feeder. Because of this, the CPU 107 confirms that regarding the sheet ID "0004", for which the print job is instructed, remote tray association reservation is performed for the fourth sheet feeder. Then, the sheet registration DB stored in the HDD 105 of the print control apparatus 201 (FIG. 17D) is accessed, and the type of the fourth sheet feeder 216 is confirmed.

In FIG. 17D, when it is confirmed that the sheet feeder type of the sheet feeder 216 having the number "4" is the non-electronic lock type, the processing is advanced to step S1302. In step S1302, the CPU 107 accesses the sheet type DB in the HDD 105, and acquires the sheet size of the sheet ID "0004" and the sheet size of the fourth sheet feeder for which, for the sheet of the ID "0004", the remote tray association reservation is performed. The value acquired is written into the HDD 105, and the processing is advanced to step S1303. In step S1303, the CPU 107 compares the sheet size of the sheet ID "0004" and the sheet size of the fourth sheet feeder. As a result of the comparison, if the values of the sheet size do not match, the processing is advanced to step S1304. In step S1304, the CPU 107 causes the display unit 110 to display the screen shown in FIG. 23B, and the processing is advanced to step S1302. On the other hand, in a case where the CPU 107 determines, as the result of the comparison of step S1303, that the value of the sheet size matches, the processing is advanced to step S1305. In step S1305, the sheet set determination processing is performed.

Figure 14A:
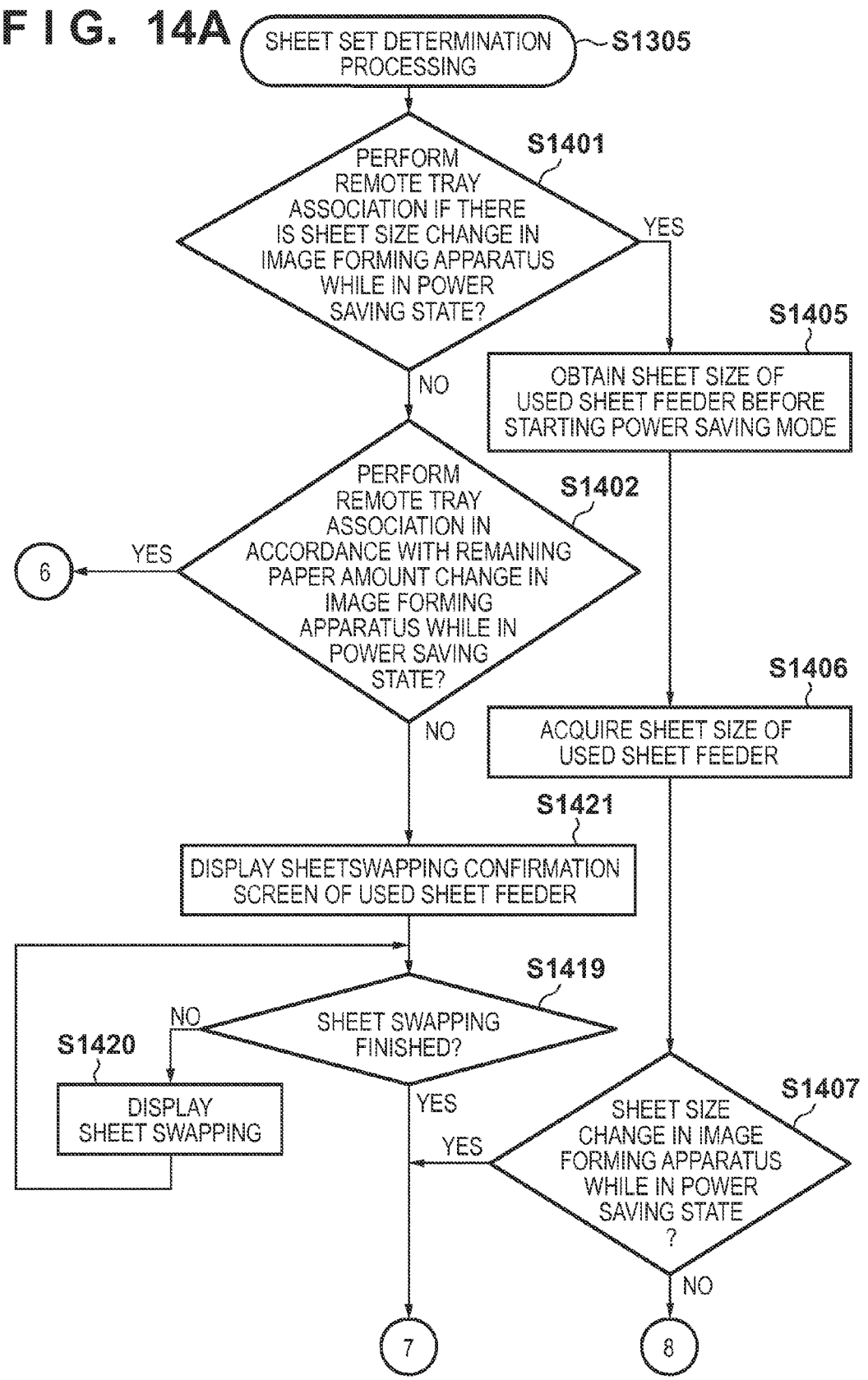
FIGS. 14A and 14B are flowcharts for describing sheet set determination processing of step S1305 of FIG. 13.
Figure 14B:
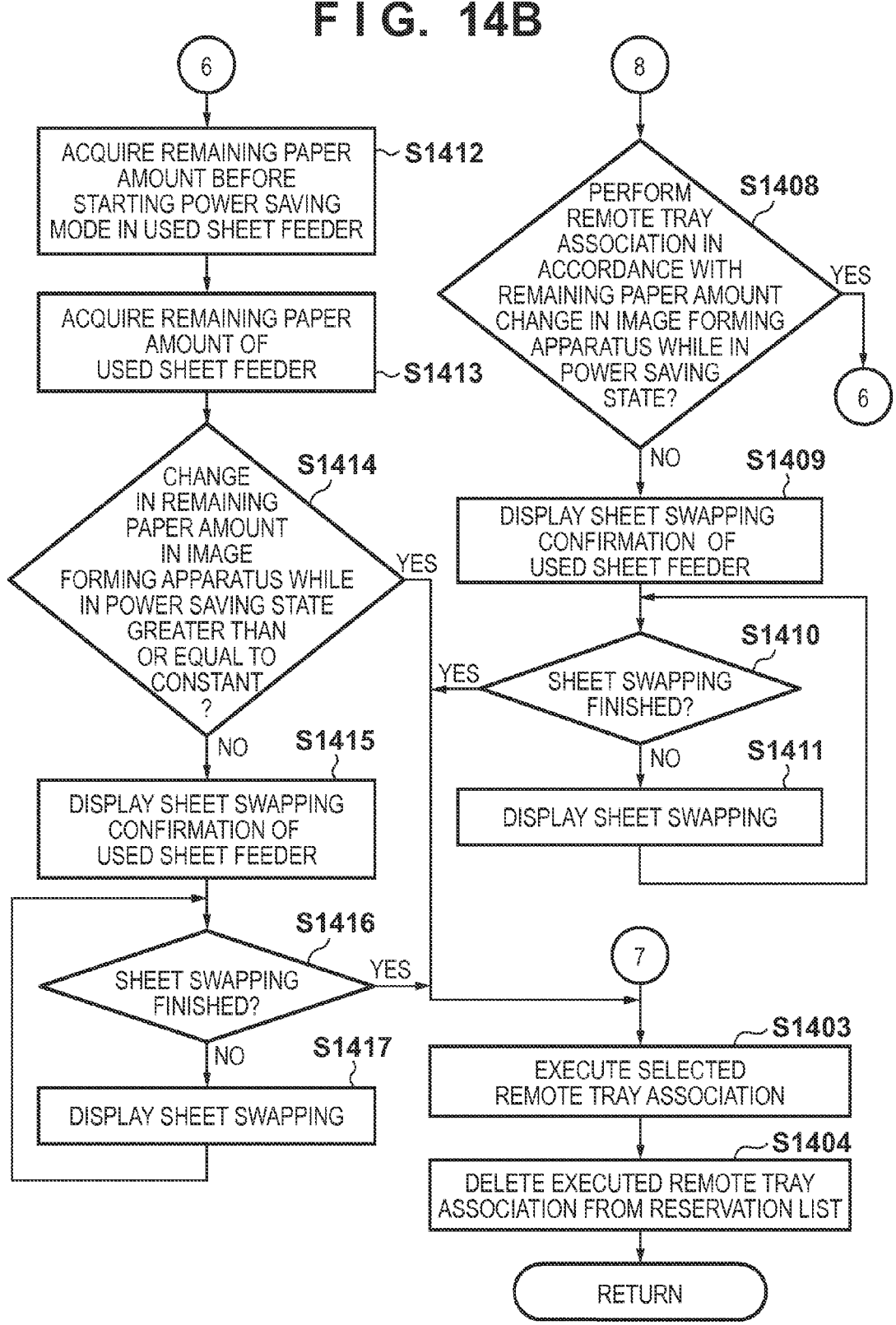

FIGS. 14A and 14B are flowcharts for describing the sheet set determination processing of step S1305 of FIG. 13.

Prior to explaining this flowchart, explanation will be given for setting relating to the sheet set determination processing with reference to FIG. 23A.

Figure 23A:
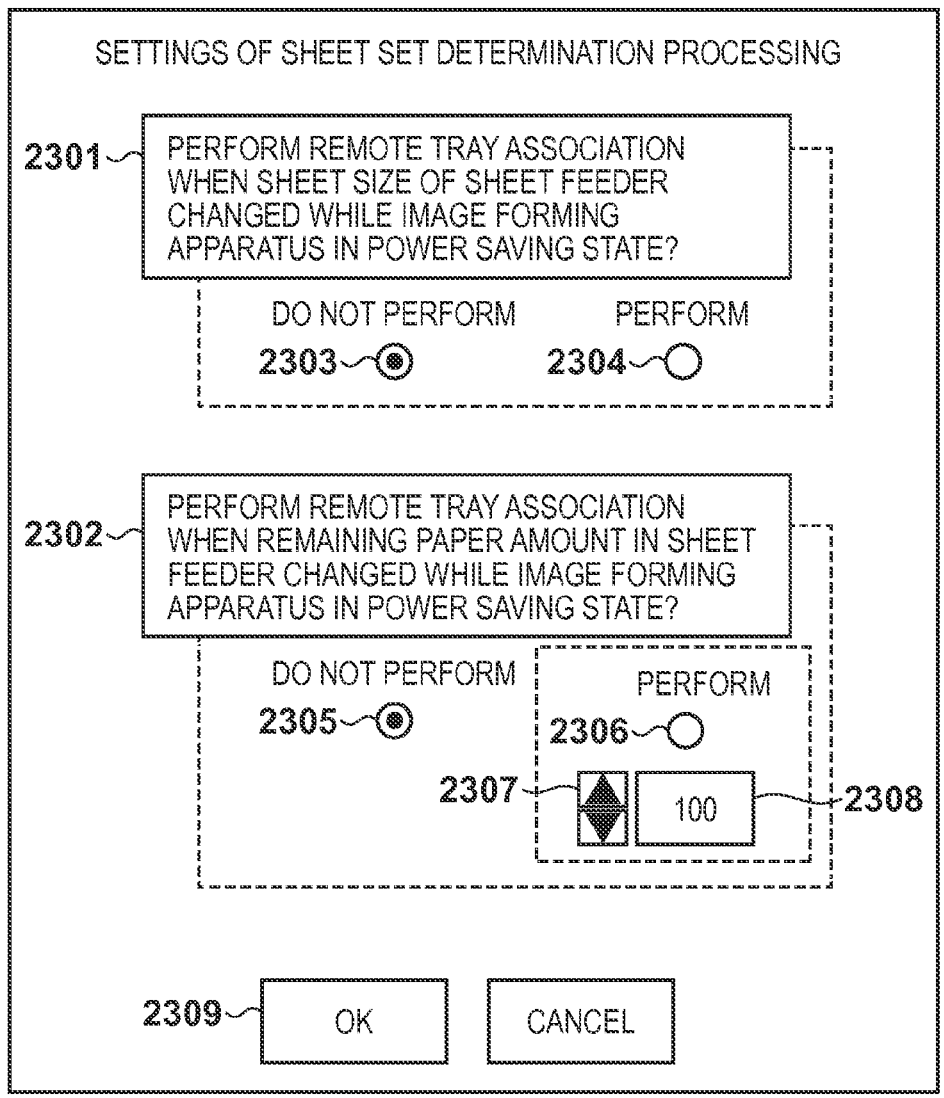
FIG. 23A depicts a view for showing an example of a screen for setting an item for performing sheet set determination processing in the first embodiment.
Figure 23B:
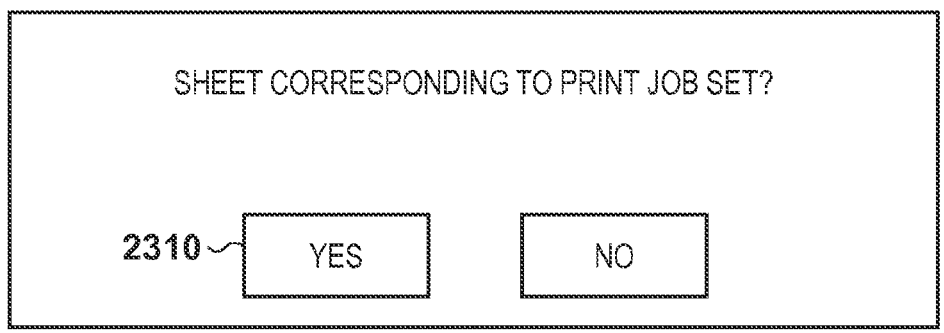
FIG. 23B depicts a view for showing an example of a screen for confirming whether or not a sheet has been set.

FIG. 23A depicts a view illustrating an example of a screen for performing setting relating to sheet set determination processing of step S1305.

Reference numeral 2301 denotes a setting item for determining whether to perform remote tray association when the sheet size of the sheet feeder changes while the image forming apparatus 207 is transitioned into the power saving state. Reference numeral 2302 denotes a setting item for determining whether to perform remote tray association when the remaining paper amount value of the sheet feeder changes while the image forming apparatus 207 is transitioned into the power saving state. The user operate the console unit 109 and selects "do not perform" 2303 or "perform" 2304, and selects "do not perform" 2305 or "perform" 2306. Also, when "perform" 2306 is selected, the user operates a button 2307, causes the remaining paper amount value threshold level "100" to display on a setting field 2308, and presses an "OK" button 2309 Here, the CPU 107 stores the setting value in the HDD 105.

In a state in which these settings are made in advance, the CPU 107, in step S1401, determines whether setting is made for performing remote tray association when there is a change in sheet size in the image forming apparatus 207 while transition into the power saving state. Here, when the setting is not made, the processing advances to step S1402 from step S1401. The CPU 107, in step S1402, determines whether or not setting is performed such that the remote tray association is performed when the remaining paper amount value of the sheet feeder changes while the image forming apparatus 207 is transitioned into the power saving state. When this kind of setting is performed, the processing proceeds to step S1412 from step S1402, and otherwise the processing proceeds to step S1421. In step S1421, the CPU 107 prompts for setting of sheets by causing a screen shown in FIG. 23B to display on the display unit 110, and the processing is advanced to step S1419. After that, while the user is performing the swapping of the sheets of the sheet feeder, step S1419 and step S1420 are executed and when the user swaps the sheets and presses a YES button 2310 on the screen of FIG. 23B, the CPU 107 writes that the sheets are swapped into the HDD 105. In this way, when the CPU 107, step S1419, determines that the sheet swapping is performed by the user, the processing is advanced to step S1403.

Meanwhile, when the CPU 107, in step S1401, determines that "perform" 2304 is selected in reference numeral 2301 of the screen of FIG. 23A, the processing is advanced to step S1405. In step S1405, the CPU 107 obtains the sheet size prior to entering the power saving state of the fourth sheet feeder that the remote tray association instructs, and the processing is advanced to step S1406. In step S1406, the CPU 107 accesses the sheet registration DB stored in the HDD 105 of the print control apparatus 201, acquires the sheet size of the fourth sheet feeder for which remote tray association reservation is performed, and the processing is advanced to step S1407. In step S1407, the CPU 107 compares the two sheet sizes acquired in step S1405 and in step S1406. In a case where the result of this comparison is that the sheet sizes are the same, the processing is advanced to step S1408.

In step S1408, the CPU 107 determines whether setting for performing the remote tray association is performed when the remaining paper amount value of the sheet feeder changes while the image forming apparatus 207 is transitioned into the power saving state. A "perform" button 2306 is pressed in a screen of FIG. 23A, and when the item shown in reference numeral 2302 of FIG. 23A is executed, it is determined whether or not setting is performed. Here, when the CPU 107 determines that that the setting is not performed, the processing is advanced to step S1409. In step S1409, the CPU 107 causes a screen shown in FIG. 23B to display on the display unit 110, and the processing is advanced to step S1410. When, after that, while step S1410 and step S1411 are being executed, the user executes the sheet swapping of the sheet feeder, and presses a "YES" button 2310 of FIG. 23B, the CPU 107 writes into the HDD 105 that the sheets of the sheet feeder are swapped. Note, in step S1410, the CPU 107 accesses the HDD 105, and determines whether the sheet swapping is performed by the user, and in a case where it is determined that the sheet swapping is performed by the user, the processing is advanced to step S1403.

Meanwhile, in a case where the CPU 107, in step S1408, determines that setting is performed such that the remote tray association is performed when the remaining paper amount value of the sheet feeder changes while the image forming apparatus is transitioned into the power saving state, the processing is advanced to step S1412. In step S1412, the CPU 107 acquires the remaining paper amount value, prior to entering the power saving state, of the fourth sheet feeder for which the remote tray association instruction is made. This time, it is assumed that "0" is acquired as the remaining paper amount value. Next, the processing proceeds to step S1413, and the CPU 107 makes a request for the remaining paper amount of the fourth sheet feeder for which the remote tray association instruction is made to the image forming apparatus 207 via the NIC 104. Then, the value returned from the image forming apparatus 207 (this time it is assumed that "150" is acquired) is written into the HDD 105, and the processing is advanced to step S1414. In step S1414, the CPU 107 calculates the two remaining paper amount differences acquired in step S1412 and step S1413. This time, the difference is "150". The calculated result is compared with threshold value "100" stored in the HDD 105 which is specified with the setting field 2308 of FIG. 23A. Because the result of this comparison is that the change of the remaining paper amount while the image forming apparatus 207 is transitioned into the power saving state is larger than the threshold "100" stored in the HDD 105 specified by the setting field 2308, the processing is advanced to step S1403.

Meanwhile, in a case where the CPU 107, in step S1414, determines as a result of the comparison that the change of the remaining paper amount while the image forming apparatus 207 is transitioned into the power saving state is less than the threshold "100", the processing is advanced to step S1415. In step S1415, the CPU 107 causes the display unit 110 to display a screen shown in FIG. 23B, and advances the processing to step S1416. After that, when the CPU 107 determines that the user executed the swapping of sheets and pressed the "YES" button 2310, the CPU 107 writes that the sheets are swapped in the HDD 105. Then, the processing proceeds to step S1416, and in a case where the CPU 107 determines during execution of step S1416 and step S1417 that swapping of sheets is performed by the user, the CPU 107 advances the processing to step S1403. In step S1403, the CPU 107 executes the selected remote tray association. This time, the sheet type having the ID "0004" is registered in the fourth sheet feeder. The sheet registration DB stored in the print control apparatus 201 after executing the remote tray association is shown in FIG. 20A. The sheet registration DB stored in the image forming apparatus 207 after executing the remote tray association is shown in FIG. 24B.

After the remote tray association completes in step S1403, the processing is advanced to step S1404. In step S1404, the CPU 107 accesses the remote tray association reservation list in the HDD 105, and deletes the remote tray association executed in step S1403 from the reservation list. When the deletion completes, the sheet set determination processing is terminated, and the processing is advanced to the print processing of FIG. 13 in step S1311. In step S1311, the CPU 107 makes an instruction for printing to the image forming apparatus 207 and advances the processing to step S1209 of FIG. 12.

In step S1209, the CPU 107 performs the first return processing of the image forming apparatus 207, and in a case where remote tray association is registered in the reservation list, the CPU 107 performs the remote tray association. Regarding the first return processing of the image forming apparatus 207, because it is already explained with reference to the flowchart of FIG. 10, the details are omitted.

In this way, in a case where while the image forming apparatus 207 is transitioned into the power saving state, the change in the remaining paper amount is greater than or equal to a constant value, it is determined that the target sheets were replenished during the image forming apparatus 207 being in the power saving state. With this, it is possible to execute remote tray association, print processing, or the like, omitting the step of querying the user about sheet swapping.

Also, in a case where there is a change in the size of the sheets of the target sheet feeder while the image forming apparatus 207 is transitioned into the power saving state, it is determined that the target sheet were replenished during the image forming apparatus 207 being in the power saving state. With this, it is possible to execute remote tray association, print processing, or the like, omitting the step of querying the user about sheet swapping.

Figures 25A, 25B, 25C:
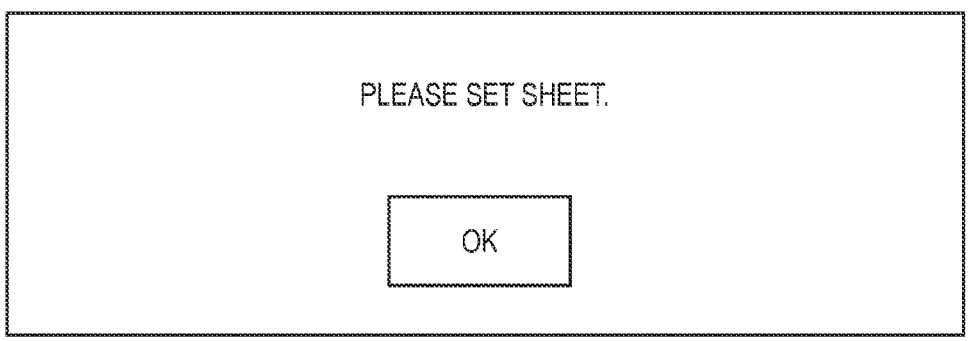
FIG. 25A depicts a view illustrating an example of the remote tray association reservation list.
FIG. 25B depicts a view for showing an example of a screen for prompting the sheet set.
FIG. 25C depicts a view illustrating an example of the sheet registration DB stored in the print control apparatus.

Next, return processing of the image forming apparatus 207, in a case where a print instruction is made to the print control apparatus 201 when the image forming apparatus 207 is in the power saving state, is explained, with reference to FIG. 1 through FIG. 3, FIGS. 5A and 5B, FIG. 9, FIG. 12 through FIGS. 14A and 14B, FIG. 15A through FIG. 16C, and FIG. 22A through FIG. 26C. Note, regarding the initial state, the state of the sheet type DB of the image forming apparatus 207 is assumed to be that shown in FIG. 15B, and the state of the sheet type DB of the print control apparatus 201 it is assumed to be that shown in FIG. 15C. Furthermore, the sheet registration DB stored in the image forming apparatus 207 is as shown in FIG. 24A, and the sheet registration DB stored in the print control apparatus 201 is assumed to be as shown in FIG. 25C. Furthermore, it is assumed that the state of the remote tray association reservation list is as is shown in FIG. 25A. In this case the processing of explanation proceeds from step S501 of FIG. 5A, through step S502-step S503, step S508-step S509, step S901-step S904, step S906, step S1201-step S1203, and step S1205, but the details of these steps is omitted. Note, because sheet type synchronization processing is performed here, the state of the sheet type DB of the image forming apparatus 207 is that shown in FIG. 16A, and the state of the sheet type DB of the print control apparatus 201 is that shown in FIG. 16B.

In step S1205 of FIG. 12, the CPU 107 accesses the remote tray association reservation list in the HDD 105, and determines whether plural remote tray associations using the sheet type instructed in the print job are reserved. Here, as in FIG. 25A, because plural remote tray associations using the sheet type instructed by the print job are reserved, the processing is advanced to step S1206. In step S1206, the CPU 107 causes the display unit 110 to display the screen shown in FIG. 24C, and the processing is advanced to step S1207.

In FIG. 24C, the user determines which sheet feeder to associate with the sheet type "user defined paper 1", for which printing is instructed, by operating the console unit 109. The user checks a button 2401 and presses an "OK" button 2402, and the CPU 107 saves the number "5" of the checked sheet feeder into the HDD 105, and advances the processing to step S1208. Next, explanation will be given for detailed processing of step S1208 with reference to the flowchart of FIG. 13.

In step S1301, the CPU 107 accesses the HDD 105, and determines whether or not the type of the sheet feeder for which remote tray association is performed is the electronic lock type. In this case, because the sheet feeder having the number "5" in FIG. 17D, for which remote tray association is instructed, is an electronic lock type sheet feeder, the processing is advanced to step S1306. In step S1306, the CPU 107 causes the display unit 110 to display a screen for prompting the user to set the sheet, as shown in FIG. 25B, and advances the processing to step S1307. In step S1307, the CPU 107 accesses the sheet type DB of the print control apparatus 201 in the HDD 105, and acquires the sheet size of the sheet ID "0004", and the sheet size of the sheet feeder having the number "5" to which the sheet ID "0004" is remote tray associated. The CPU 107 writes the acquired values into the HDD 105, and advances the processing to step S1308. In step S1308, the CPU 107 compares the sheet size of sheet ID "0004", and the sheet size of the sheet feeder having the number "5". When, as a result of this comparison, the CPU 107 determines that the sheet sizes do not match, the processing is advanced to step S1306, and once again, the user is prompted to swap the sheets.

On the other hand, when, in step S1308, the CPU 107 determines that the sheet sizes match, the processing is advanced to step S1309. In step S1309, the CPU 107 executes the selected remote tray association. This time, the sheet having the ID "0004" is registered in the fifth the sheet feeder 217. In this way, when, in step S1309, the remote tray association completes, the processing is advanced to step S1310. In step S1310, the CPU 107 accesses the remote tray association reservation list in the HDD 105, and deletes the remote tray association executed in step S1309 (the sheet feeder number "5") from the reservation list. Also, in the sheet registration DB stored in the print control apparatus 201, in the sheet feeder having the number 5, the sheet provisional registration item is changed from "exists" to "does not exist".

After updating of the sheet registration DB stored in the print control apparatus 201 completes, the sheet registration DB stored in the print control apparatus 201 is as shown in FIG. 26A. The sheet registration DB stored in the image forming apparatus 207 after completion of the remote tray association is shown in FIG. 26B. When the remote tray association processing finishes, the processing proceeds to step S1311. In step S1311, the CPU 107 makes an instruction for printing to the image forming apparatus 207, and advances the processing to step S1209. In step S1209, the CPU 107 performs the first return processing of the image forming apparatus 207, and in a case where remote tray association is registered in the reservation list, the CPU 107 performs the remote tray association. This time, because processing for remote tray associating the sheet having the sheet ID "0004" with the sheet feeder having the number 4 is remaining, this is performed. Regarding details of this, because these are already explained, explanation is omitted.

With this, it is possible to perform remote tray association in a case where remote tray association to an electronic lock type sheet feeder is reserved after the image forming apparatus 207 returns from the power saving state, only after making an instruction to swap the sheets.

By the first embodiment, as explained above, when a sheet type is registered for the print control apparatus when the image forming apparatus is in the power saving state, only data of the sheet type of the print control apparatus is updated without activating the image forming apparatus and performing synchronization processing. Then, at the point in time when the image forming apparatus returns from the power saving state, synchronization of the sheet type data of the print control apparatus and the sheet type data of the image forming apparatus is performed.

Also, when the image forming apparatus is in the power saving state, a print control apparatus registers into the reservation list a sheet type registration to the sheet feeder of the image forming apparatus, when a remote tray association instruction, to be performed, is received from the print control apparatus. Then, at the point in time when the image forming apparatus returns from the power saving state, the remote tray association registered in the reservation list is executed.

Also, in a case where the image forming apparatus returns on its own from the power saving state, the remote tray association registered in the reservation list is executed. Meanwhile, in a case where the image forming apparatus returns from the power saving state due to the inputting of a print job, it is determined whether or not the sheet type of the sheet feeder specified by the print job and the sheet type specified by the print job match, and if they match, printing is performed using the sheets of the sheet feeder. Meanwhile, it is determined whether there is remote tray association of the sheet size in the sheet type corresponding to the reservation list when they do not match, and the remote tray association of the reservation list is executed.

With this, because the image forming apparatus, which is in the power saving state, is not caused to return from the power saving state even if a sheet type is registered for the print control apparatus, and a sheet registration to a sheet feeder of the image forming apparatus is executed, an increase in electric power consumption of the image forming apparatus can be reduced. Then, because the sheet information registered in the print control apparatus and the sheet information of the image forming apparatus are caused to be synchronized when the image forming apparatus returns from the power saving state, the latest sheet information can be registered in the image forming apparatus when the image forming apparatus requires the sheet information.

Second Embodiment

Next, explanation will be given for a second embodiment in which a plurality of remote tray associations for a single sheet feeder can be reserved. The second embodiment is explained with reference to FIG. 1 through FIG. 8, FIG. 16A through 16C, FIG. 18A through FIG. 22B, and FIG. 24A through FIG. 27C. Note, an initial state of the sheet type DB of the image forming apparatus 207 is shown in FIG. 16A, and a processing state of the sheet type DB of the print control apparatus 201 is shown in FIG. 16B. Furthermore, the sheet registration DB stored in the image forming apparatus 207 is as shown in FIG. 24B, and the sheet registration DB stored in the print control apparatus 201 is assumed to be as shown in FIG. 27A. Note, because a hardware configuration of the print control apparatus 201 and the image forming apparatus 207 according to the second embodiment is the same as that of the previously described first embodiment, explanation is omitted.

With reference to FIG. 4, explanation will be given for sheet type registration processing that the print control apparatus 201 executes when the image forming apparatus according to the second embodiment is in the active state. The processing illustrated by the flowchart is realized by the CPU 107 deploying a program stored in the HDD 105 into the RAM, and the CPU 107 executing the program.

Figure 19B:
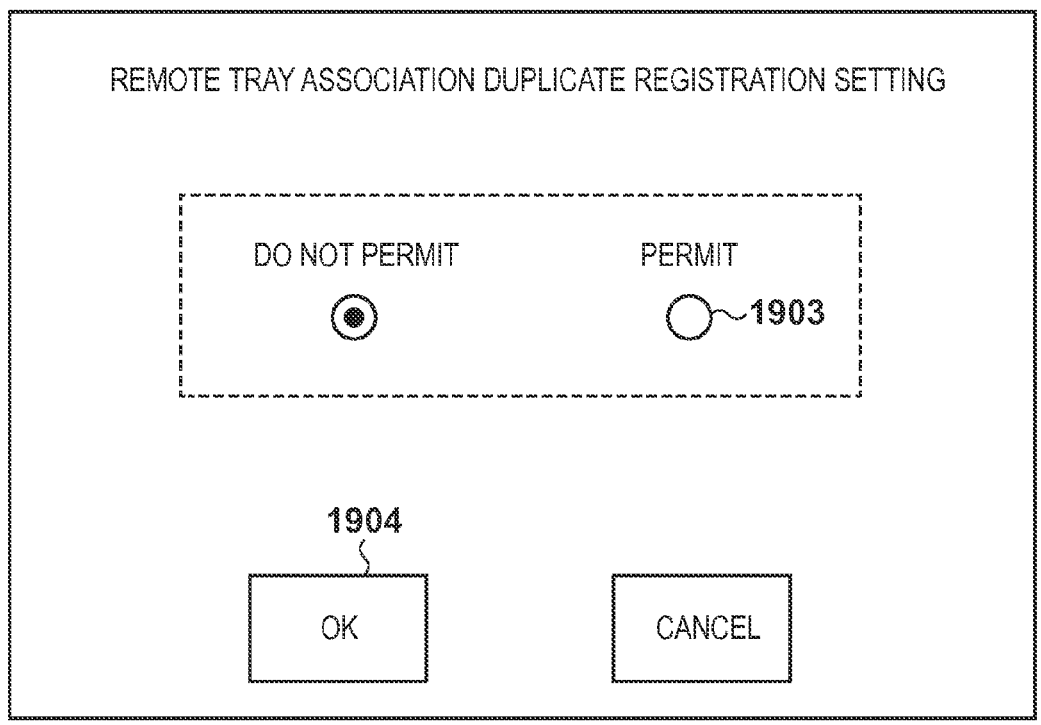
FIG. 19B depicts a view for showing an example of a screen for setting whether to permit a plurality of remote tray association reservations for the same sheet feeder.

Firstly, in step S401, the CPU 107 causes the display unit 110 to display a screen shown in FIG. 19B in response to an operation via the console unit 109 by the user. When, the user selects "permit" 1903 (permit a duplicate specification) on the screen, and presses an "OK" button 1904, the CPU 107 saves into the HDD 105 that plural remote tray associations can be registered for the same sheet feeder, and the process is terminated. In a case where this setting is performed beforehand, the print control apparatus 201 proceeds through step S401, step S404, step S409, step S411, and step S412. Because the processing relating to this point was already explained in the previously described first embodiment, the details are omitted. Regarding the detailed processing of step S412, explanation will be given with reference to FIGS. 5A and 5B.

Assume that the processing has proceeded from step S501 in FIG. 5A, through step S502 to step S503. Because the processing relating to this point was already explained in the previously described first embodiment, the details are omitted. When the user with the console unit 109 inputs "user defined paper 2" as the sheet name and "A4" as the sheet size, the CPU 107, in step S503, determines that registration of a sheet type is instructed, and advances the processing to step S504. In step S504, the CPU 107 performs sheet registration determination processing. In a case where in the sheet type registration determination processing, the user selects so as to provisionally register into the sheet type DB of "user defined paper 2", "user defined paper 2" is provisionally registered into the sheet type DB. The detailed explanation relating to this sheet provisional registration is omitted. An example of the sheet type DB of the print control apparatus 201 is shown in FIG. 18B after the sheet name "user defined paper 2" is registered. Then the processing is advanced to step S505. After this, the processing by the CPU 107 proceeds through step S505-step S506, step S502, and step S503. In step S503, when the user, via the console unit 109, inputs "the user defined paper 3" as the sheet name and "A4" as the sheet size, the CPU 107 advances the processing to step S504, and performs sheet type registration determination processing In a case where, in the sheet type registration determination processing, the user makes the selection to provisionally register "the user defined paper 3" into the sheet type DB, "the user defined paper 3" is provisionally registered into the sheet type DB. The detailed explanation relating to this sheet type provisional registration is omitted. FIG. 21A is a view for illustrating an example of the sheet type DB of the print control apparatus 201 after the sheet name "the user defined paper 3" is registered.

After this, the processing by the CPU 107 proceeds through step S505 through step S506, step S502, step S503, and step S508. When, in step S508, the user makes a remote tray association instruction for the sheet feeder 213 having the number "1" with "user defined paper 2" by operating the console unit 109, the CPU 107 advances the processing to step S512. In step S512, remote tray association determination processing is performed. The details of this processing are shown in the flowchart of FIG. 7.

In FIG. 7, the CPU 107, in step S701, causes the display unit 110 to display the screen shown in FIG. 19A. When the user presses the button 1902 on the screen, the CPU 107 writes into the HDD 105 that reservation of remote tray association with the print control apparatus 201 without activating the image forming apparatus 207 is selected, and the processing is advanced to step S702. In step S702, because an instruction for executing the remote tray association is not performed, the CPU 107 advances the processing to step S704. In step S704, the CPU 107 determines whether an instruction for reserving remote tray association with the print control apparatus 201 is performed. In a case where an instruction for reserving a remote tray association with the print control apparatus 201 is made, the processing is advanced to step S705. In step S705, the remote tray association reservation processing (FIG. 8) is performed.

In step S801 of FIG. 8, the CPU 107 determines whether remote tray association is already reserved in the sheet feeder (here the sheet feeder number is "1") for which remote tray association is instructed. When the CPU 107 confirms that remote tray association is not reserved with the sheet feeder having the number "1", the processing is advanced to step S804. In step S804, the CPU 107 accesses the remote tray association reservation list stored in the HDD 105, and registers the sheet feeder number "1" of the instructed sheet feeder 213 having the number "1" and the sheet ID "0005" for which the registration instruction is made. An example of the remote tray association reservation list after these are registered to the remote tray association reservation list is shown in FIG. 21B.

Furthermore, the CPU 107 accesses the sheet registration DB stored in the HDD 105 of the print control apparatus 201, and updates the item in the sheet provisional registration of the sheet feeder 213 having the number "1" to "exists". The state after this updating of the sheet registration DB has completed is shown in FIG. 20A. When updating completes in this way, the remote tray association reservation processing terminates, and the processing is advanced to step S513. After this, the CPU 107 advances the processing through step S514, step S502, step S503 and step S508. Explanation will be given for a case in which the user then selects "the user defined paper 3" from the sheet type DB by operating the console unit 109, and makes a registration instruction for the sheet feeder 213 having the number "1". In such a case, the CPU 107 advances the processing to step S512, and performs remote tray association determination processing. Explanation will be given for this processing with reference to FIG. 7.

In step S701 of FIG. 7, the CPU 107 causes the display unit 110 to display the alerting screen shown in FIG. 19A. When the user presses the button 1902 on the screen, the CPU 107 saves into the HDD 105 that reservation of remote tray association to the print control apparatus 201 without activating the image forming apparatus 207 is selected, and the processing is advanced to step S702. In step S702, the CPU 107 determines whether the instruction for executing the remote tray association is performed. Here, in a case where an instruction for executing the remote tray association is not made, the processing is advanced to step S704. In step S704, the CPU 107 determines whether an instruction for reserving remote tray association to the print control apparatus 201 is performed. In a case where an instruction for reserving remote tray association to the print control apparatus 201 is made, the processing is advanced to step S705. In step S705, remote tray association reservation processing is performed. Explanation will be given of this processing with reference to the flowchart of FIG. 8.

In step S801 of FIG. 8, the CPU 107 determines whether the remote tray association is already reserved in the sheet feeder for which remote tray association is instructed. Here, because the remote tray association is reserved for the sheet feeder 213 having the number "1", the processing is advanced to step S802. In step S802, the CPU 107 determines whether or not remote tray association duplicate registration is possible. Here, in a case where duplicate registration is not permitted, the processing is advanced to step S803. In step S803, the CPU 107 causes the display unit 110 to display a screen shown in FIG. 27B. In a case where for the same sheet feeder remote tray association is reserved in duplicate in this way, if duplicate registration is not permitted, it is displayed that it is not permitted, and the process is terminated.

Meanwhile, in a case where the CPU 107, in step S802, determines that duplicate registration of remote tray association is permitted (the button 1903 is selected on the screen of FIG. 19B), the processing is advanced to step S804. In step S804, the CPU 107 accesses the remote tray association reservation list stored in the HDD 105, and the sheet feeder number "1" of the instructed sheet feeder 213, and the sheet ID "0006" for which the registration instruction is made are registered. After these are registered in this way, the reservation list of the remote tray association is as is shown in FIG. 26C. Furthermore, the CPU 107 accesses the sheet registration DB stored in the HDD 105 of the print control apparatus 201, and updates the item in the sheet provisional registration of the sheet feeder 213 having the number "1" to "exists". This time, because the remote tray association is reserved for the sheet feeder 213 having the number "1" previously, the item in provisional registration is left as is ("exists"). The state after this updating completes is shown in FIG. 20A. When updating completes, the remote tray association reservation processing ends, and the processing is advanced to step S513. After this, the CPU 107 advances the processing through step S514, step S502 through step S503, and step S508 through step S509, and processing in a case where a print instruction is made from the user in this state, will next be explained.

Below, explanation will be given for processing when printing is executed in a case where a plurality of remote tray association reservations are performed for a single sheet feeder. In this explanation, FIG. 1 through FIG. 3, FIGS. 5A and 5B, FIG. 9, FIG. 12, FIG. 16A through 16C, FIG. 19A through FIG. 22B, FIG. 24A through 24C, and FIG. 26A through FIG. 28D are used. Note, as an initial state, it is assumed that the state of the sheet type DB of the image forming apparatus 207 is as shown in FIG. 16A, and the state of the sheet type DB of the print control apparatus 201 is as shown in FIG. 21A. Furthermore, the sheet registration DB stored in the image forming apparatus 207 is as shown in FIG. 24B, and the sheet registration DB stored in the print control apparatus 201 is assumed to be as shown in FIG. 20A. Furthermore, it is assumed that the state of the remote tray association reservation list is as is shown in FIG. 26C. Also, it is assumed that the remote tray association duplicate registration setting is set to "permit". Explanation relating to this processing is performed from step S501 of FIG. 5A.

The processing of the CPU 107 proceeds through step S501 through step S503, and step S508 through step S509. When the user inputs a print job into the print control apparatus 201 specifying the sheet type "user defined paper 1", the CPU 107 saves into the HDD 105 that a print job is input, and so the image forming apparatus 207 is caused to activate, and the processing is advanced from step S509 to step S515. Then, in step S515, the image forming apparatus 207 is caused to return from the power saving state. Then, the processing proceeds to step S507, and the return processing of the image forming apparatus 207 is performed. This explanation is performed with reference to the flowchart of FIG. 9.

In FIG. 9, the processing proceeds through step S901 and step S903, but the details of these is already explained in the previously described first embodiment, and so explanation is omitted. In step S903, synchronization of the sheet type DBs of the print control apparatus 201 and the image forming apparatus 207 is performed. This synchronization processing is previously already explained, and so explanation is omitted.

FIG. 27C shows the sheet type DB of the print control apparatus 201 after synchronizing the sheet types of the print control apparatus 201 and the image forming apparatus 207. Also, the sheet type DB of the image forming apparatus 207 after synchronizing the sheet types of the print control apparatus 201 and the image forming apparatus 207 is shown in FIG. 28A. After synchronization processing completes, the processing is advanced to step S904. After this, the processing is advanced through step S906-step S907. Regarding this processing, because it is already explained previously, the details are omitted. In step S907, second return processing (FIG. 12) of the image forming apparatus 207 is performed.

The CPU 107 in step S1201 of FIG. 12, accesses the sheet registration DB stored in the HDD 105 of the print control apparatus 201, and determines whether or not "user defined paper 1" is registered for the sheet feeder. Because the sheet ID "0004" of "user defined paper 1" is already registered for the sheet feeder 216 having the number "4", the processing is advanced to step S1202. In step S1202, the CPU 107 makes an instruction for printing to the image forming apparatus 207, and advances the processing to step S1209. In step S1209, the CPU 107 performs the first return processing (FIG. 10) of the image forming apparatus 207.

In step S1001 of FIG. 10, the CPU 107 accesses the remote tray association reservation list of the HDD 105, and determines whether or not the remote tray association is reserved. The state of the remote tray association reservation list here is as is shown in FIG. 26C. Here, because a remote tray association reservation exists in the reservation list, the processing is advanced to step S1002.

Explanation will be given for tray association setting upon the image forming apparatus returning with reference to FIG. 20C. For reference numeral 2001, because the details are already explained previously, here they are omitted.

Reference numeral 2005 denotes a setting item for determining a processing mode when a plurality of remote tray associations are reserved for the same sheet feeder. When the user selects "prioritize registration time" 2006 by operating the console unit 109, and presses an "OK" button 2003, the remote tray association that was registered the earliest out of the plurality of registered remote tray associations is performed. Also, the user selects "user selection" 2007 by operating the console unit 109, and presses the "OK" button 2003. Here, after allowing the user to select which remote tray association out of the plurality of registered remote tray associations to perform, the selected remote tray association is performed. The explanation relating to this processing is restarted from step S1002.

In step S1002, the CPU 107 determines the existence or absence of execution of remote tray association upon return of the image forming apparatus 207. In a case where it is determined that remote tray association is performed, the processing is advanced to step S1003. In step S1003, the CPU 107 determines whether multiple registrations of remote tray association reservations for a single sheet feeder are possible. Here, because multiple registrations of remote tray association reservations for single sheet feeder are possible, the processing is advanced to step S1006. In step S1006, remote tray association selection execution is performed. This processing is shown in the flowchart of FIG. 11.

Figure 11:
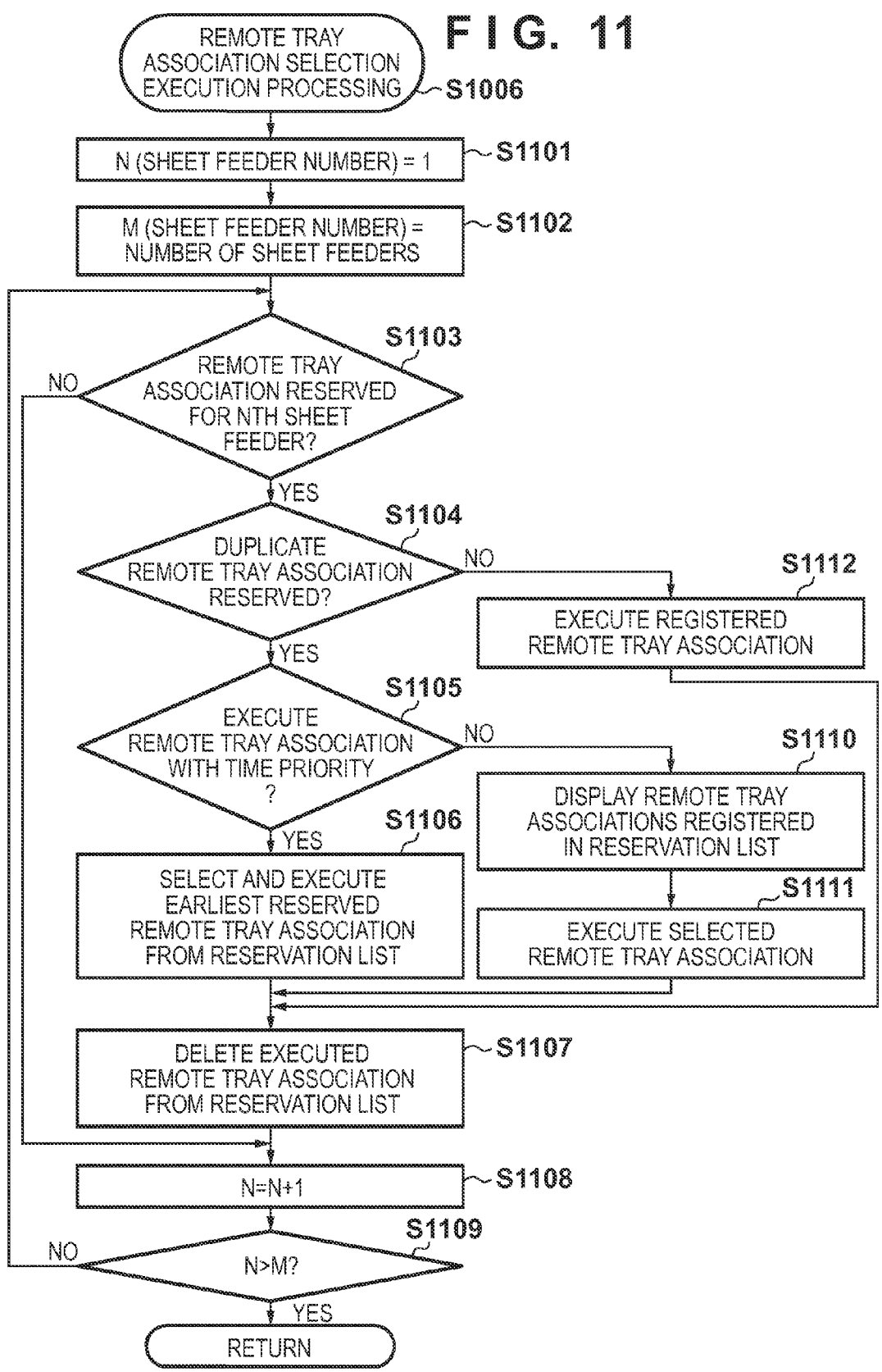
FIG. 11 is a flowchart for describing remote tray association selection execution processing of step S1006 of FIG. 10 according to a second embodiment.

FIG. 11 is a flowchart for describing remote tray association selection execution processing of step S1006 of FIG. 10 according to the second embodiment.

In step S1101, the CPU 107 stores "1" in a variable region N allocated in the second memory unit 108, and advances the processing to step S1102. In step S1102, the CPU 107 stores the total number "5" of the sheet feeders in a variable region M allocated in the second memory unit 108, and advances the processing to step S1103. In step S1103, the CPU 107 accesses the sheet registration DB and the remote tray association reservation list stored in the HDD 105. Then, it is determined if remote tray association is performed for the sheet feeder 213 having the number "1". Because remote tray association of the IDs "0005" and "0006" are reserved for the sheet feeder 213 having the number "1", the processing is advanced to step S1104. In step S1104, the CPU 107 accesses the remote tray association reservation list in the HDD 105, and determines whether a plurality of remote tray associations are reserved for the sheet feeder 213 having the number "1".

Here, as illustrated in FIG. 26C, because two remote tray associations are reserved for the sheet feeder having the number "1" in the remote tray association reservation list, the processing is advanced to step S1105. In step S1105, the CPU 107 determines whether or not setting is such that remote tray association is performed prioritizing registration time in a case that a plurality of remote tray associations are registered for a single sheet feeder. In a case where setting is such that remote tray association is performed prioritizing registration time in step S1105, the processing is advanced to step S1106. In step S1106 the CPU 107 selects the remote tray association registered earliest (first) for the sheet feeder 213 having the number "1" from the remote tray association reservation list. This time, it is determined that registration for remote tray associating for the ID "0005" was performed earliest for the sheet feeder 213 having the number "1", and the selected remote tray association is performed. A state of the sheet registration DB stored in the print control apparatus 201 after the remote tray association is executed is shown in FIG. 28C. Also, a state of the sheet registration DB stored in the image forming apparatus 207 after executing the remote tray association is shown in FIG. 28D. In FIGS. 28C and 28D, the sheet having the ID "0005" is registered for the sheet feeder 213 for which the sheet feeder number is "1".

Meanwhile, in a case where, in step S1105, the CPU 107 determines that the setting is not such that remote tray association is performed prioritizing registration time, the processing is advanced to step S1110. In step S1110, the CPU 107 accesses the remote tray association reservation list in the HDD 105, and remote tray associations reserved for the sheet feeder 213 having the number "1" are acquired. After this, the sheet name and the sheet size are obtained from the sheet type DB with a sheet ID from the acquired remote tray association made to be a key, and the display unit 110 is caused to display a tray association selection screen as shown in FIG. 22A. After this, the processing is advanced to step S1111.

In the screen of FIG. 22A, when the user selects either of buttons 2201 and 2202 by operating the console unit 109 and presses the "OK" button 2203, the CPU 107 stores the selected sheet type into the HDD 105. In the example of FIG. 22A, because the button 2201 for "user defined paper 2" is selected, it is stored that "user defined paper 2" is to be remote tray associated with the sheet feeder 213 having the number 1". Then, the processing proceeds to step S1111, and the CPU 107 executes the selected tray association. In the example of FIG. 22A, the remote tray association with the sheet feeder 213 having the number "1" of "user defined paper 2" is executed. The sheet registration DB stored in the print control apparatus 201 and the sheet registration DB stored in the image forming apparatus 207 after this remote tray association is executed are respectively as shown in FIG. 28C and FIG. 28D.

Next, the processing returns to FIG. 11, and when either step S1106 or step S1111 is executed, the processing advances to step S1107. In step S1107 the CPU 107 accesses the remote tray association reservation list in the HDD 105, and deletes the remote tray association performed in step S1106 or step S1111. This time, because the sheets of "user defined paper 2" are remote tray associated with the sheet feeder 213 having the number "1", the reservation for remote tray association for which the ID registered in FIG. 26C is "0005" is deleted. After these are deleted in this way, the reservation list of the remote tray association is as is shown in FIG. 28B.

When the reservation is deleted like this, the processing is advanced to step S1108. In step S1108, the CPU 107 adds 1 to the variable N and making N "2", and the processing is advanced to step S1109. In step S1109, the CPU 107 compares the value of the variable N with the value of M. This time, because N=2 and M=5, it is determined that it is not the case that N>M, and the processing is advanced to step S1103. Thereafter, for each sheet feeder that the image forming apparatus 207 comprises, it is determined whether remote tray association is reserved, and if reserved, it is determined which remote tray association is performed, and the processing for executing the remote tray association is performed. This time, because there is no remote tray association reservation for another sheet feeder, the processing of step S1103, step S1108, and step S1109 is repeated until it is determined that N>M is true. When, in this way, the existence or absence of a remote tray association reservation is determined for all of the sheet feeders of the image forming apparatus 207, and when execution of remote tray associations finishes, in cases where reservations for remote tray association exist, the processing completes.

As explained above, by virtue of the second embodiment, even in a case where a plurality of remote tray associations are reserved for the same sheet feeder, it is possible to perform remote tray association in accordance with prior settings. In other words, allowing the user to perform remote tray association by allowing the user to select whether to execute previously reserved remote tray association becomes possible.

Third Embodiment

Next, explanation will be given for a third embodiment of the present invention. The third embodiment is explained with reference to FIG. 32 through FIG. 36. Note, because the hardware configuration of the print control apparatus 201 and the image forming apparatus 207 according to the third embodiment is the same as that of the previously described first embodiment, explanation is omitted.

Figure 32:
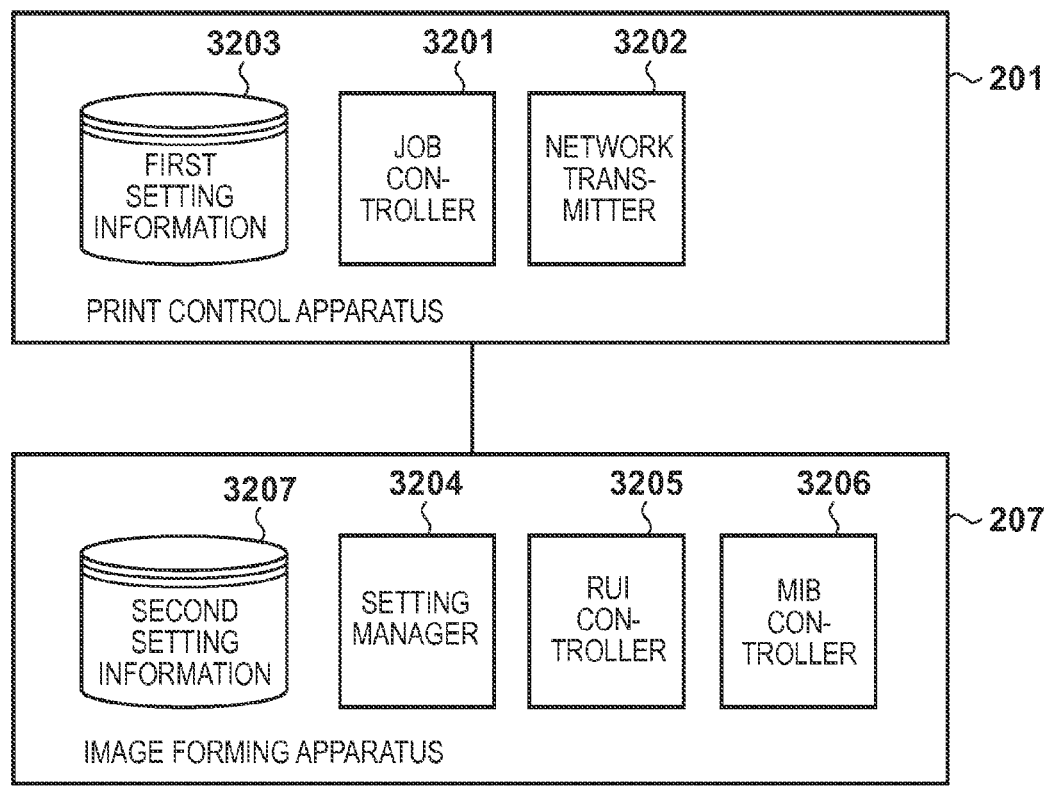
FIG. 32 is a block diagram for showing a configuration of the print control apparatus and the image forming apparatus according to a third embodiment.

FIG. 32 is a block diagram for showing a functional configuration of the print control apparatus 201 and the image forming apparatus 207 according to the third embodiment.

Processing functions of the CPU 107 that the print control apparatus 201 has include a job controller 3201 and a network transmitter 3202. Also, the HDD 105 is able to store first setting information 3203 that the print control apparatus 201 manages.

Processing functions of the control unit 308 that the image forming apparatus 207 has include a setting manager 3204, an RUI controller (Remote User Interface) 3205, and an MIB controller (Management Information Base) 3206. The HDD 309 is able to store second setting information 3207 that the image forming apparatus 207 manages.

Firstly, explanation will be given for an approach of synchronization in a case where the image forming apparatus 207 is not in a power saving state. In a case where the image forming apparatus 207 is not in a power saving state, the job controller 3201 and the network transmitter 3202 operate as follows independent from each other.

In a case where the user, through the console unit 109 of the print control apparatus 201, instructed modification of various settings values, the job controller 3201 firstly overwrites first setting information 3203 stored in the HDD 105. Next, the job controller 3201 determines whether or not the changed setting value should be synchronized with the image forming apparatus 207. Examples of setting items that should be synchronized are new registrations, modifications, or the like, of sheet information. The sheet information is a combination of information such as sheet size and grammage, and the existence or absence of coating processing, and is associated with a sheet name and a sheet ID, and stored in the first setting information 3203 or the second setting information 3207 as a database.

Also the user, when a print job is input into the print control apparatus 201, is able to specify the paper information to be used by the print job, and is able to specify which sheet information corresponds to the sheets that are replenished for each of the sheet feeders that the image forming apparatus 207 comprises. The print control apparatus 201 and the image forming apparatus 207 are capable of obtaining a higher quality printing result by appropriately adjusting the parameters related to image processing, print processing, or the like, in accordance with the specified sheet information.

In this way, the sheet information is something that is used by both the print control apparatus 201 and the image forming apparatus 207. Accordingly, in a case where registration or setting change of sheet information for either of the print control apparatus 201 or the image forming apparatus 207 is performed, it is advantageous from the viewpoint of user convenience improvement that the content be transmitted to the other apparatus, and that the change be reflected (referred to as synchronization).

Here, the setting items that should be synchronized may otherwise be network settings of the print control apparatus 201 and the image forming apparatus 207. For example, there are cases where in the content, that the image forming apparatus 207 replies in accordance with an information acquisition request from an external apparatus such as the terminal apparatus 211 of FIG. 2, network setting information associated with the connector 202, that the print control apparatus 201 has, is included. In such a case, it is advantageous that a modification of the network setting information associated with the connector 202 be reflected automatically in the image forming apparatus 207. Also, there are cases where the print control apparatus 201 changes the protocol by which reception is awaited at the connector 202 in accordance with a protocol capable of receiving with the connector 208 that the image forming apparatus 207 has. In such a case, it is advantageous that the content be reflected (synchronized) to the print control apparatus 201 as well when, the user, via the console unit 302 of the image forming apparatus 207, changes the protocol capable of receiving at the connector 208 of the image forming apparatus 207.

This kind of synchronization processing is performed as follows.

In a case where the job controller 3201 determines that a changed setting value is something that should be synchronized with the image forming apparatus 207, the changed setting contents are transmitted to the setting manager 3204 of the image forming apparatus 207. The setting manager 3204 writes the transmitted setting contents into the second setting information 3207 that the image forming apparatus 207 manages. By the job controller 3201 of the print control apparatus 201 and the setting manager 3204 of the image forming apparatus 207 operating in cooperation in this way, it is possible to execute synchronization of the setting value. Note, transmitting content from the setting manager 3204 to the job controller 3201 and performing synchronization of a setting value by the same approach is possible upon the trigger of the user changing the setting value via the console unit 302 of the image forming apparatus 207.

Next, explanation will be given for an approach for acquisition of a setting value in a case where the image forming apparatus 207 is not in the power saving state. Here, explanation will be given using the example of a case where the user requested acquisition of a setting value through the LAN 212. There are various methods for the user to browse/change print system setting values, and perform job input, status confirmation, or the like, but here explanation will be given for an approach using remote UI (RUI) using the HTTP and HTTPS protocols, and an approach using the SNMP protocol. These all enable browsing of an error state of the apparatus, a job processing status, or the like, and performing acquisition, modification, or the like, of various settings values, by accessing the print control apparatus 201 or the image forming apparatus 207.

In the third embodiment, the protocols for the network transmitter 3202, that the print control apparatus 201 has, for awaiting reception, include each of the protocols HTTP, HTTPS, and SNMP. The user, in a case where RUI is used, activates the Web browser in the terminal apparatus 211, and accesses the print control apparatus 201 by the HTTP or HTTPS protocol.

Next, the network transmitter 3202 receives an RUI screen request from the terminal apparatus 211 by the HTTP or HTTPS protocol, and transfers a received RUI screen request to an RUI controller 3205. Here, the processing of the network transmitter 3202 may include processing for inspecting whether the received RUI screen request is something that follows a format, and transferring only in cases where it is determined that it does follow the format, processing for modifying the received RUI screen request as necessary, or the like. The RUI controller 3205 generates an RUI screen in accordance with an HTML format when the RUI screen request is received. Here, an RUI screen related to setting values of the image forming apparatus 207 is generated with reference to the second setting information 3207. The RUI screen generated in this way is first transmitted from the RUI controller 3205 to the network transmitter 3202, and then is transmitted from the network transmitter 3202 to the terminal apparatus 211, and displayed on a Web browser screen. In a case where the user performs setting value acquisition/updating by the SNMP protocol, the network transmitter 3202 determines that the received acquisition request is of the SNMP protocol, and transfers the SNMP request to an MIB controller 3206.

The MIB controller 3206 generates a reply in response to the SNMP request with reference to a database referred to as a management information base (MIB) included in the second setting information 3207. In a case where the generated SNMP response is RUI, similarly it is transmitted to the terminal apparatus 211 via the network transmitter 3202. This completes the explanation for synchronization and setting approach for setting values in a case where the image forming apparatus 207 is not in the power saving state.

Next, description will be given for an approach for synchronization and the setting of the setting values in a case where the image forming apparatus 207 is transitioned into the power saving state.

Firstly, explanation will be given for a case in which acquisition or updating of a setting value is instructed to the print control apparatus 201 when the image forming apparatus 207 is in a power saving state. In this case, because the objective is suppression of the electric power consumption amount of the image forming apparatus 207, information of the setting value is stored in the print control apparatus 201 without causing the image forming apparatus 207 to return from the power saving state immediately. It is advantageous that setting synchronization be performed in accordance with when the image forming apparatus 207 returns from the power saving state.

Meanwhile, explanation will be given for a case in which, when the image forming apparatus 207 is in the power saving state, direct setting value acquisition or updating is instructed from the image forming apparatus 207 via the print control apparatus 201 using the previously described the RUI or SNMP. In this case, because the image forming apparatus 207 generates the reply in response to the setting value acquisition or update instruction, it is advantageous that the print control apparatus 201 causes the image forming apparatus 207 to return from the power saving state, and causes the image forming apparatus 207 to generate the reply in response to the instruction.

In this way, in a case where the image forming apparatus 207 is in the power saving state, it is necessary to switch whether or not to cause the image forming apparatus 207 to return from the power saving state in accordance with an instruction content transmitted to the print control apparatus 201. Furthermore, in a case where, in a state in which information of a changed setting value is accumulated in the print control apparatus 201, setting value acquisition or updating is instructed to the image forming apparatus 207, there is the following problem.

In order to enable the user to acquire or update the latest setting values, it is necessary to complete the synchronization of setting values accumulated in the print control apparatus 201 prior to the response to the setting value acquisition or update instruction to the image forming apparatus 207 being created. However, as previously explained, because parallel operation is performed by the job controller 3201 and the network transmitter 3202 independently, the order is not guaranteed. Accordingly, collaborative operation of the job controller 3201 and the network transmitter 3202 is required.

Figure 33:
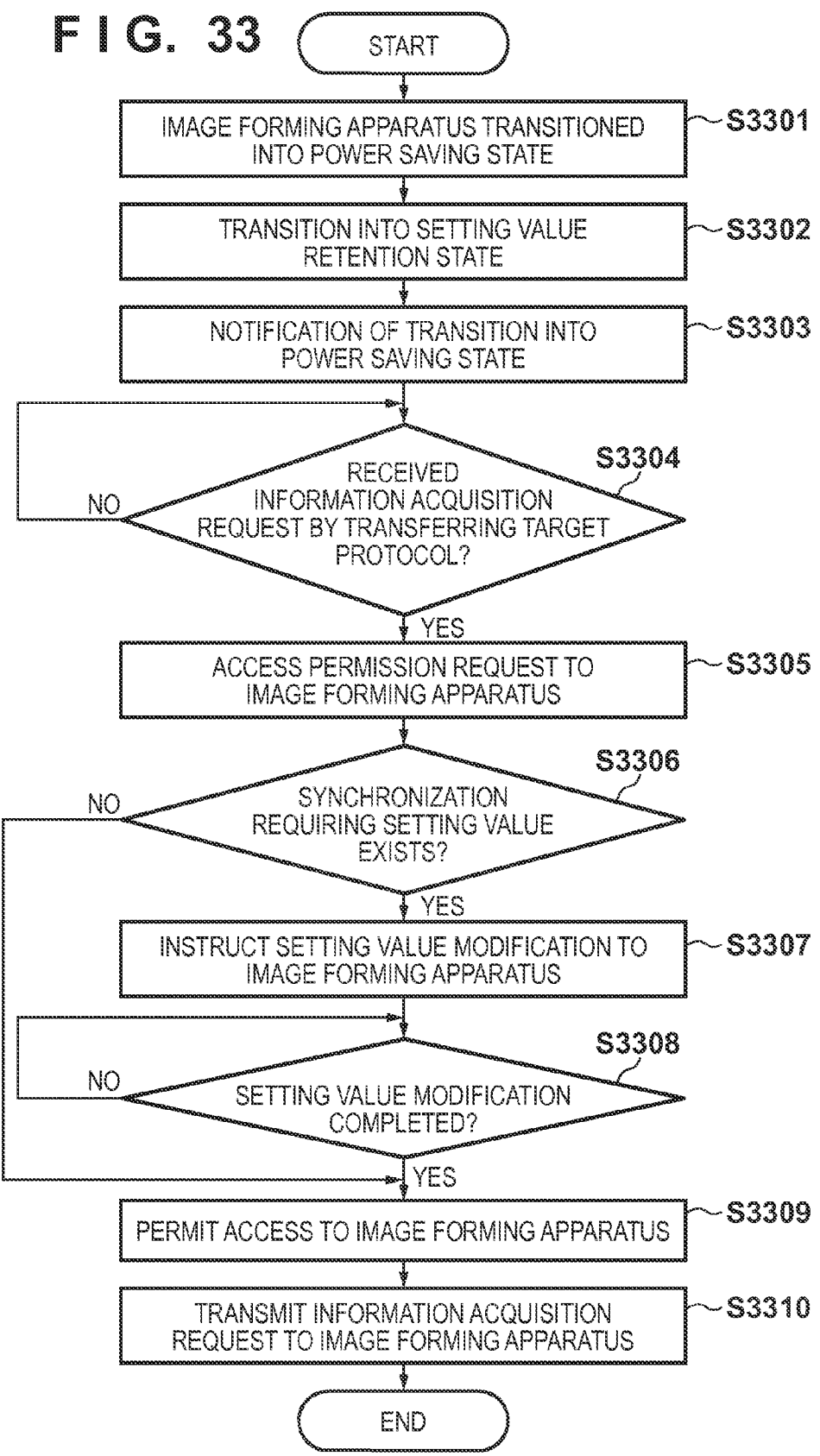
FIG. 33 is a flowchart for describing processing of collaborative operation by the print control apparatus according to the third embodiment.

The operation that enables this is explained using the flowchart of FIG. 33.

FIG. 33 is a flowchart for describing the collaborative operation processing by the print control apparatus 201 according to the third embodiment. Note, a program for executing this processing is installed in the HDD 105, and is loaded into a RAM (not shown) upon execution, and executed under the control of the CPU 107. Note, in the explanation of this flowchart, explanation will be as the processing of the job controller 3201 and the network transmitter 3202.

Firstly, in step S3301, the job controller 3201 detects that the image forming apparatus 207 is transitioned into the power saving state. In the third embodiment, regarding this detection, it is assumed that the job controller 3201 of the print control apparatus 201 performs it. As an example of a detection approach, there is the job controller 3201 receiving a notification of transition into the power saving state transmitted from the image forming apparatus 207. Other than this, an approach of distinguishing whether or not the transmission path 206 connecting the print control apparatus 201 and the image forming apparatus 207, or the communication link of the LAN 210 is valid.

When, in step S3301, the job controller 3201 detects that the image forming apparatus 207 transitions into the power saving state, the processing proceeds to step S3302, and a state in which retention of setting value acquisition or updating is enabled is transitioned into. In other words, in a case where a setting value, for which normally synchronization is necessary, is changed, the state is such that updating is communicated to the setting manager 3204, but in this setting value retention state, modification of a setting value for which synchronization is necessary is accumulated in the first setting information 3203. In this way the image forming apparatus 207 is not caused to return from the power saving state immediately.

Next, the processing proceeds to step S3303, and the job controller 3201 makes a notification to the network transmitter 3202 that the image forming apparatus 207 is transitioned into the power saving state. With this, the network transmitter 3202 waits until a request is received in a protocol for which transferring to the image forming apparatus 207 is necessary in step S3304. When, in this way, in step S3304, the network transmitter 3202 receives a request in a protocol for which transfer to the image forming apparatus 207 is necessary, the processing proceeds to step S3305, and a request is made to the job controller 3201 for access permission to the image forming apparatus 207.

In this way, the processing proceeds to step S3306, and the job controller 3201 determines whether or not a modification of a setting value for which synchronization is necessary is accumulated in the first setting information 3203 between the time in which the job the setting value retention state is transitioned into and the current time. Here, in a case where the job controller 3201 determines that the setting value modification is accumulated, the processing proceeds to step S3307. In step S3307, the job controller 3201 transmits information of the accumulated setting value modification to the setting manager 3204 of the image forming apparatus 207, and in step S3308, the job controller 3201 waits depending on whether or not the modification processing of this setting value has completed. Here, the setting manager 3204 of the image forming apparatus 207 writes the modification of the setting value received from the print control apparatus 201 into the second setting information 3207, and notifies the print control apparatus 201 of the completion of the setting value modification.

Having received this, the job controller 3201 leaves the waiting of step S3308, advances the processing to step S3309, and along with permitting access to the image forming apparatus 207 to the network transmitter 3202, leaves the setting value retention state. Here, the modification of the setting value completing in step S3308 means that the image forming apparatus 207 has returned from the power saving state, and this is because the setting value retention state is no longer required. With this, the network transmitter 3202 waits for access to the image forming apparatus 207 to be permitted in step S3309, the processing proceeds to step S3310, and the request received in step S3304 is transferred to the image forming apparatus 207. Note, in the third embodiment, in accordance with whether the received request is of HTTP/HTTPS protocols or of the SNMP protocol, the appropriate one out of the RUI controller 3205 and the MIB controller 3206 is transferred the received request.

As explained above by virtue of the third embodiment, when a setting value is changed by the print control apparatus 201 when the image forming apparatus 207 is in the power saving state, the setting value is stored, and is not transferred to the image forming apparatus 207 immediately. In this way, the electric power consumption of the image forming apparatus 207 is caused to reduce by as much as possible not causing the image forming apparatus 207 to return from the power saving state.

Also, by the network transmitter 3202 performing collaborative operation with the job controller 3201, always it is possible to reply with the latest information after a held the setting value modification is reflected in response to a setting value acquisition request from an external apparatus such as the terminal apparatus 211.

Fourth Embodiment

In the previously described the third embodiment, explanation was given for an approach in which the job controller 3201 monitors the image forming apparatus 207 transitioning into the power saving state, or returning from the power saving state, and notifies the network transmitter 3202 as necessary. However, there are cases where it is advantageous to have a module for monitoring the image forming apparatus 207 transitioning into the power saving state or returning from the power saving state other than the job controller 3201 and the network transmitter 3202 due to software configuration, and hardware restrictions. In the fourth embodiment, explanation will be given for processing for a case in which, so that an object of the present invention can be achieved even in such a case, a software module for monitoring a power supply status of the image forming apparatus 207 is arranged as a processing function unit of a CPU that the print control apparatus 201 has.

Figure 34:
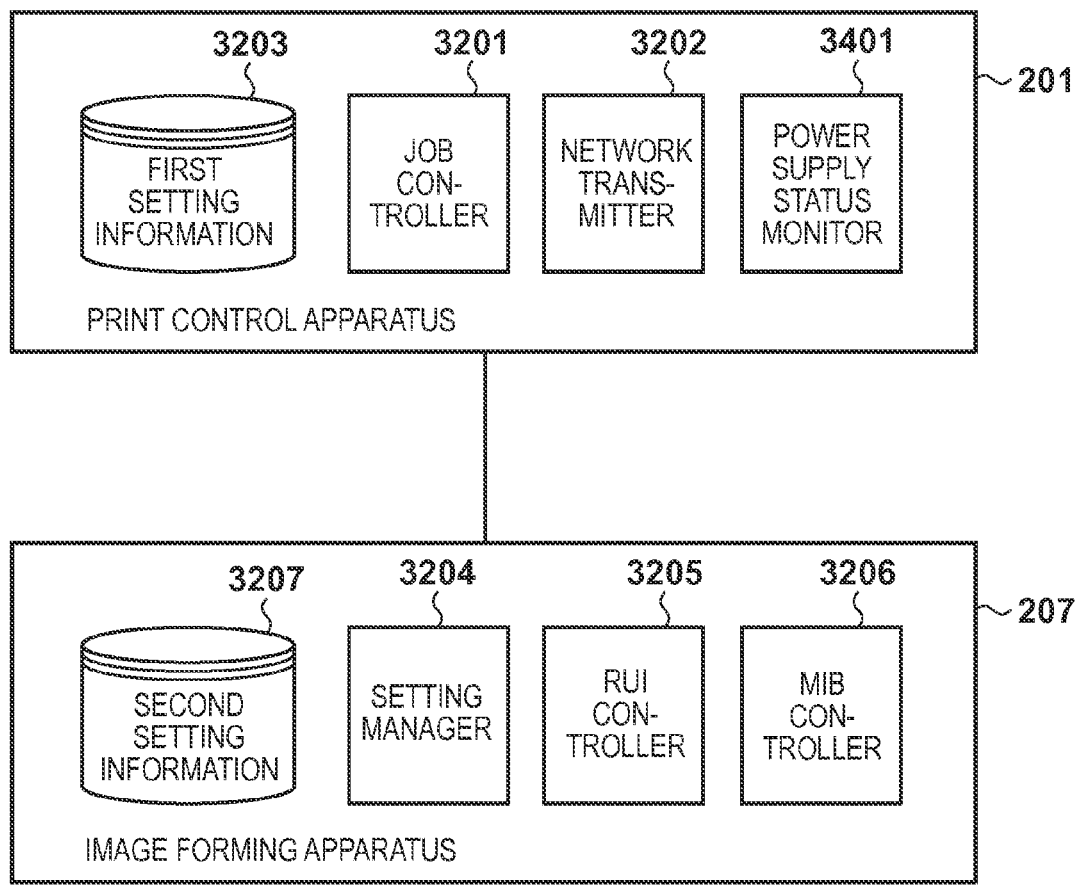
FIG. 34 is a block diagram for showing a configuration of the print control apparatus and the image forming apparatus according to a fourth embodiment.

FIG. 34 is a block diagram for showing a configuration of the print control apparatus 201 and the image forming apparatus 207 according to the fourth embodiment. In FIG. 34, portions common to the previously described FIG. 32 are shown with the same reference numerals, and their explanation will be omitted.

Processing functions of the CPU 107 that the print control apparatus 201 has include a power supply status monitor 3401 in addition to the configurations of FIG. 32. A role of the power supply status monitor 3401 is to monitor whether or not the power supply status of the image forming apparatus 207 is the power saving state, and to make an instruction required to the job controller 3201 and the network transmitter 3202 in accordance with a change of the power supply status. Also, in the print control apparatus 201, it is possible to detect that an event for which the image forming apparatus 207 should be caused to return from the power saving state occurred. Furthermore, the power supply status monitor 3401 is another software module in the print control apparatus 201 that replies whether or not the image forming apparatus 207 is in a power saving state in reply to a query from the job controller 3201 or the network transmitter 3202 in the fourth embodiment.

Next, explanation will be given of content of collaborative operation according to the fourth embodiment using the drawings. In the fourth embodiment, the job controller 3201 and the power supply status monitor 3401, and the network transmitter 3202 and the power supply status monitor 3401 respectively perform collaborative operation. The processing described here is performed by the CPU 107 of the print control apparatus 201, and the control unit 308 of the image forming apparatus 207 which includes a CPU executing based on programs stored in the ROMs provided in the print control apparatus 201 and the image forming apparatus 207 respectively according to the third embodiment as previously described.

Figure 35:
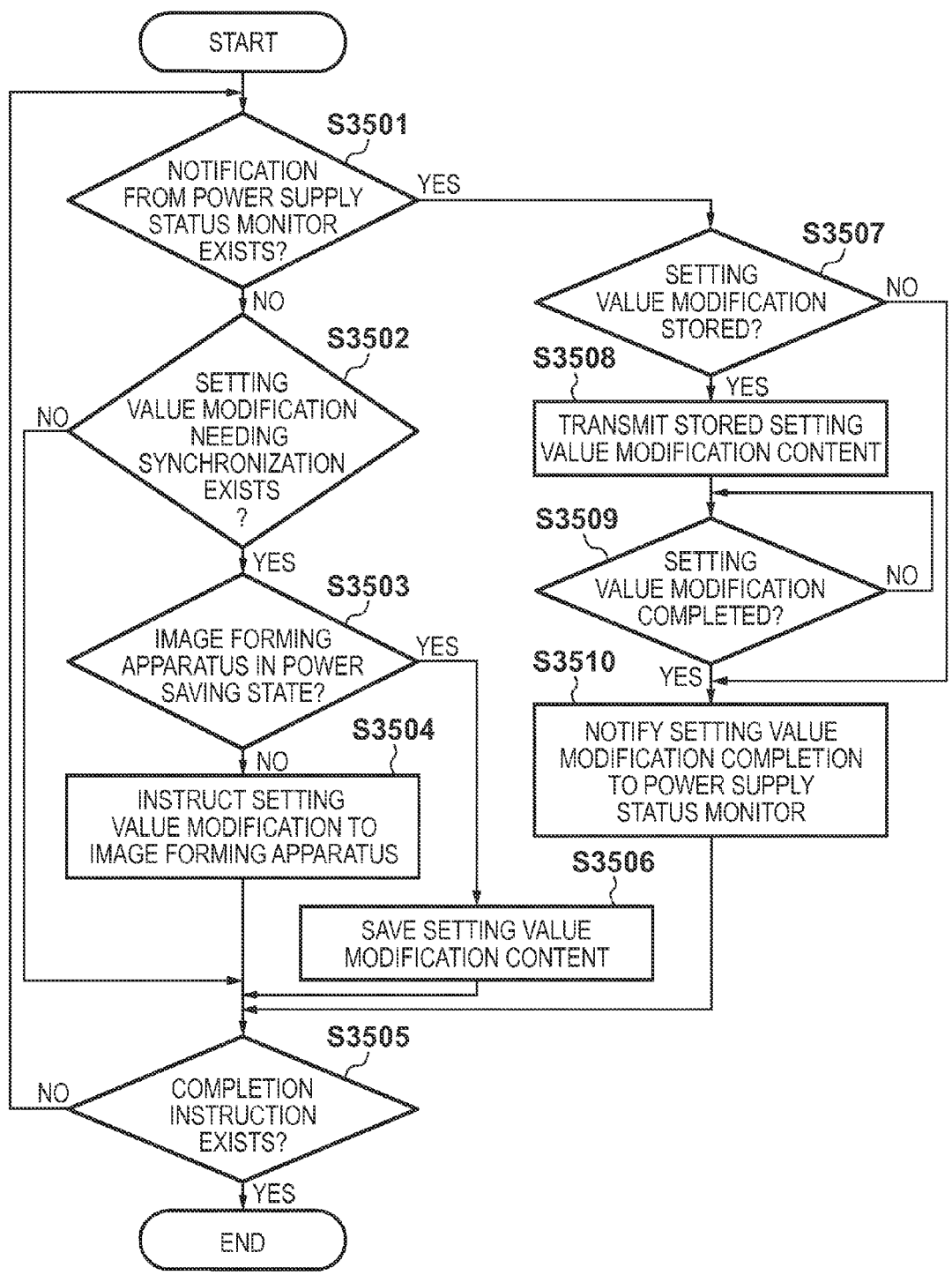
FIG. 35 is a flowchart for describing collaborative operation in the print control apparatus according to the fourth embodiment.

FIG. 35 is a flowchart for describing collaborative operation in the print control apparatus 201 according to the fourth embodiment. The approach explained with this flowchart is performed when, in the print control apparatus 201, the job controller 3201 monitors whether or not a setting value modification for which synchronization with the image forming apparatus 207 is necessary is performed.

In step S3501, the content of the notification made from the power supply status monitor 3401 to the job controller 3201 is content that notifies that an event for which the power saving state should be returned from occurred after the image forming apparatus 207 first entered the power saving state. An example of this kind of event is a case where due to timing of a timer executed on the image forming apparatus 207, the image forming apparatus 207 voluntarily returns from the power saving state. Other examples include a case where processing occurs in the print control apparatus 201 for which it is necessary to cause the image forming apparatus 207 to return from the power saving state. For example, a case where the user instructed the execution of a print job in the print control apparatus 201, and a case in which an acquisition request for information for which the transfer to the image forming apparatus 207 is necessary is received in the network transmitter 3202, as will be described later, are included. In this way, there are various events for which the image forming apparatus 207 should return from the power saving state, and in a state in which the image forming apparatus 207 has not entered the power saving state yet, always the processing proceeds to the processing of step S3502. Thus, here, explanation will be given first for the processing of step S3502 and subsequent processing.

In step S3502, the job controller 3201 determines whether or not a setting value modification for which synchronization with the image forming apparatus 207 is necessary has been made in the print control apparatus 201. In a case where it is determined that this kind of the setting value the modification is made, the processing proceeds to step S3503, and the job controller 3201 queries the power supply status monitor 3401 as to whether or not the image forming apparatus 207 is in the power saving state. In a case where the image forming apparatus 207 is not in the power saving state, the processing proceeds to step S3504, and notification of the setting value modification content is made immediately from the job controller 3201 to the setting manager 3204 of the image forming apparatus 207. Here, similarly to the previously described third embodiment, the image forming apparatus 207 is caused to reflect it by the setting manager 3204 of the image forming apparatus 207 writing the received setting value modification into the second setting information 3207.

Meanwhile, in a case where it is determined that the image forming apparatus 207 is in the power saving state in step S3503, the processing proceeds to step S3506, and the job controller 3201 temporarily saves the content of the setting value modification into the first setting information 3203. When the processing of step S3504 or step S3506 completes in this way, the processing proceeds to step S3505, and it is determined whether a completion instruction is made to the job controller 3201. The completion instruction is something that is made in a case, such as when shutting down, or restarting the print control apparatus 201, when the processing of the job controller 3201 is desired to be terminated, and is realized by software interruption processing, for example. When the job controller 3201 determines that there is this kind of completion instruction, it causes the processing shown in the flowchart of FIG. 35 to complete. Otherwise, the processing returns to step S3501, and the setting value modification monitoring continues.

Next, explanation will be given for a case in which, after the image forming apparatus 207 activates, the image forming apparatus 207 first enters the power saving state, and after this, an event for which return from the power saving state should be performed occurs. In such a case, the power supply status monitor 3401 detects this kind of event occurrence, and makes a notification to the job controller 3201 that the state is such that the image forming apparatus 207 should return from the power saving state. With this, the job controller 3201 receives the notification in step S3501, and processing proceeds to step S3507. The job controller 3201 in step S3507 determines whether or not there is a setting value modification temporarily stored in the processing of step S3506 in the past. In a case where it is determined that there is such a modification, the processing proceeds to step S3508, and the contents are transmitted to the setting manager 3204 of the image forming apparatus 207. With this, the setting manager 3204 of the image forming apparatus 207, after causing the setting value modification to be reflected in the image forming apparatus 207, makes a notification to the job controller 3201 that the setting value modification completed, similarly to the case of step S3504.

With this, when the job controller 3201 receives the completion notification in step S3509, the processing proceeds to step S3510, and notification of the setting value modification completion is made to the power supply status monitor 3401. Note, in step S3507, it is assumed that in a case where it is determined that a setting value modification is temporarily saved does not exist, the processing proceeds to step S3510 immediately. In any case, the power supply status monitor 3401 is able to detect that the setting value modifications temporarily saved in the print control apparatus 201 during the image forming apparatus 207 being in the power saving state are all synchronized by receiving the setting value modification completion notification transmitted in step S3510.

Next, explanation will be given for the collaborative operation of the network transmitter 3202 of the print control apparatus 201 and the power supply status monitor 3401 using the flowchart of FIG. 36.

Figure 36:
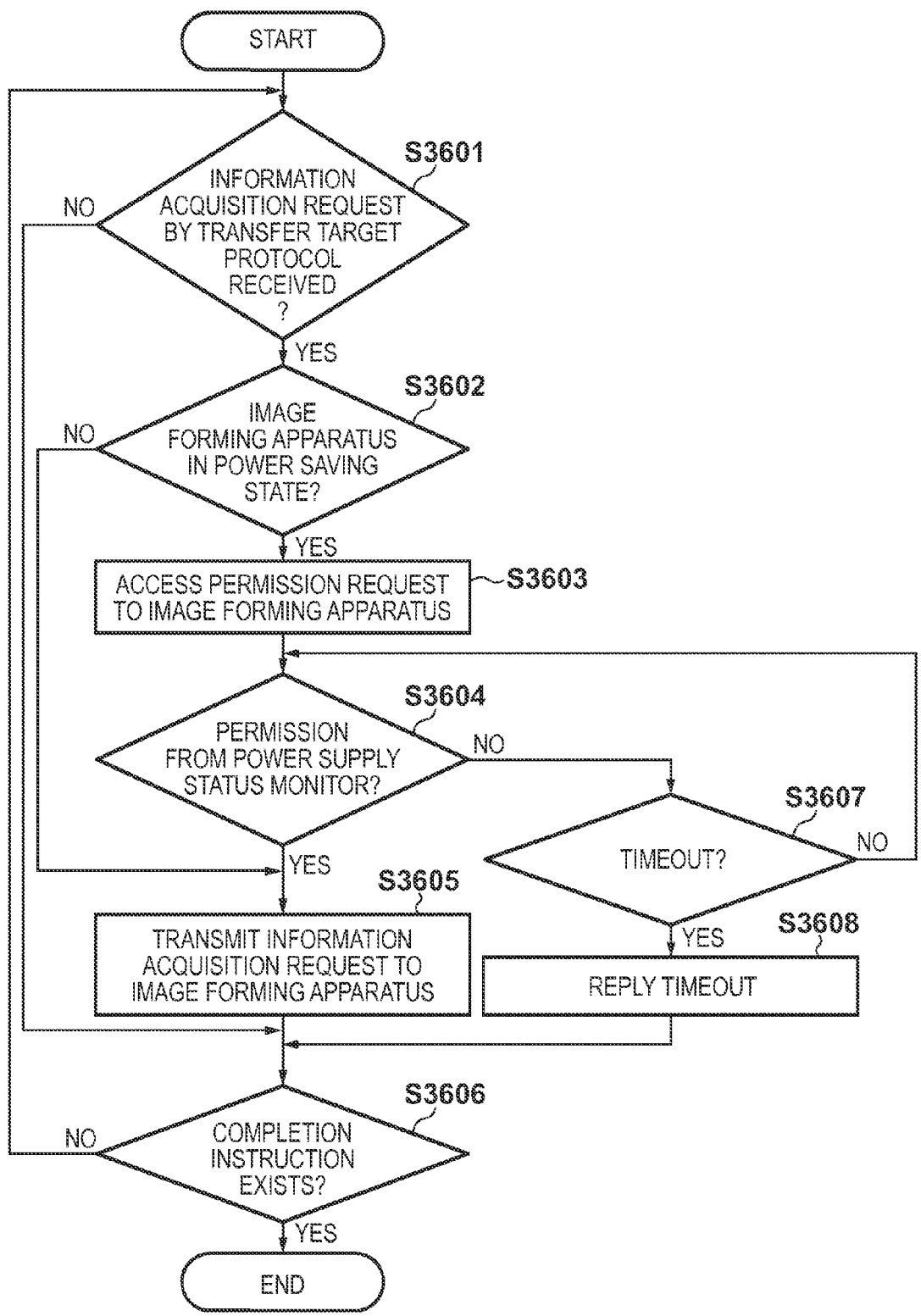
FIG. 36 is a flowchart for describing processing by the print control apparatus according to the fourth embodiment.

FIG. 36 is a flowchart for describing processing by the print control apparatus 201 according to the fourth embodiment. This processing is performed when the network transmitter 3202 waits on whether or not an acquisition request for information for which transferring to the image forming apparatus 207 is necessary.

Firstly, in step S3601, the network transmitter 3202 waits on an acquisition request for the information by a protocol for which transferring to the image forming apparatus 207 is necessary. In a case where this kind of request is not received, the processing proceeds to step S3606, and in step S3606, the job controller 3201 determines whether the completion instruction is made. In a case where the completion instruction is made, the processing ends, and in a case where it is not made, once again, the processing proceeds to the waiting processing of step S3601.

In a case where it is determined that an acquisition request for information in a protocol of a transfer target is received in step S3601, advances the processing to step S3602, and similarly to step S3503 of FIG. 35, the power supply status monitor 3401 is queried as to whether or not the image forming apparatus 207 is in the power saving state. In a case where the image forming apparatus 207 is not in the power saving state, because it will not be a problem even if the acquisition request for the received information is transferred to the image forming apparatus 207, the processing proceeds to step S3605 immediately. Because the processing of step S3605 is the same as the processing of step S3310 of FIG. 33, explanation is omitted.

Meanwhile, in a case where it is determined that the image forming apparatus 207 is in the power saving state in step S3602, the processing proceeds to step S3603, and a request is made to the power supply status monitor 3401 for permission to transfer the received acquisition request for information to the image forming apparatus 207. The power supply status monitor 3401 notifies the network transmitter 3202 in a case of transferring of the acquisition request for information is permitted, and the network transmitter 3202 receives this in step S3604.

In the fourth embodiment, the case where transferring of the acquisition request for information is permitted, is a case where in step S3510 of FIG. 35, the power supply status monitor 3401 is notified of the setting value modification completion from the job controller 3201. In other words, the power supply status monitor 3401 permits transferring of the acquisition request for information to the network transmitter 3202 after having waited for the setting value modification completion notification performed in step S3510. When, in this way, it is determined that a notification permitting transferring of the acquisition request for information is received by the network transmitter 3202 in step S3604, the processing proceeds to step S3605, and the acquisition request is transferred to the image forming apparatus 207.

Meanwhile, in a case where the transfer permission is not made in step S3604, the processing proceeds to step S3607, and it is determined whether or not a timeout reply to an external apparatus such as the terminal apparatus 211, which is the information acquisition request source, is performed. In the fourth embodiment, it is assumed that in a case where permission is not granted after a fixed time period has elapsed from the transfer permission request in step S3603, the processing proceeds to step S3608 from step S3607, and a timeout is returned as the reply to an information acquisition request from the terminal apparatus 211. In step S3607, once again the processing proceeds to step S3604, and the transfer permission is awaited until the fixed time period elapses. Note, the length of the fixed time period may be changed in accordance with a length of time envisioned to be required between the image forming apparatus 207 returning from the power saving state, and the setting value modification being reflected. In other words, the network transmitter 3202 is caused to wait for the transfer of the acquisition request for information until a time period envisioned in the design has elapsed, but it is determined that there is an error in a case where the information acquisition request transfer is not permitted even though the time period or more has elapsed.

The effects according to the fourth embodiment are as follows.

Firstly, similarly to the third embodiment, it is possible to not cause the image forming apparatus 207 to return from the power saving state as much as possible, and also to return a reply in a state in which the latest setting value modifications are always reflected in a case where there is an acquisition request for information from outside.

Also, in the fourth embodiment, monitoring transitioning of the power supply status of the image forming apparatus 207, and the determination as to whether or not to permit return from the power saving state are managed only in the power supply status monitor 3401. For this reason, even in a case where there are many software modules for which collaborative operation is necessary, it is not necessary to monitor their power supply statuses or to determine the existence or absence of modifications in a plurality of software modules, and a simple software configuration suffices.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)BD)he present invention can also be realized by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131050, filed Jun. 21, 2013, which is hereby incorporated by reference herein in its entirety.

What is claimed is:

1. A print control apparatus for causing a printing apparatus to execute printing by controlling the printing apparatus, the print control apparatus comprising:
a storage unit configured to store sheet information;
a registration unit configured to register in a list, when the printing apparatus is in a power saving state, sheet information in association with a sheet feeder of the printing apparatus, in response to an instruction for registering in the printing apparatus the sheet information in association with the sheet feeder of the printing apparatus;
a determination unit configured to determine whether or not the sheet feeder has a mechanism capable of setting a sheet while the printing apparatus is in the power saving state; and
a control unit configured to control such that, if the determination unit determines that a sheet feeder used for printing has not the mechanism capable of setting a sheet while the printing apparatus is in the power saving state, then after a swapping instruction of a sheet for the sheet feeder is performed, when the printing apparatus returns from the power saving state, the sheet information registered in the list by the registration unit is transmitted to the printing apparatus.

2. The print control apparatus according to claim 1, wherein the control unit controls such that, in a case where the printing apparatus returns from the power saving state on its own, the sheet information registered in the list is transmitted to the printing apparatus in order to synchronize the sheet information registered in the list with sheet information registered in association with the sheet feeder on the printing apparatus, and
wherein, in a case where the printing apparatus returns from the power saving state due to an inputting of a print job, in a case where sheet information specified by the print job is not set in a sheet feeder specified by the print job, and the sheet information registered in the list does not match with the sheet information of the print job, a screen prompting a registration of sheet information to the sheet feeder is displayed.

3. The print control apparatus according to claim 2, wherein the control unit controls such that, in the case where the printing apparatus returns from the power saving state due to the inputting of the print job, when the sheet information specified by the print job is not set in the sheet feeder, sheet information of the list matching the sheet information specified by the print job is transmitted to the printing apparatus.

4. The print control apparatus according to claim 1, wherein the control unit
controls such that, if the determination unit determines that a sheet feeder used for printing has the mechanism capable of setting a sheet while the printing apparatus is in the power saving state, then when the printing apparatus returns from the power saving state, in accordance with a change of a sheet size or a change of a remaining paper amount value of the sheet feeder while the printing apparatus is in the power saving state, the sheet information registered in the list by the registration unit is transmitted to the printing apparatus without performing a sheet swapping instruction of a sheet for the sheet feeder.

5. The print control apparatus according to claim 1, wherein the control unit controls such that, when the list registers a plurality of items of sheet information stored in the storage unit in association with a sheet feeder that the printing apparatus comprises, transmitting to the printing apparatus is performed in order to synchronize sheet information registered first out of the plurality of items of sheet information, and the sheet information registered in association with the sheet feeder in the printing apparatus.

6. The print control apparatus according to claim 1, wherein the control unit controls such that, when the list registers a plurality of items of sheet information stored in the storage unit in association with a sheet feeder that the printing apparatus comprises, transmitting to the printing apparatus is performed in order to synchronize sheet information that a user selects from out of the plurality of items of sheet information, and the sheet information registered in association with the sheet feeder in the printing apparatus.

7. The print control apparatus according to claim 1, wherein the sheet information includes at least one of a size or a grammage of a sheet, an existence or absence of coating processing, a name of a sheet, and an ID of a sheet.

8. A non-transitory computer-readable storage medium storing a program for causing a computer to function as the print control apparatus according to claim 1.

9. A method of controlling a print control apparatus for causing a printing apparatus to execute printing by controlling the printing apparatus, the method comprising:
- storing sheet information into a memory;
- registering in a list, when the printing apparatus is in a power saving state, the sheet information in association with a sheet feeder of the printing apparatus, in response to an instruction for registering, in the printing apparatus, the sheet information in association with a sheet feeder of the printing apparatus;
- determining whether or not the sheet feeder has a mechanism capable of setting a sheet while the printing apparatus is in the power saving state; and
- controlling such that, if it is determined in the determining that a sheet feeder used for printing has not the mechanism capable of setting a sheet while the printing apparatus is in the power saving state, then after a swapping instruction of a sheet for the sheet feeder is performed, when the printing apparatus returns from the power saving state, the sheet information registered in the list is transmitted to the printing apparatus.

* * * * *